US012544842B2

(12) United States Patent
Kaye, Jr. et al.

(10) Patent No.: US 12,544,842 B2
(45) Date of Patent: Feb. 10, 2026

(54) POWER TOOL AND POWER TOOL ACCESSORIES FOR CUTTING TUBULAR MEMBERS

(71) Applicant: BLACK & DECKER INC., New Britain, CT (US)

(72) Inventors: Thomas R. Kaye, Jr., Fallston, MD (US); Melissa Wyrwas, Severn, MD (US); Benjamin Tucker, Ellicott City, MD (US); Marco Lourenco, Baltimore, MD (US); Aland Santamarina, Woodbine, MD (US); Samuel McManus, Bel Air, MD (US); Daniel Cohen, Towson, MD (US)

(73) Assignee: Black & Decker Inc., New Britain, CT (US)

(*) Notice: Subject to any disclaimer, the term of this patent is extended or adjusted under 35 U.S.C. 154(b) by 0 days.

(21) Appl. No.: 18/652,792

(22) Filed: May 1, 2024

(65) Prior Publication Data
US 2024/0278339 A1   Aug. 22, 2024

Related U.S. Application Data

(63) Continuation-in-part of application No. 17/451,008, filed on Oct. 15, 2021.
(Continued)

(51) Int. Cl.
B23D 21/04 (2006.01)
B23D 21/08 (2006.01)
(Continued)

(52) U.S. Cl.
CPC .............. *B23D 21/04* (2013.01); *B23D 21/08* (2013.01); *B23D 35/002* (2013.01); *B23D 75/005* (2013.01); *B25F 3/00* (2013.01)

(58) Field of Classification Search
CPC ...... B23D 35/002; B23D 21/08; B23D 29/00; B23D 21/04; B23D 21/06; B23D 21/00; B25F 3/00; B25F 5/001; B26D 3/16
(Continued)

(56) References Cited

U.S. PATENT DOCUMENTS 1,749,861 A   3/1930   Vosper
2,586,209 A   2/1952   Giacomo
(Continued)

FOREIGN PATENT DOCUMENTS

CN   208787874 U   4/2019
CN   210648756 U   6/2020
(Continued)

OTHER PUBLICATIONS

Extended European Search Report, EP Application No. 21205036.3, Mar. 21, 2022, 11 pages.
(Continued)

*Primary Examiner* — Adam J Eiseman
*Assistant Examiner* — Robert D Cornett
(74) *Attorney, Agent, or Firm* — Brake Hughes Bellermann LLP

(57) ABSTRACT

A power tool accessory for cutting tubular members includes a housing, an input shaft configured to be coupled to a rotary power tool, a transmission, and a cutting head removably received in a front end of the housing. The transmission includes an input gear and an output gear with a first plurality of teeth. The cutting head has a central opening, a cutting blade protruding into the central opening, and a second plurality of teeth engaged by the first plurality of teeth. A clamp assembly coupled to the housing is moveable between a first position where the cutting head is removable from the housing and a second position where the cutting head is retained in the housing. The cutting head receives a
(Continued)

tubular member in the central opening with the cutting blade engaging the tubular member to cut the tubular member as the cutting head rotates about the tubular member.

20 Claims, 60 Drawing Sheets

Related U.S. Application Data

(60) Provisional application No. 63/500,472, filed on May 5, 2023, provisional application No. 63/176,618, filed on Apr. 19, 2021, provisional application No. 63/107,985, filed on Oct. 30, 2020.

(51) Int. Cl.
*B23D 35/00* (2006.01)
*B23D 75/00* (2006.01)
*B25F 3/00* (2006.01)

(58) Field of Classification Search
USPC .......... 30/92, 93, 95, 102; 83/469, 471, 478, 83/582, 603; 173/217
See application file for complete search history.

(56) References Cited

U.S. PATENT DOCUMENTS

| | | |
|---|---|---|
| 2,782,500 A | 2/1957 | Kelley |
| 2,940,093 A | 6/1960 | Pealer |
| 3,535,960 A | 10/1970 | Borries |
| 3,951,564 A | 4/1976 | Montgomery |
| 4,157,615 A | 6/1979 | Courty |
| 4,177,557 A | 12/1979 | Courty |
| 4,411,178 A | 10/1983 | Wachs et al. |
| 4,438,562 A | 3/1984 | Courty |
| 4,769,911 A | 9/1988 | Araki |
| 4,802,278 A | 2/1989 | VanderPol et al. |
| 4,890,385 A | 1/1990 | VanderPol et al. |
| D312,953 S | 12/1990 | VanderPol et al. |
| 5,088,196 A | 2/1992 | Fukuda |
| 5,203,238 A | 4/1993 | Ferguson |
| 5,475,924 A * | 12/1995 | McDaniel ............... B23D 21/08 30/94 |
| 5,813,299 A | 9/1998 | Soucy |
| 5,836,079 A | 11/1998 | Cronin et al. |
| 5,943,778 A | 8/1999 | Alana |
| 6,065,212 A | 5/2000 | Lazarevic |
| 6,481,105 B1 | 11/2002 | Haung |
| 6,637,115 B2 | 10/2003 | Walsh et al. |
| 6,658,739 B1 | 12/2003 | Huang |
| 6,732,842 B2 | 5/2004 | Nemoto |
| 7,013,567 B2 | 3/2006 | Myers |
| 7,013,778 B1 | 3/2006 | Lupke et al. |
| 7,293,362 B2 | 11/2007 | Konen |
| 7,320,268 B2 | 1/2008 | Kawashima |
| 7,406,769 B1 | 8/2008 | Toussaint |
| 7,743,510 B2 | 6/2010 | Lazarevic |
| 7,845,080 B2 | 12/2010 | Nasiell |
| 7,984,556 B2 | 7/2011 | Konen |
| 8,261,454 B2 | 9/2012 | Wilson, Jr. |
| 8,266,991 B2 | 9/2012 | Thorson et al. |
| 8,689,449 B2 | 4/2014 | Lazarevic |
| 8,763,257 B2 * | 7/2014 | Thorson ................ B23D 21/04 173/217 |
| 8,800,151 B2 | 8/2014 | Lee |
| 9,231,386 B2 | 1/2016 | Kochi et al. |
| 9,302,402 B2 | 4/2016 | Thorson et al. |
| 9,381,625 B2 | 7/2016 | Chen et al. |
| 9,505,067 B1 | 11/2016 | Nasiell et al. |
| 9,539,682 B2 | 1/2017 | Kawakami et al. |
| 9,566,652 B2 | 2/2017 | Nasiell |
| 9,821,386 B2 | 11/2017 | Soto |
| 10,046,470 B2 | 8/2018 | Thorson et al. |
| 10,059,018 B2 | 8/2018 | Zhou et al. |
| 10,259,132 B2 | 4/2019 | Liao et al. |
| 10,625,435 B2 | 4/2020 | Wang |
| 10,919,098 B2 | 2/2021 | Hyma et al. |
| 2005/0086809 A1 * | 4/2005 | Myers .................... B23D 21/08 81/182 |
| 2005/0150113 A1 | 7/2005 | Shultis |
| 2006/0032351 A1 | 2/2006 | Scinta et al. |
| 2006/0037198 A1 | 2/2006 | Sullivan |
| 2006/0260133 A1 | 11/2006 | Goop |
| 2007/0180701 A1 | 8/2007 | Hutt |
| 2011/0179649 A1 | 7/2011 | Park |
| 2012/0103142 A1 | 5/2012 | Sroka |
| 2012/0204699 A1 | 8/2012 | Soltesz |
| 2016/0008895 A1 * | 1/2016 | Chen .................... B23D 21/08 30/102 |
| 2016/0214265 A1 | 7/2016 | Thorson et al. |
| 2018/0297227 A1 | 10/2018 | Jenkins |

FOREIGN PATENT DOCUMENTS

| | | |
|---|---|---|
| CN | 215199885 U | 12/2021 |
| CN | 115958236 A | 4/2023 |
| DE | 3939816 A1 | 6/1991 |
| DE | 202004011189 U1 | 9/2004 |
| DE | 102007056567 A1 | 5/2009 |
| DE | 202020103844 U1 | 10/2020 |
| EP | 0121131 B1 | 10/1987 |
| EP | 3991896 A1 | 5/2022 |
| JP | S58165903 A | 10/1983 |
| JP | H07266122 A | 10/1995 |
| JP | 3066633 B2 | 7/2000 |

OTHER PUBLICATIONS

Extended European Search Report, EP Application No. 24174212.1, Oct. 11, 2024, 9 pages, EPO.

* cited by examiner

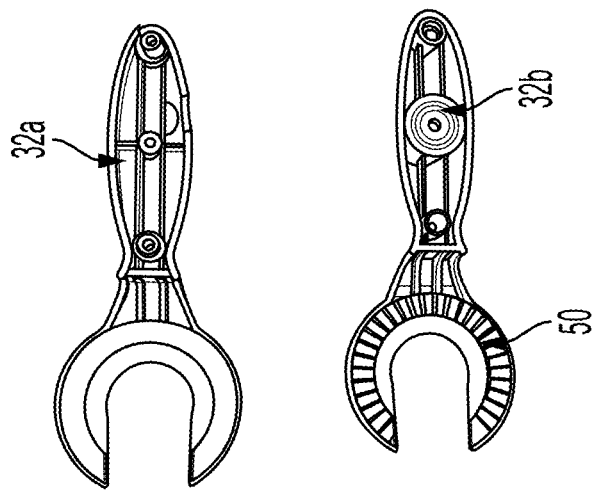
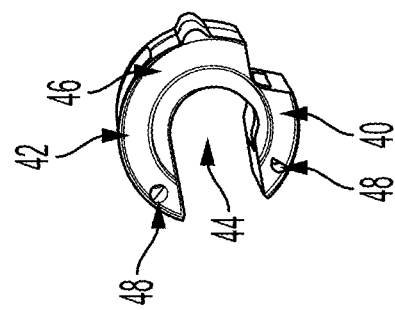
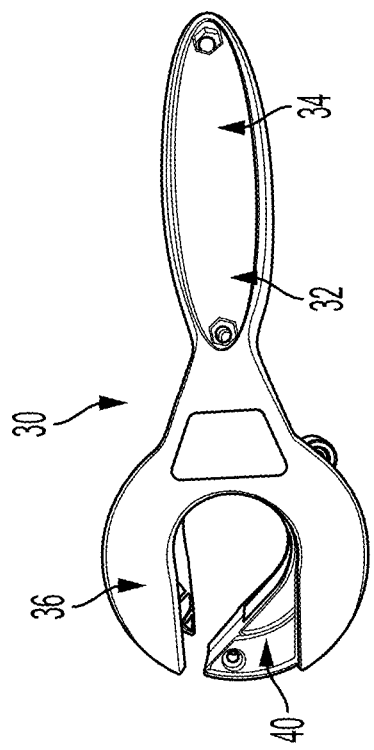
FIG. 1F
FIG. 1E

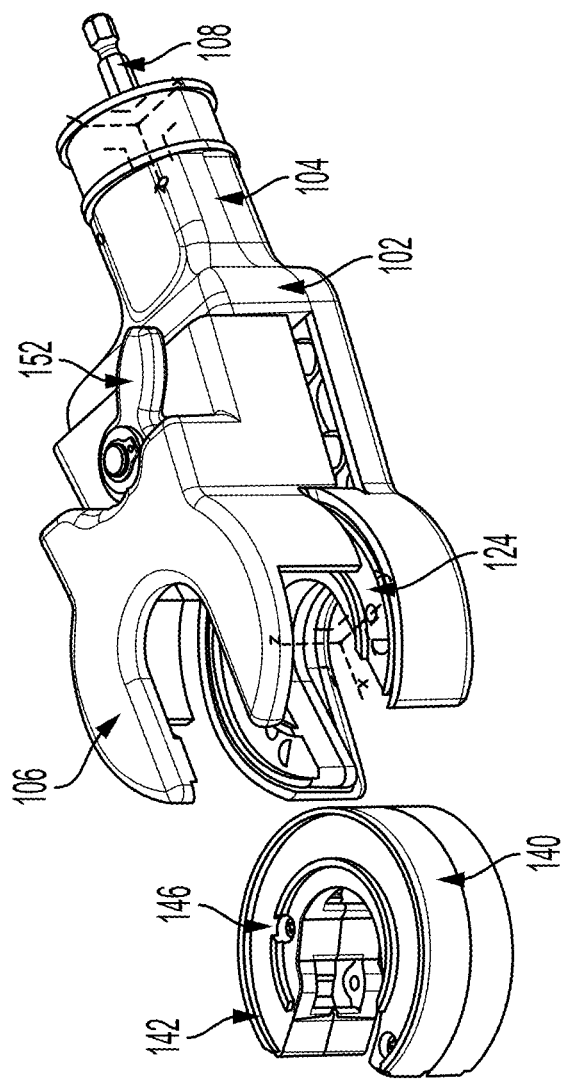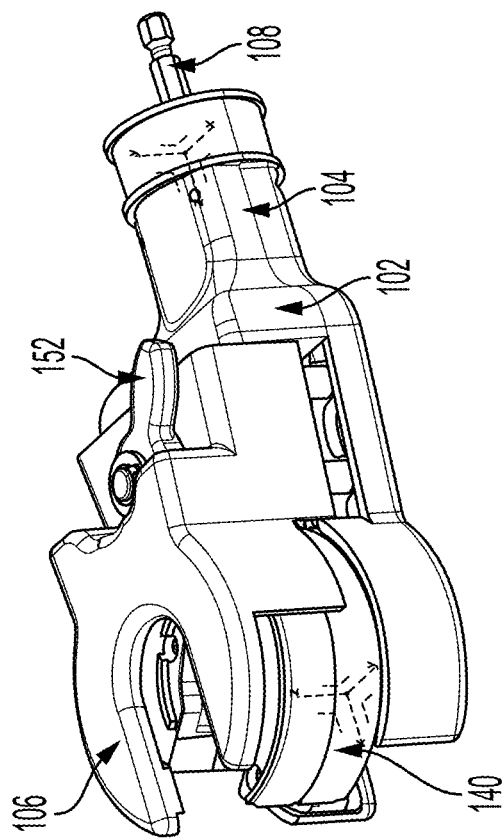
FIG. 3A
FIG. 3B

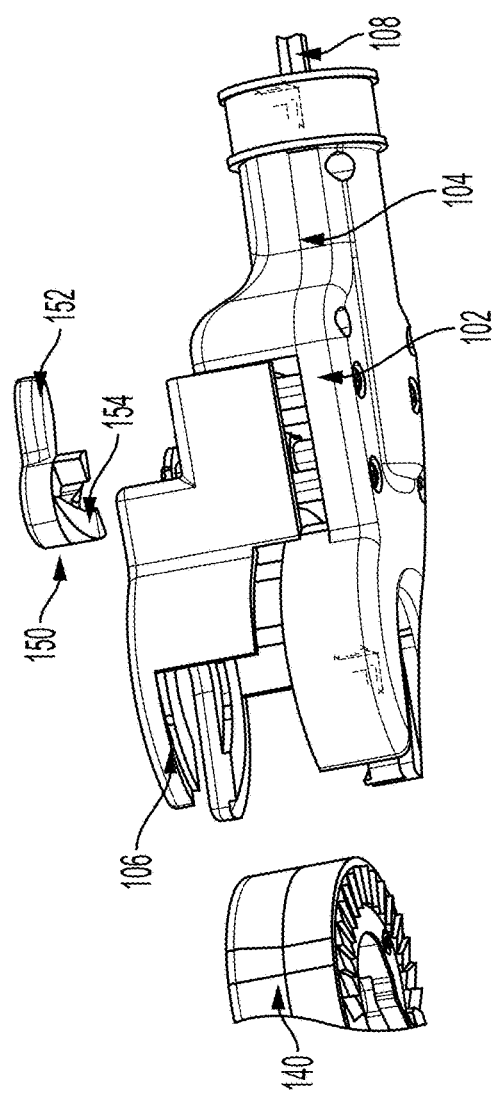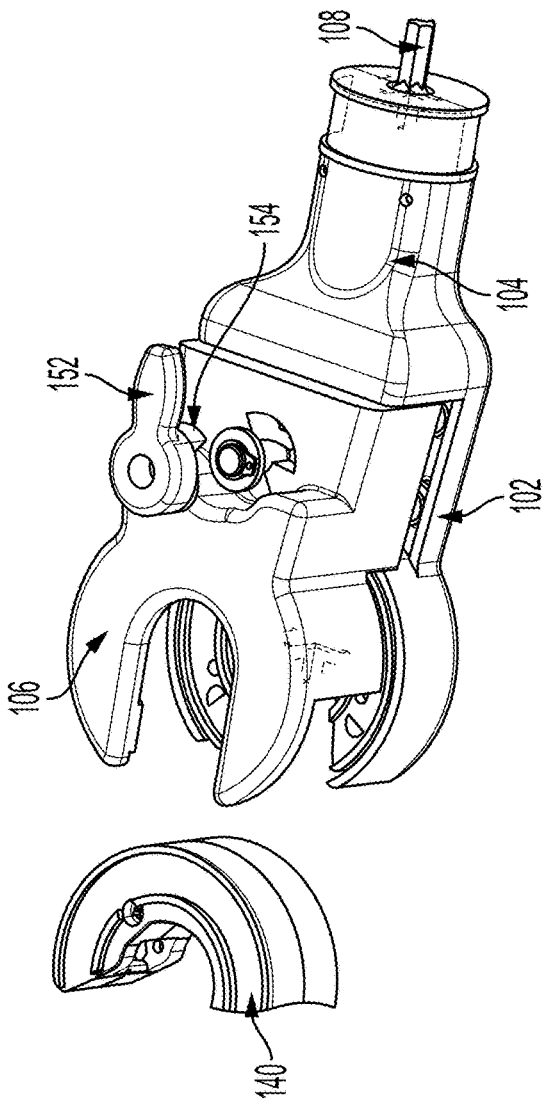
FIG. 4A
FIG. 4B

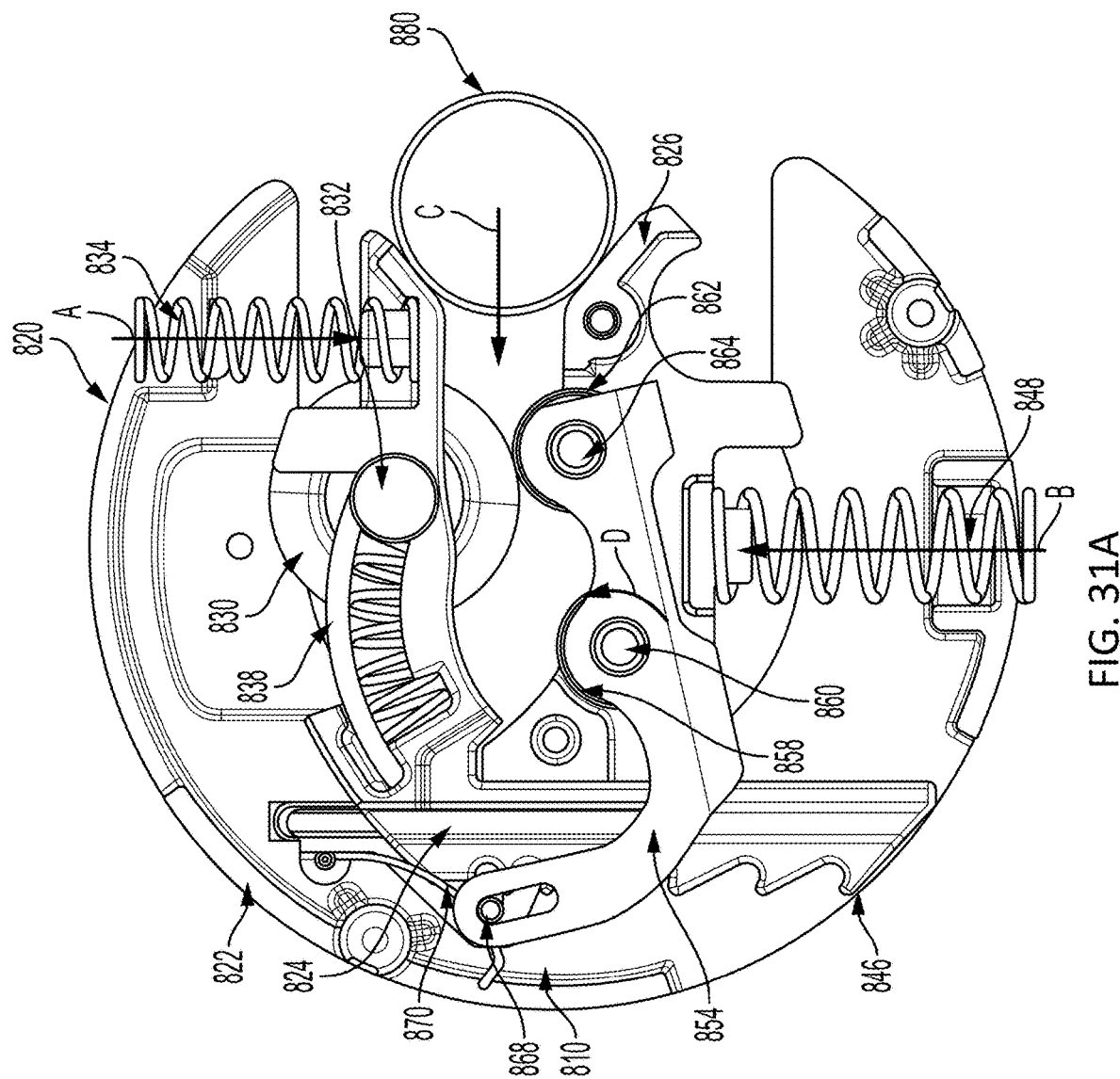

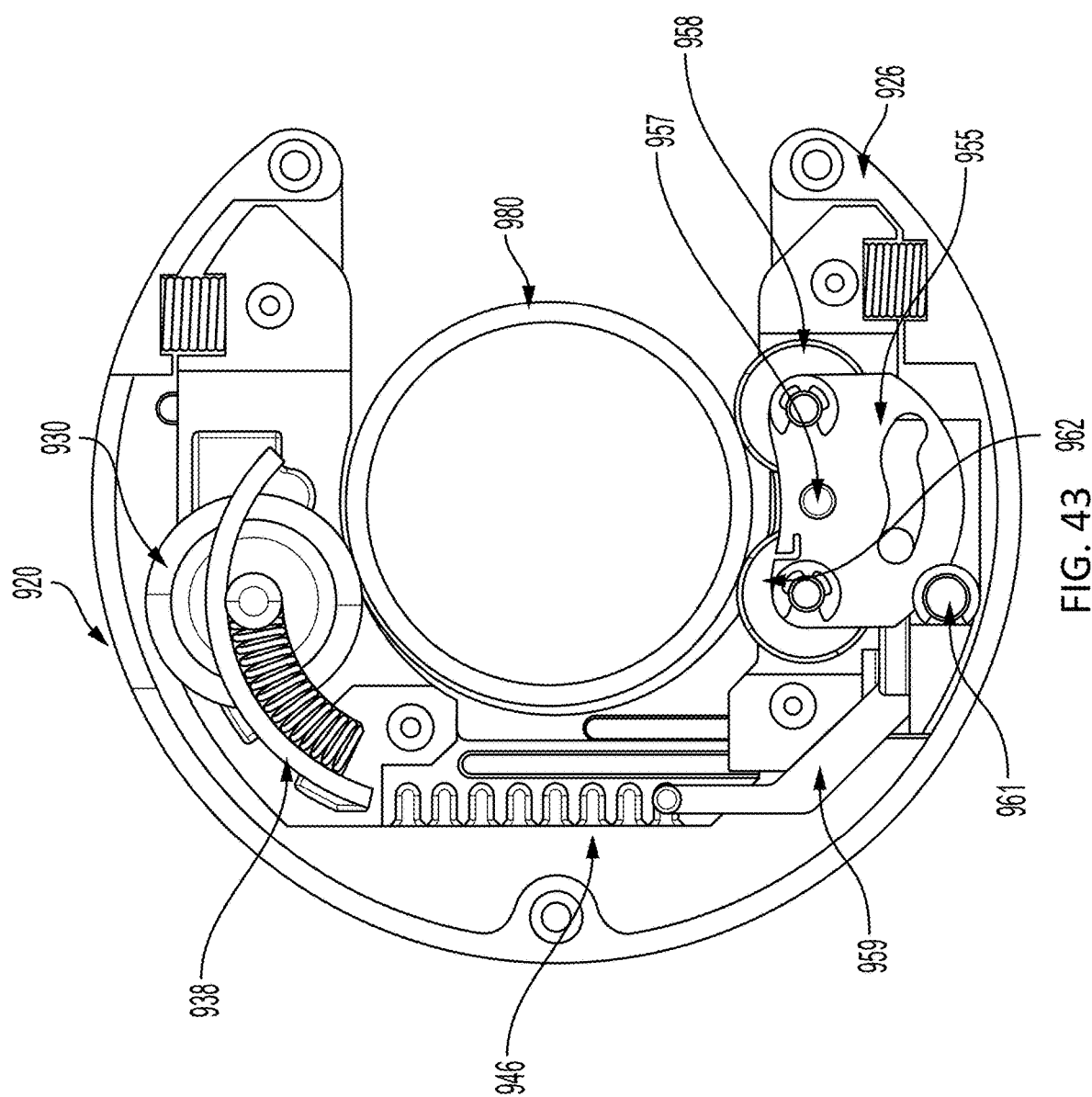

POWER TOOL AND POWER TOOL ACCESSORIES FOR CUTTING TUBULAR MEMBERS

RELATED APPLICATIONS

This application claims priority, under 35 U.S.C. § 119(e), to U.S. Provisional Application No. 63/500,472, filed May 5, 2023, titled "Power Tool And Power Tool Accessories For Cutting Tubular Members," which is incorporated by reference. This application also claims priority, under 35 U.S.C. § 120, as a continuation-in-part of U.S. patent application Ser. No. 17/451,008, filed Oct. 15, 2021, titled "Power Tool Accessories for Cutting Tubular Members," which claims priority, under 35 U.S.C. § 119(e), to U.S. Provisional Application No. 63/176,618, filed Apr. 19, 2021, titled "Power Tool Accessories for Cutting Tubular Members," and to U.S. Provisional Patent Application No. 63/107,985, filed Oct. 30, 2020, titled "Power Tool Accessories for Cutting Tubular Members," each of which is incorporated by reference.

TECHNICAL FIELD

This application relates to power tools and accessories usable with rotary power tools, such as drills and impact drivers, for cutting tubular members, such as copper or metal pipes.

BACKGROUND

Hand operated tools and power operated tools can be used to cut tubes, such as pipes.

SUMMARY

In an aspect, a power tool accessory for cutting tubular members includes a housing and an input shaft received in a rear end portion of the housing. The input shaft is configured to be coupled to a rotary power tool to be driven in rotation by the power tool. A puck shaped cutting head (also referred to herein as a puck) carrying at least one cutting wheel or blade is configured to be received in a front end portion of the housing. The input shaft is drivingly coupled to the cutting head by a transmission configured to convert rotary motion of the input shaft to ratcheting motion of the cutting head. In operation, a tubular member is receivable in the cutting head and engageable by the cutting wheel or blade so that the cutting wheel or blade cuts the tubular member as the cutting head ratchetly rotates about the tubular member in response to rotary input motion of the input shaft from a power tool.

Implementations of this aspect may include one or more of the following features. The transmission may include an eccentric member coupled to a front end of the input shaft and a wobble plate engaged by the eccentric member and moveable in a rocking motion. The wobble plate may have driving teeth engaged with driven teeth on a ratchet wheel received in a front end of the housing. The ratchet wheel may have ratchet pawls or teeth that engage ratchet teeth on the cutting head. When the input shaft rotates, the eccentric causes the wobble plate to wobble or oscillate, which causes the ratchet wheel to oscillate, which causes the ratchet wheel to oscillate, which causes the cutting head to rotate in a ratcheting manner in one direction to cut the tubular member. The cutting head may be removable from the housing to be used by hand. The housing may include a cam lock mechanism for opening a cover on the housing to change or remove the cutting head. The interior of the cutting head carries a pair of rollers and a cutting wheel or blade with a spring biasing the cutting wheel or blade toward an interior of the cutting head.

In another aspect, a power tool accessory for cutting tubular members includes a housing and an input shaft received in a rear end portion of the housing. The input shaft is configured to be coupled to a rotary power tool to be driven in rotation by the power tool. A puck shaped cutting head (also referred to herein as a puck) carrying at least one cutting wheel or blade is configured to be received in a front end portion of the housing. The cutting head includes a C-shaped body and a pivoting door that can pivot open to receive a tubular member in the central opening of the body and that can pivot closed to form a closed annular body with the C-shaped body. The input shaft drives the cutting head in rotation via a transmission. In operation, a tubular member is receivable in the cutting head and engageable by the cutting wheel or blade so that the cutting wheel or blade cuts the tubular member as the cutting head rotates about the tubular member in response to rotary input motion of the input shaft from a power tool.

Implementations of this aspect may include one or more of the following features. The transmission includes an input right angle gear, which drives an intermediate right angle gear. The intermediate right angle gear may be mounted on a common shaft with an output gear. The body also has a plurality of gear teeth on its outer periphery. The cutting head is receivable in the front of the base so that the teeth on the cutting head mesh with the teeth on the output gear. Thus, rotation of the input shaft causes rotation of the cutting head about its center axis. The cutting head is held in place in the body by a clamping mechanism that includes a latch, a pair of springs, and a plate that carries one or more pins. When the latch is closed, pins on the plate are pressed into an annular groove in the cutting head and ride in the groove so that the cutting head stays in the base. The interior of the cutting head carries a pair of rollers and a cutting wheel or blade with a spring biasing the cutting wheel or blade toward an interior of the cutting head.

In another aspect, a power tool accessory for cutting tubular members includes a housing having a base and an input shaft received in a rear end portion of the base. The input shaft is configured to be coupled to a rotary power tool to be driven in rotation by the power tool. The housing also includes a retractable sheath received over the base and biased by a spring away from the input shaft. A removable cutting wheel or blade is received in the base and is drivingly coupled to the input shaft via a transmission to rotate when the input shaft rotates. In use, the input shaft is coupled to a rotary power tool and then the sheath is pressed against a tubular member and retracts, while the cutting wheel or blade rotates to cut the tubular member.

The input shaft is coupled to a transmission that includes pair of right angle gears. The output right angle gear is mounted on a common shaft with a large gear, which meshes with a small output gear. The output gear is coupled to an output shaft to which a removable cutting wheel or blade is mounted, e.g., in a manner similar to a circular saw or an angle grinder. The transmission is configured to increase rotational speed from the input shaft to the cutting wheel or blade. The cutting wheel or blade may include an abrasive wheel, such as an abrasive cutting wheel or blade used with angle grinders. The sheath may include a recess in its front end to better retain the pipe.

Implementations of this aspect may include one or more of the following features. The transmission may include a pair of right angle gears coupled to the input shaft. The output right angle gear may be mounted on a common shaft with a large gear, which meshes with a small output gear. The small output gear may be coupled to an output shaft to which the wheel may be mounted. The sheath may include a recess in its front end to better retain the pipe.

In another aspect, a power tool accessory for cutting tubular members includes a housing and an input shaft received in a rear end portion of the housing. The input shaft is configured to be coupled to a rotary power tool to be driven in rotation by the power tool. A transmission is received in the housing and includes at least two idler gears. A C-shaped and puck-shaped cutting head (also referred to herein as a puck) includes has a central opening, a plurality of teeth about its periphery, and at least one cutting wheel or blade facing inward toward the central opening. The cutting head is configured to be removably receivable in a front end portion of the housing with its plurality of teeth configured to mesh with teeth on the idler gears when the cutting head is received in the housing. When the input shaft rotates, the transmission causes the cutting head to rotate about its central axis with the teeth of the cutting head remaining in mesh with at least one of the idler gears during each full rotation of the cutting head. In operation, a tubular member is receivable in the central opening in the cutting head and engageable by the cutting wheel or blade so that when the cutting head rotates, the cutting wheel or blade cuts the tubular member.

Implementations of this aspect may include one or more of the following features. The transmission may include an input right angle gear coupled to the input shaft and output right angle gear meshed with the input right angle gear to change an axis of rotation by 90 degrees. The transmission may further include one or more speed reduction gears disposed between the output right angle gear and the at least two idler gears. The speed reduction gears may include a first spur gear on a common drive shaft with the output right angle gear and a second spur gear meshed with the first spur gear and the idler gears. The cutting head may be removably held in place in the housing by a clamping mechanism. The clamping mechanism may include a cover moveable relative to a base of the housing and a lever (e.g., a cam lever) configured to move the cover between a closed position in which the cutting head is retained in the housing and an open position in which the cutting head is removable from the housing. The clamping mechanism may further include at least one spring biasing the cover toward the open position. The cover may carry at least one pin so that, when in the closed position, the pin engages a semi-annular groove or track in the cutting head and rides in the track so that the cutting head remains in the housing while it rotates. The C-shaped opening may be defined by an interior wall of the cutting head, which may carry at least one roller and the cutting wheel or blade with a spring biasing the cutting wheel or blade toward the central opening.

In another aspect, a power tool accessory for cutting tubular members includes an accessory housing, an input shaft received in a rear end portion of the accessory housing, the input shaft configured to be coupled to a rotary power tool to be driven in rotation by the power tool, a transmission received in the accessory housing having a rotatable input member configured to be driven by the input shaft and a rotatable output member configured to be driven by the input member, and a cutting head received in a front end portion of the accessory housing, the cutting head having a head housing with a central opening configured to receive a tubular member in the central opening and to be rotatably driven by the output member of the transmission, the cutting head including a cutting blade configured to protrude at least partially into the central opening, a roller configured to protrude at least partially into the central opening, and a releasable lock assembly. The cutting blade and the roller are biased inward toward a center of the central opening, movable outward from the central opening to accommodate multiple sizes of tubular members in the central opening, and lockable by the lock assembly in a desired position to accommodate a tubular member of a desired size. The lock assembly is actuated automatically by insertion of the tubular member. In the locked position, the roller and the cutting blade engage the tubular member so that the cutting blade cuts the tubular member as the cutting head rotates about the tubular member in response to rotation of the input shaft.

Implementations of this aspect may include one or more of the following features. The roller may be coupled to a roller carriage carried by the head housing and biased inward toward the central opening by a first spring. The power tool accessory may further include a roller mount where the roller is coupled to the roller mount and the roller mount is coupled to the roller carriage, the roller mount configured to pivot relative to the roller carriage upon insertion of the tubular member into the cutting head. The cutting blade may be coupled to a blade carriage carried by the head housing opposite the roller carriage and biased inward toward the central opening by a second spring. The lock assembly may include size adjustment slots coupled to one of the roller carriage and the blade carriage and a protrusion coupled to the other of the roller carriage and the blade carriage, where the protrusion is receivable in the size adjustment slots at different positions of the carriages. The output member may include two or more output gears rotating at the same speed, each output gear having the first plurality of teeth configured to mesh with a second plurality of teeth on the cutting head.

The cutting head may include a C-shaped body that carries the second plurality of teeth and the output gears are separated by a distance so that the first plurality of teeth on at least one of the output gears is always meshed with the second plurality of teeth on the C-shaped body as the cutting head rotates a full rotation about its axis. The at least two output gears may be idler gears and the transmission further includes at least one speed reduction gear between the input member and the idler gears. The cutting head includes a C-shaped body with an interior wall defining the central opening. The C-shaped body carries at least one roller and the cutting blade with a spring biasing the cutting blade into the central opening. The cutting head may include a grip surface on its outer periphery so that the cutting head is configured to be used as a manual operated cutter of tubular members when the cutting head is removed from the housing.

The housing may include a base and the clamp assembly includes a cover moveable relative to the base of the housing. The clamp assembly may further include a spring that biases the cover away from the base and a latch with a cam surface moveable between a first position in which the cam surface presses the cover toward the base against the bias of the spring to retain the cutting head in the housing and a second position in which the cam surface allows the cover to move away from the base to allow for insertion or removal of the cutting head from the housing. The cutting head may include an annular track and at least one of the base and the cover includes a protrusion that rides in the track to keep the cutting head centered as it rotates. The accessory housing may include a first C-shaped opening, the cutting head may include a second C-shaped opening and further including an alignment assembly configured to automatically align the first and second C-shaped openings when the cutting head is rotated in a first direction and configured to allow free rotation of the cutting head relative to the accessory housing when the cutting head is rotated in a second opposite direction. The power tool accessory may further include a roller mount where the roller is coupled to the roller mount and the roller mount is coupled to the roller carriage, the roller mount configured to pivot relative to the roller carriage upon insertion of the tubular member into the cutting head.

In another general aspect, a power tool for cutting tubular members includes a tool housing, a motor received in the tool housing, a transmission configured to be driven by the motor, a cutting head received in a front end portion of the tool housing, the cutting head having a head housing with a central opening configured to receive a tubular member in the central opening and to be rotatably driven by the output member of the transmission, the cutting head including a cutting blade configured to protrude at least partially into the central opening, a roller configured to protrude at least partially into the central opening, and a releasable lock assembly. The cutting blade and the roller are biased inward toward a center of the central opening, movable outward from the central opening to accommodate multiple sizes of tubular members in the central opening, and lockable by the lock assembly in a desired position to accommodate a tubular member of a desired size. The lock assembly is actuated automatically by insertion of the tubular member. In the locked position, the roller and the cutting blade engage the tubular member so that the cutting blade cuts the tubular member as the cutting head rotates about the tubular member in response to rotation of the input shaft.

Implementations of this aspect may include one or more of the following features. The roller may be coupled to a roller carriage carried by the head housing and biased inward toward the central opening by a first spring. The cutting blade may be coupled to a blade carriage carried by the head housing opposite the roller carriage and biased inward toward the central opening by a second spring. The lock assembly may include size adjustment slots coupled to one of the roller carriage and the blade carriage and a protrusion coupled to the other of the roller carriage and the blade carriage, where the protrusion is receivable in the size adjustment slots at different positions of the carriages. One of the roller carriage and the blade carriage include size adjustment slots and the other of the roller carriage and the blade carriage includes a protrusion, where the protrusion is receivable in the size adjustment slots at different positions of the carriages. The output member may include two or more output gears rotating at the same speed, each output gear having the first plurality of teeth configured to mesh with a second plurality of teeth on the cutting head. The cutting head may include a C-shaped body that carries the second plurality of teeth and the output gears are separated by a distance so that the first plurality of teeth on at least one of the output gears is always meshed with the second plurality of teeth on the C-shaped body as the cutting head rotates a full rotation about its axis. The at least two output gears are idler gears and the transmission further includes a plurality of intermediate gears between the input member and the at least two output gears. The cutting head may include a C-shaped body with an interior wall defining the central opening. The C-shaped body carries the at least one roller and the cutting blade with a spring biasing the cutting blade into the central opening. The tool housing may include a first C-shaped opening, the cutting head may include a second C-shaped opening and further including an alignment assembly configured to automatically align the first and second C-shaped openings when the cutting head is rotated in a first direction and configured to allow free rotation of the cutting head relative to the accessory housing when the cutting head is rotated in a second opposite direction.

In another general aspect, a tool for cutting tubular members includes a tool housing, an input shaft received at least partially in a rear end portion of the tool housing, a transmission received in the tool housing having a rotatable input member configured to be driven by the input shaft, a first rotatable output member configured to be driven by the input member, and a second rotatable output member configured to be driven by the input member, a cutting head received in a front end portion of the tool housing, the cutting head having a head housing with a central opening configured to receive a tubular member in the central opening and to be rotatably driven by the first output member of the transmission, the cutting head including a cutting blade and a roller configured to protrude into the central opening with the cutting blade engaging the tubular member so that the cutting blade cuts the tubular member as the cutting head rotates about the tubular member in response to rotation of the input shaft, and a reamer coupled to the accessory housing, the reamer including a stepped body with a deburring blade configured to be rotatably driven by the second output member of the transmission to remove burrs from an end of a tubular member.

Implementations of this aspect may include one or more of the following features. The first output member may include an output gear of the transmission and the second output member may include an intermediate gear of the transmission. The tool may include a power tool and the tool housing contains a motor configured to drive the input shaft. The tool may include a power tool accessory and the input shaft is configured to be coupled to an output tool holder of a power tool.

Advantages may include one or more of the following. The power tool accessory may facilitate quick and easy cutting of tubular members such as pipes, using an existing rotary power tool. In addition, the cutting device or cutting head may be removably coupled to the housing of the power tool accessory and may be used by itself as a hand tool or may be coupled to and usable with a separate manual hand tool. These and other advantages and features will be apparent from the description and the drawings.

BRIEF DESCRIPTION OF THE DRAWINGS

FIG. 1E is a top view of another embodiment of a manual hand tool for cutting a tubular member.

FIG. 1F is a top view of the hand tool of FIG. 1E with its housing halves separated.

FIGS. 2-7 are perspective views of an embodiment of a power tool accessory for cutting a tubular member.

FIG. 31A is a side view of the cutting head of FIGS. 30A-30F with a tubular member moved into the opening and pressed against the carriages.

FIG. 43 is a side view of the cutting head of FIG. 39 with the tubular member of FIG. 41 in a locked position in the cutting head.

DETAILED DESCRIPTION

Figure 1A:
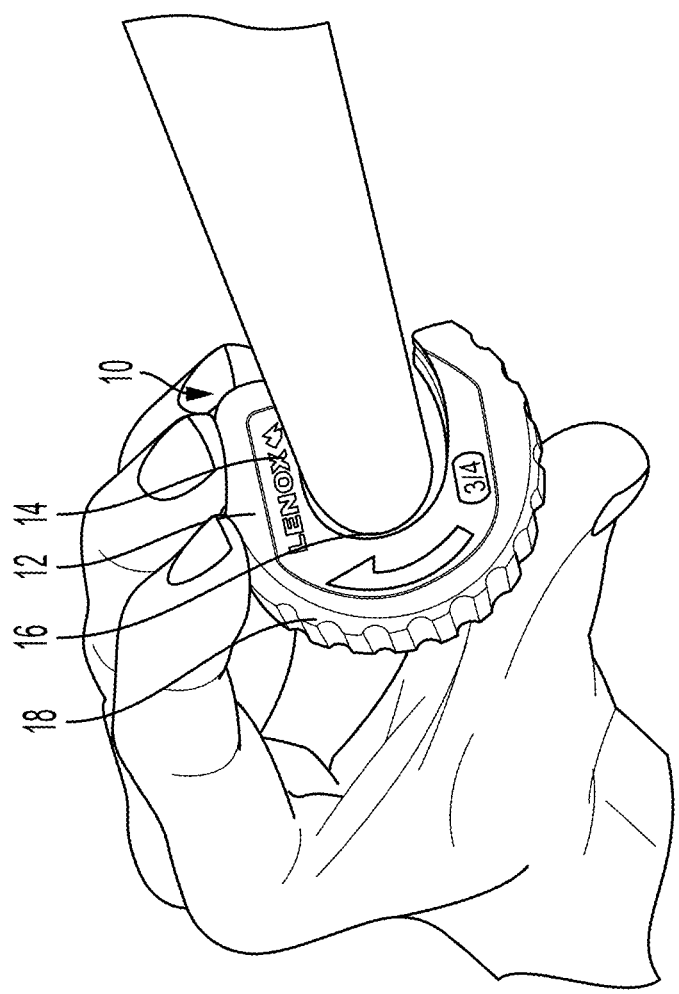
FIG. 1A is a perspective view of a manual hand tool for cutting a tubular member in the form of a puck-shaped cutting head.
Figure 1B:
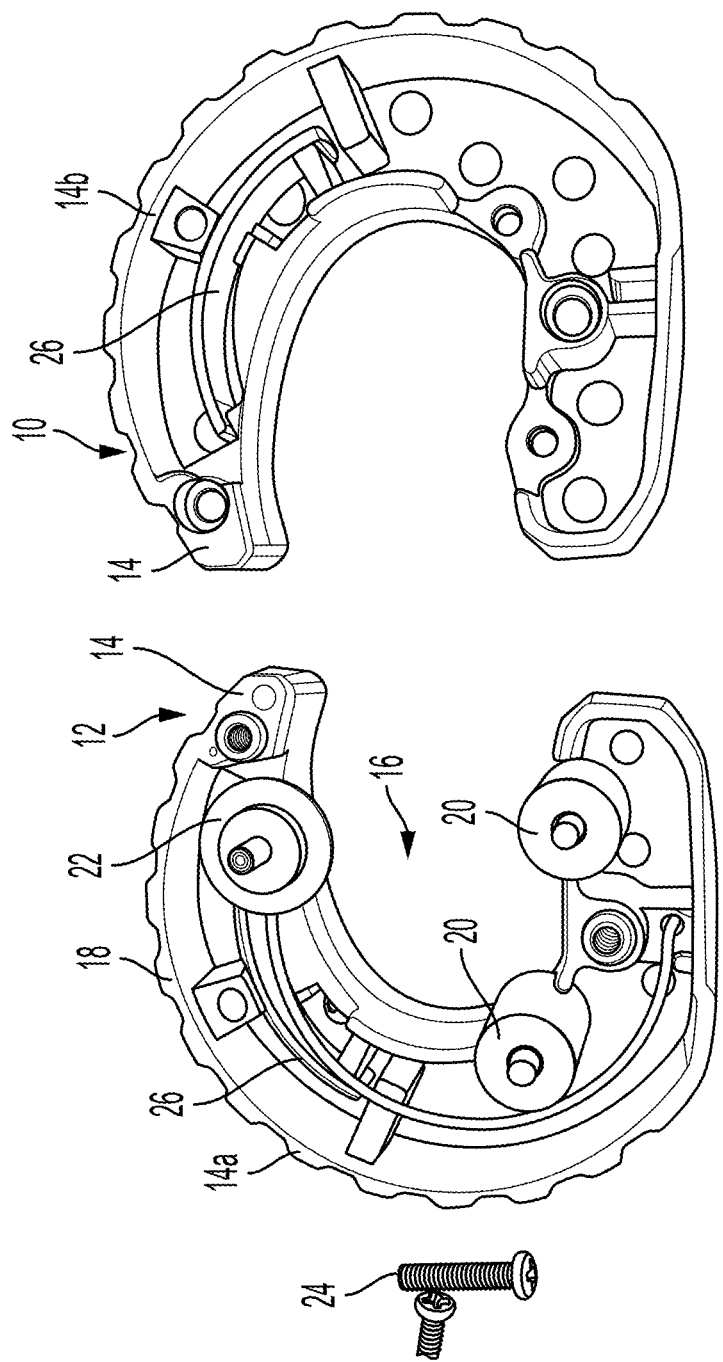
FIG. 1B is a top view of the cutting device of FIG. 1A with its casing halves separated.
Figure 1D:
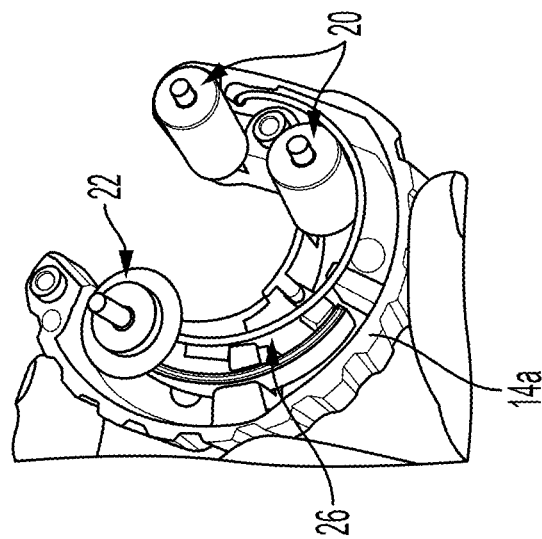
FIGS. 1C and 1D are perspective views of one of the casing halves of the cutting device of FIGS. 1A-1B.
Figure 1C:
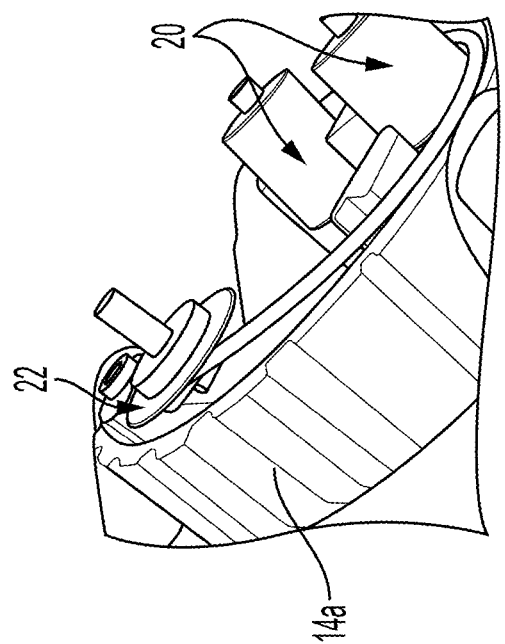
Figure 2:
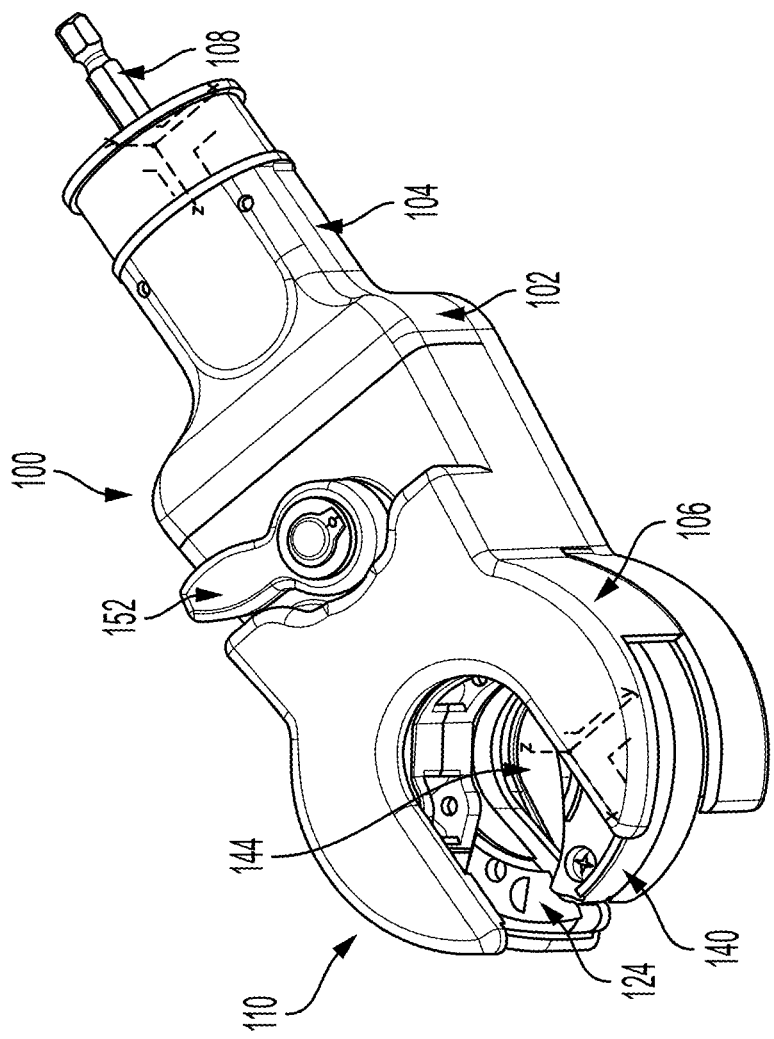
Figure 5:
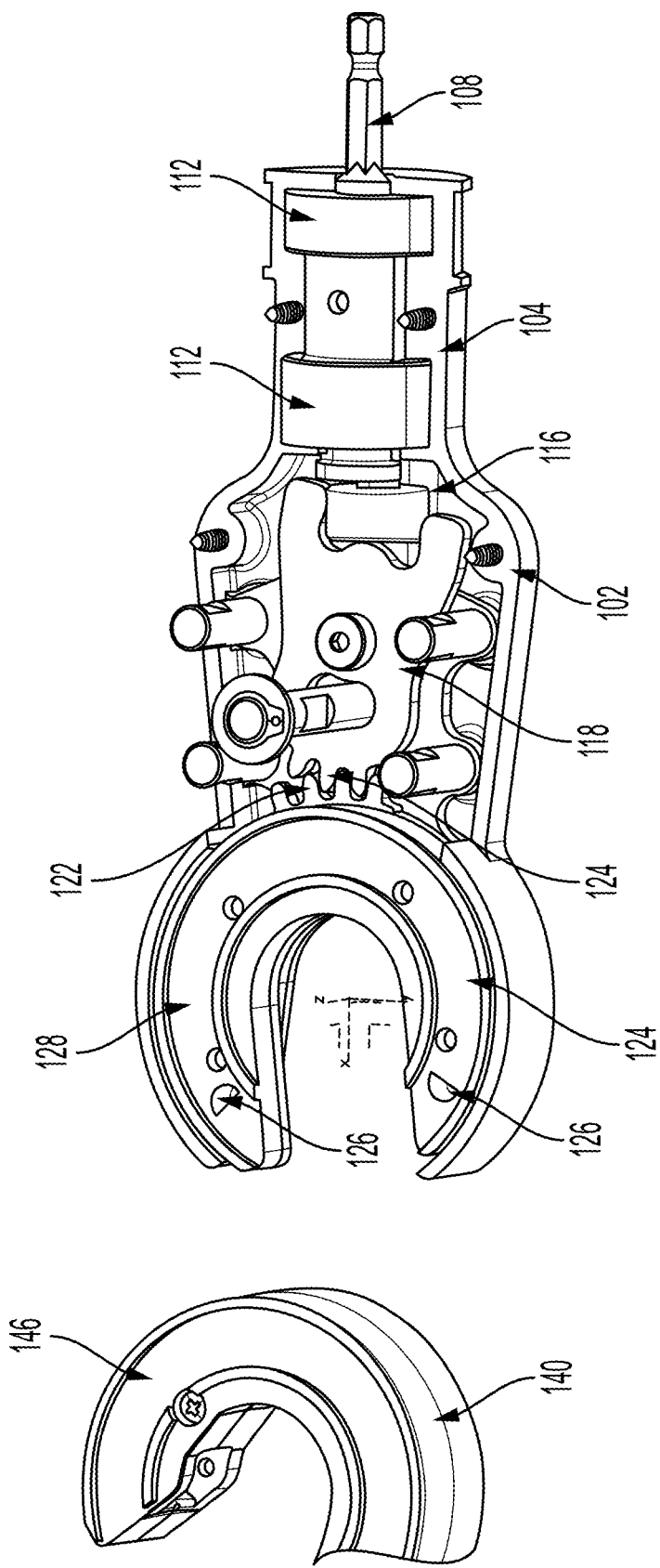
Figure 6:
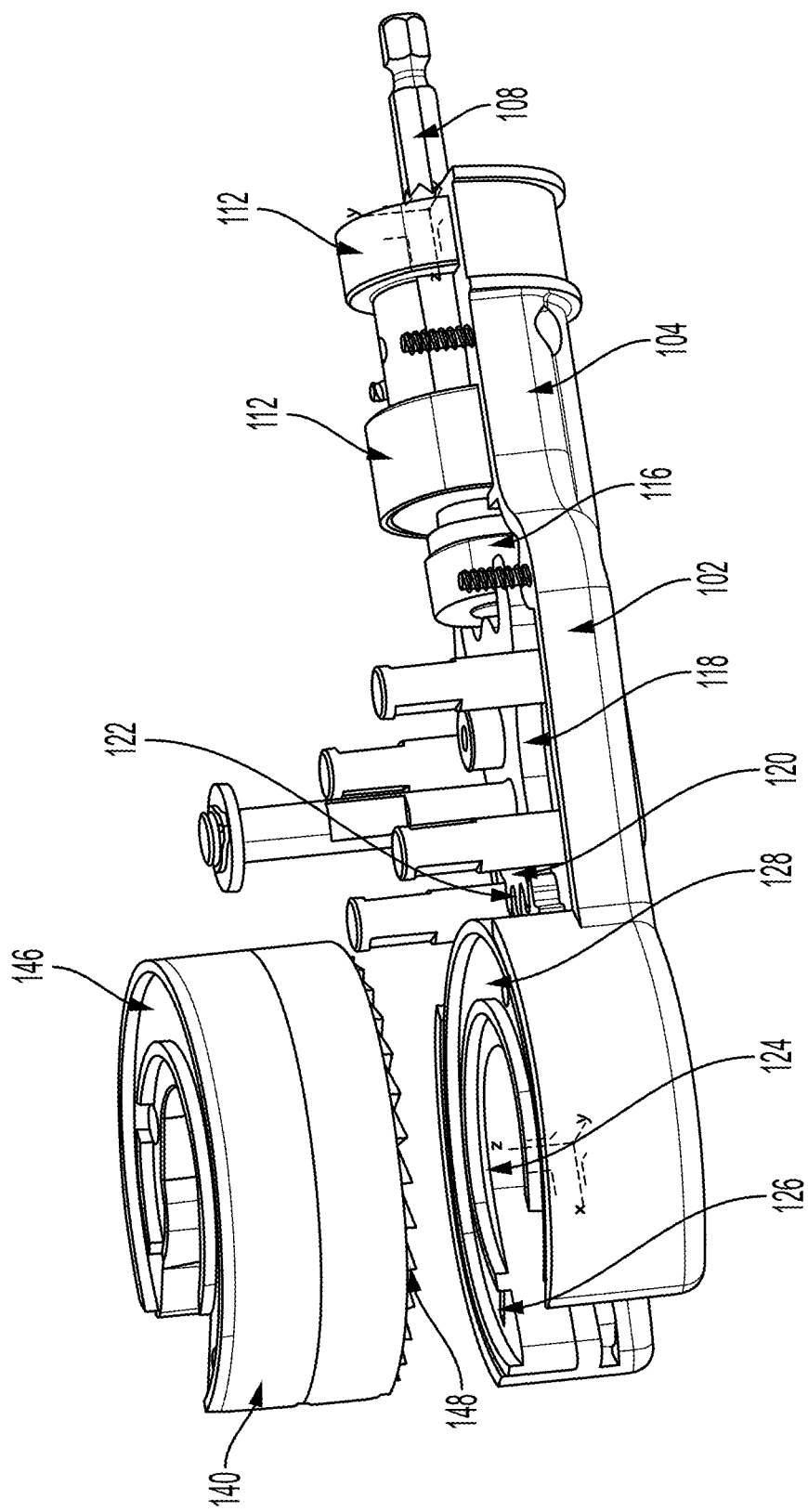
Figure 7:
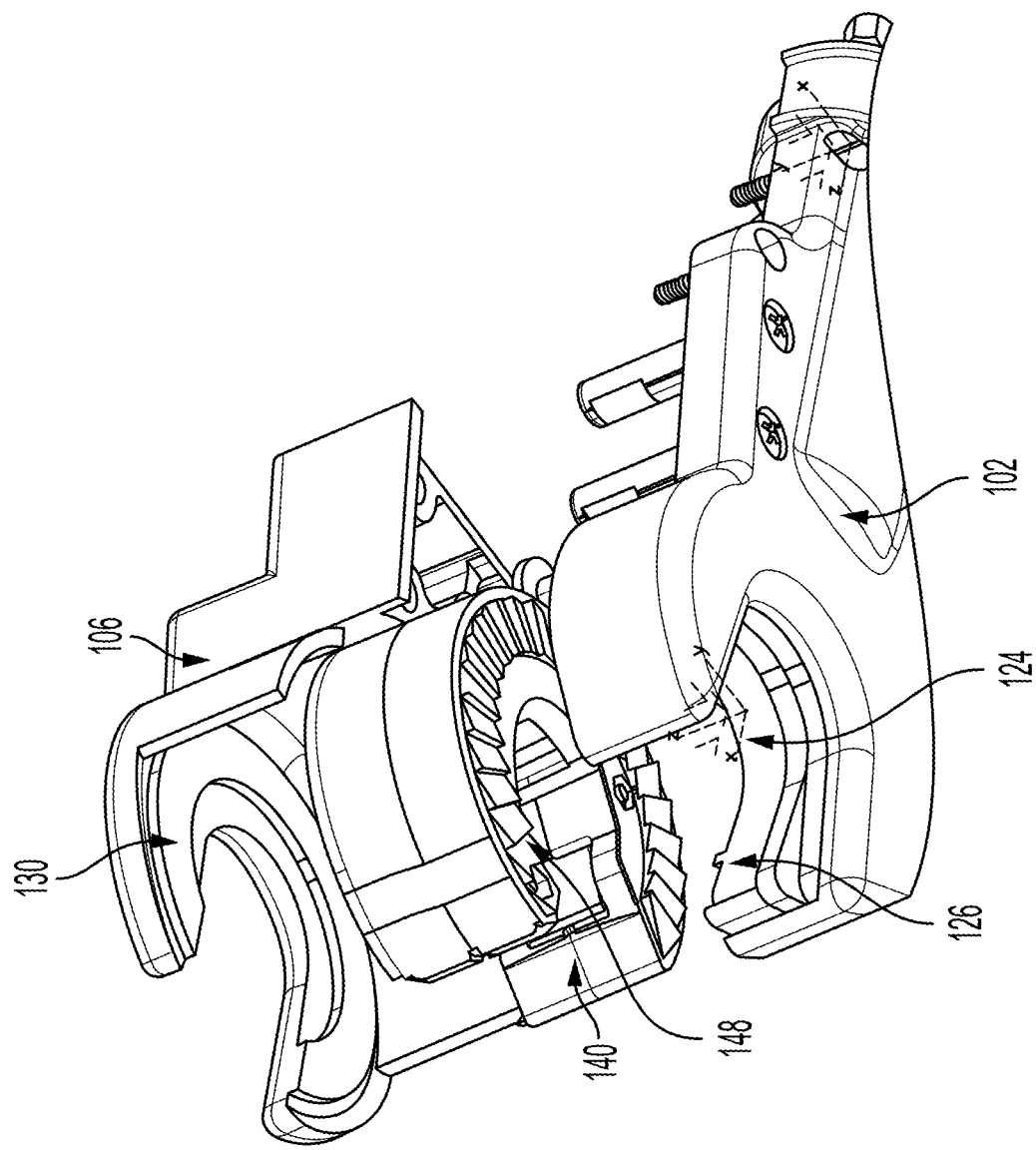
Figure 8B:
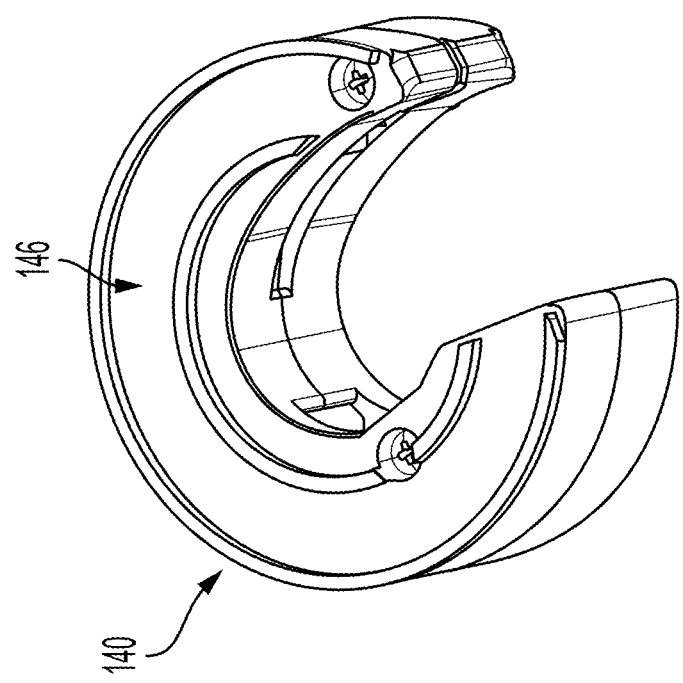
FIGS. 8A-8B are perspective views of a cutting head for use with the power tool accessory of FIGS. 2-7.
Figure 8A:
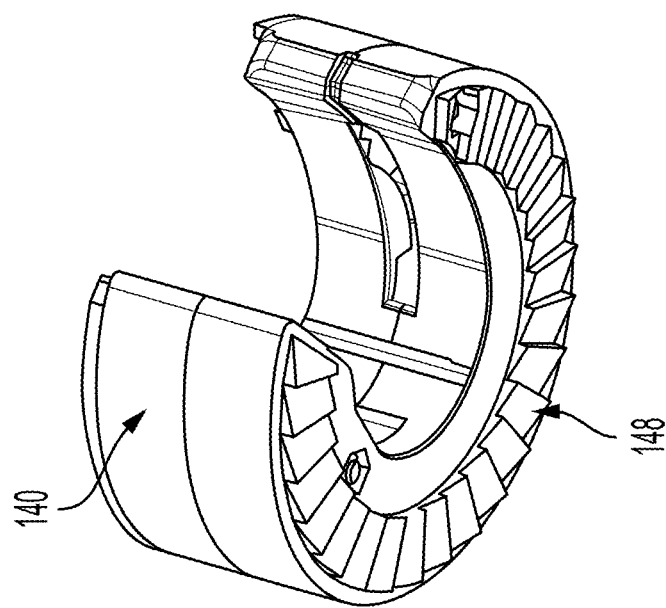
Figure 9:
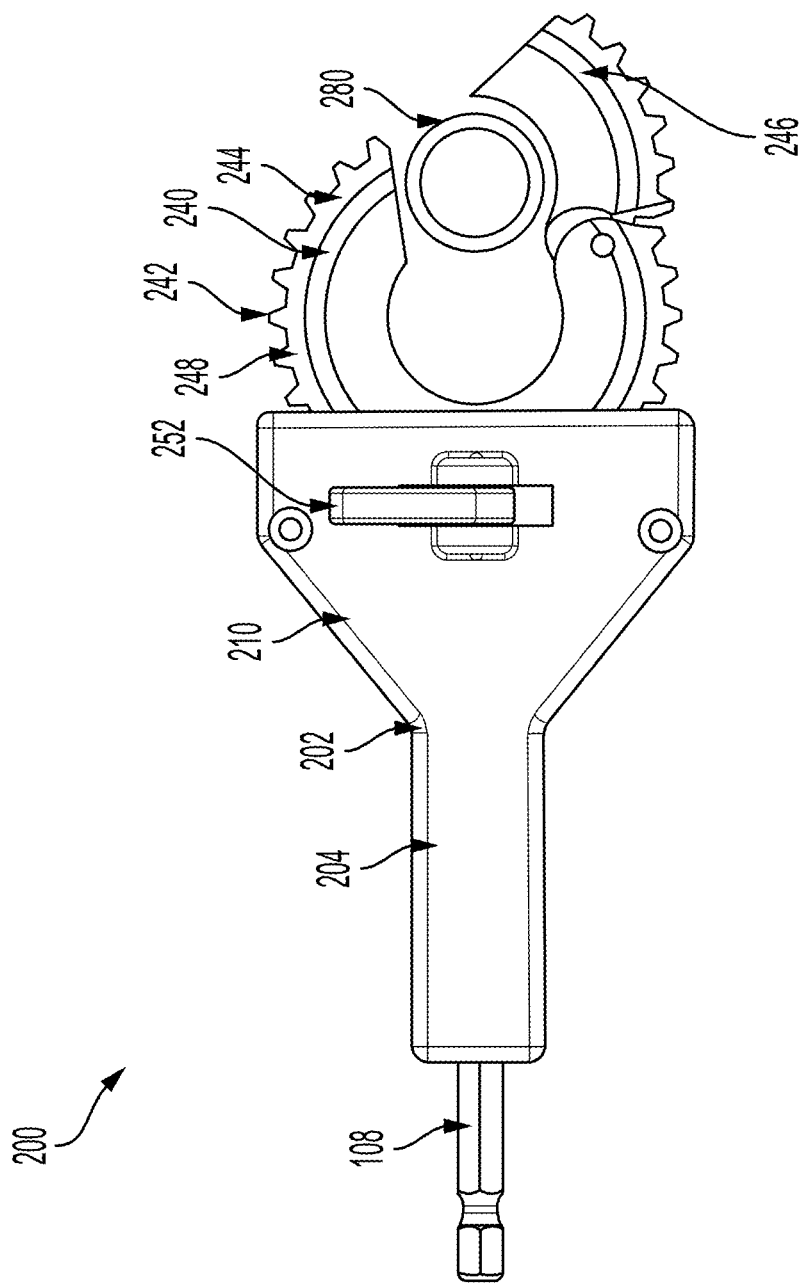
FIGS. 9-10 are top views of another embodiment of a power tool accessory for cutting a tubular member.
Figure 10:
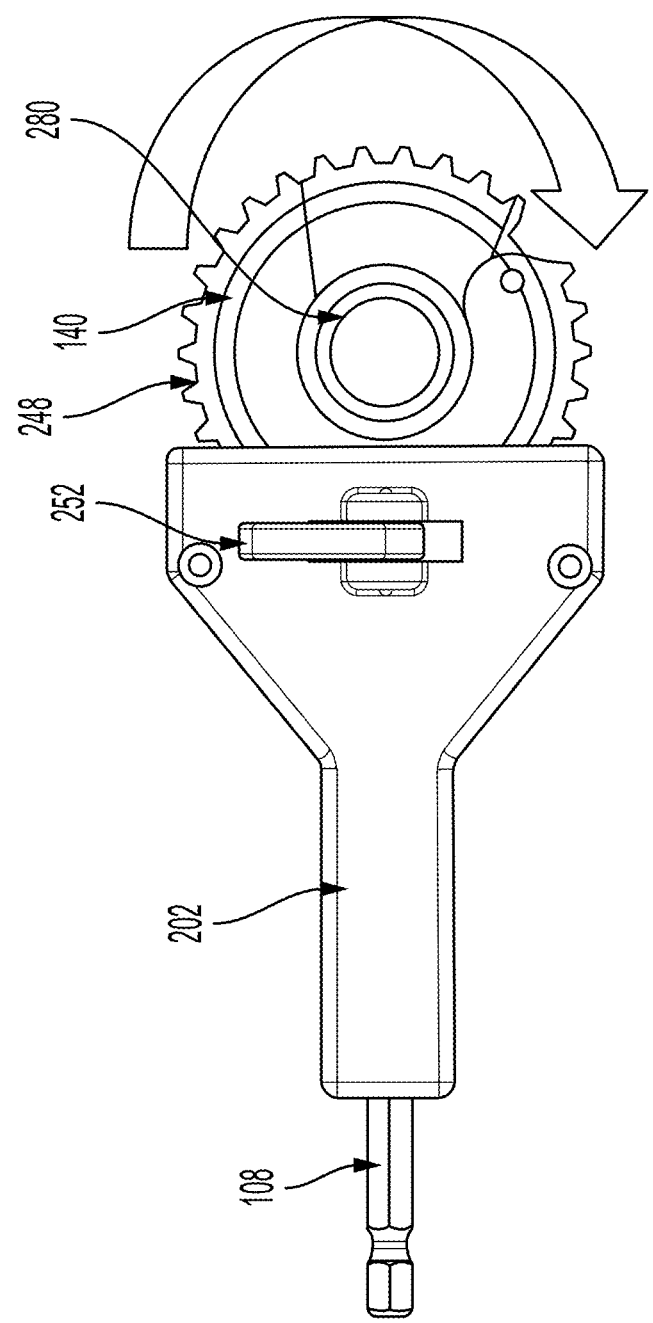
Figure 11:
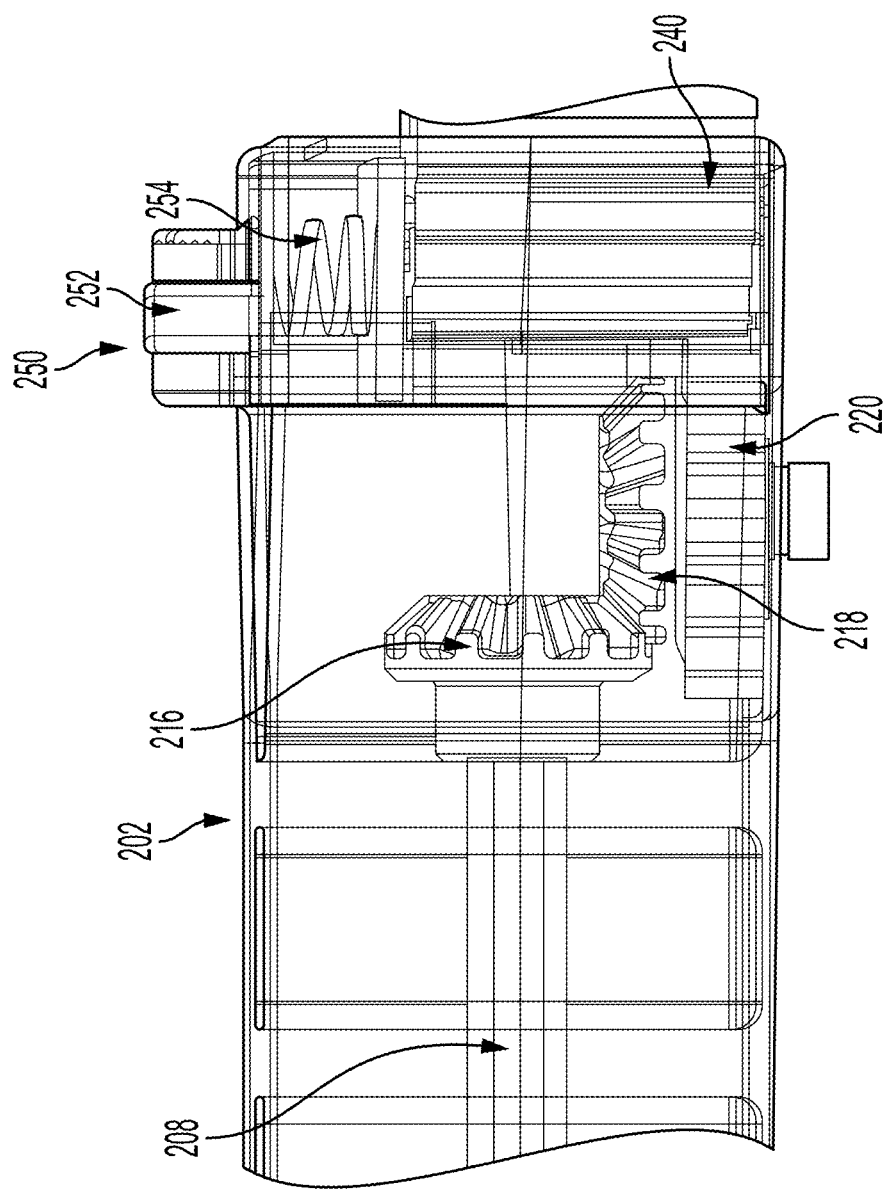
FIG. 11 is a side view, partially in phantom, of the power tool accessory of FIGS. 9-10.
Figure 12:
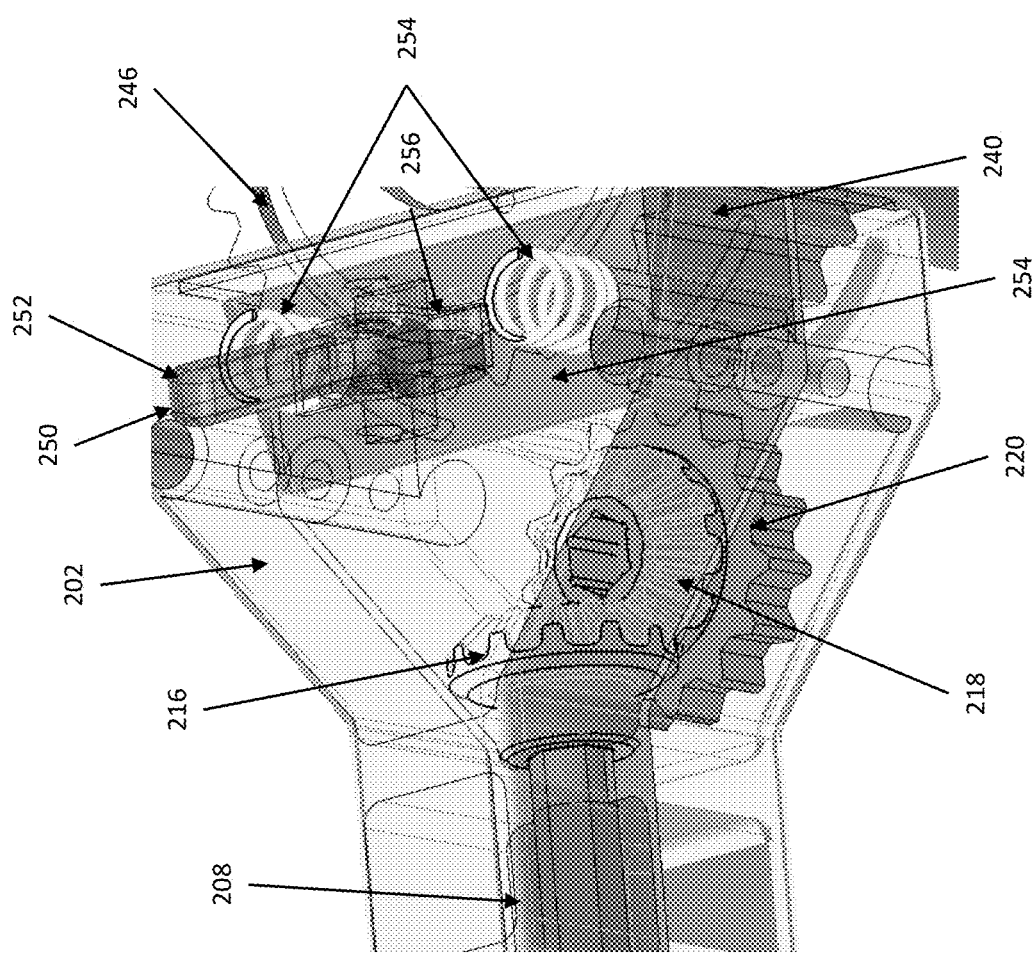
FIG. 12 is a perspective view, partially in phantom, of the power tool accessory of FIGS. 9-10.
Figure 13:
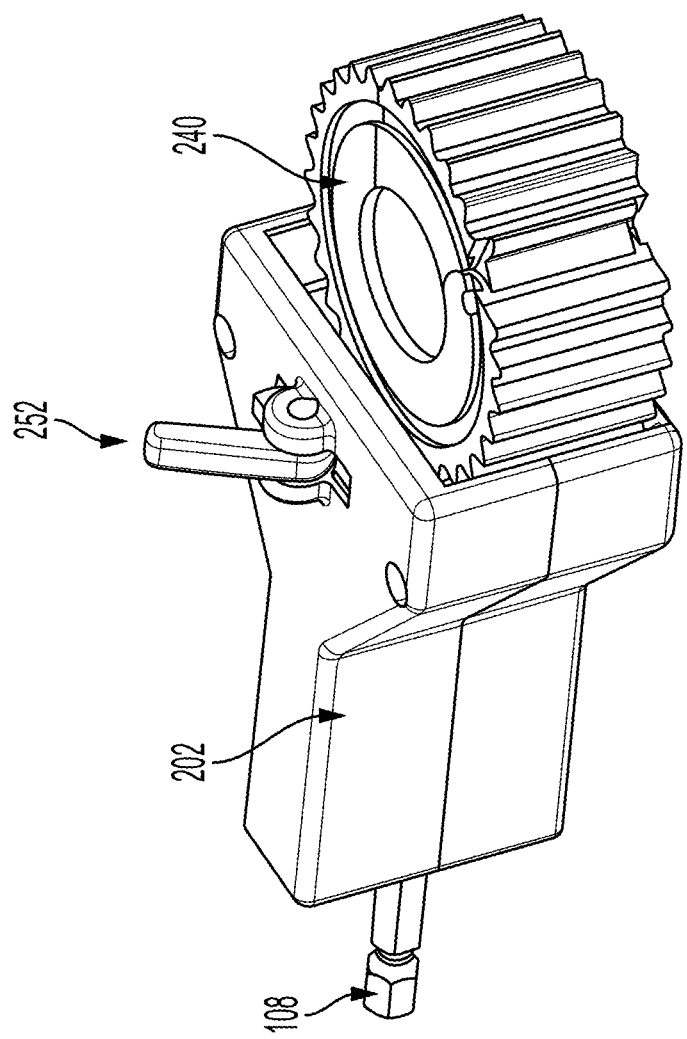
FIGS. 13-14 are perspective views of the power tool accessory of FIGS. 9-10.
Figure 14:
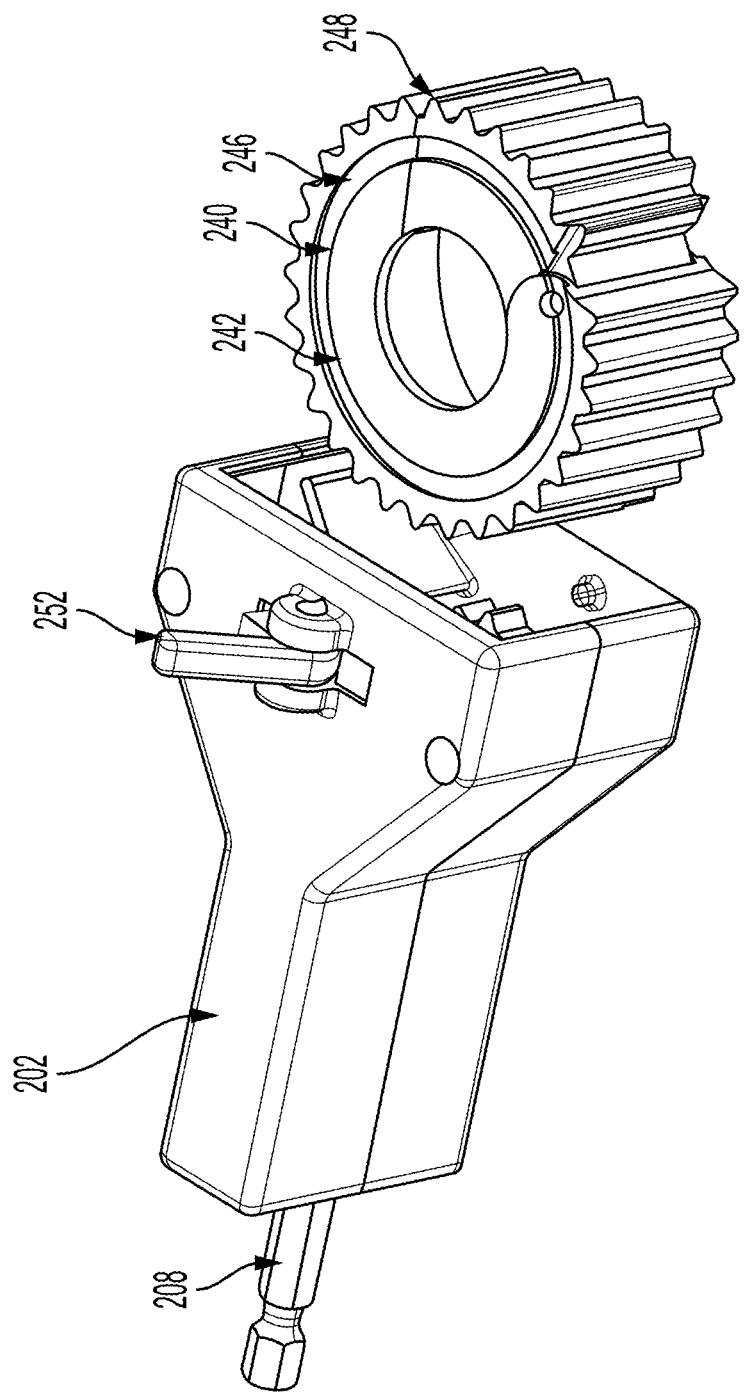
Figure 16:
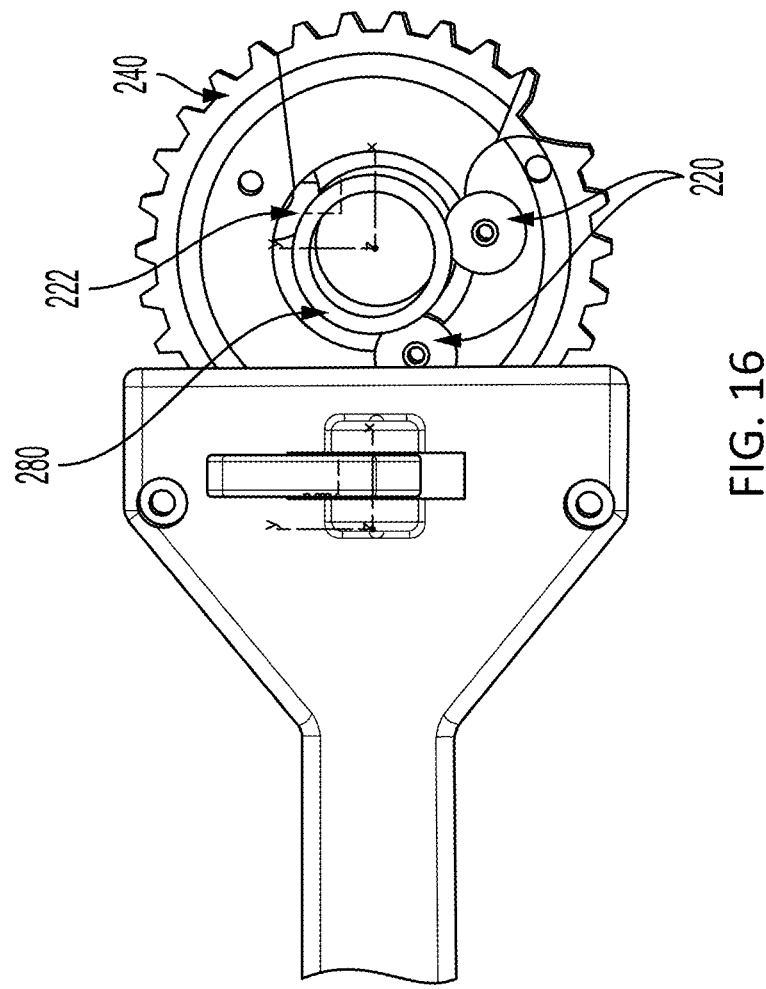
FIG. 16 is a top view of the power tool accessory of FIGS. 9-10.
Figure 15:
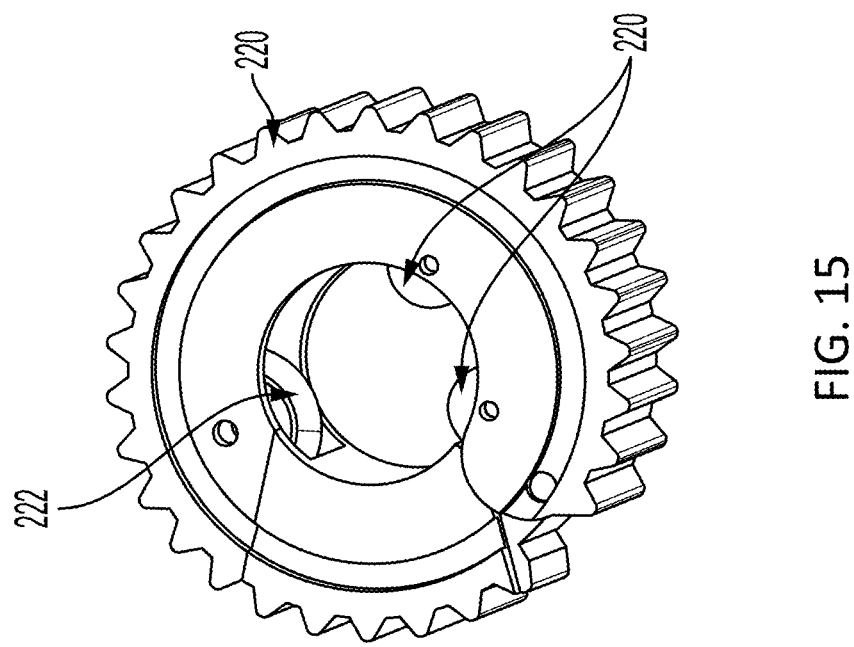
FIG. 15 is a perspective views of a cutting head for use with the power tool accessory of FIGS. 9-10.
Figure 17B:
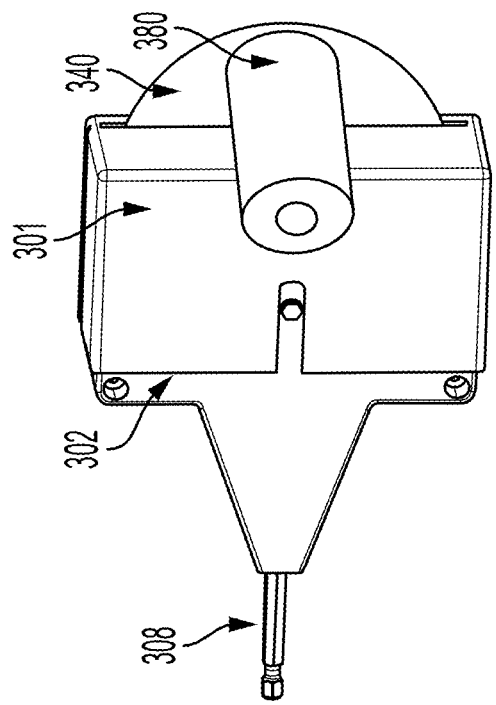
FIGS. 17A-17B are perspective views of another embodiment of a power tool accessory for cutting a tubular member.
Figure 17A:
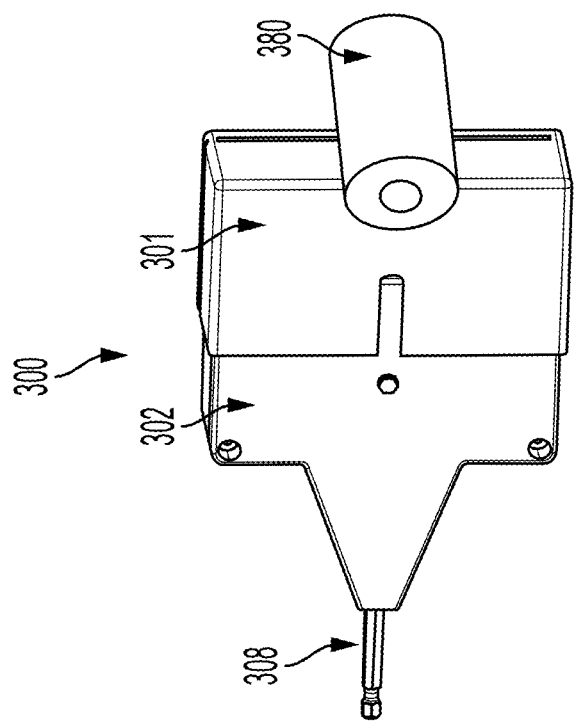
Figure 18A:
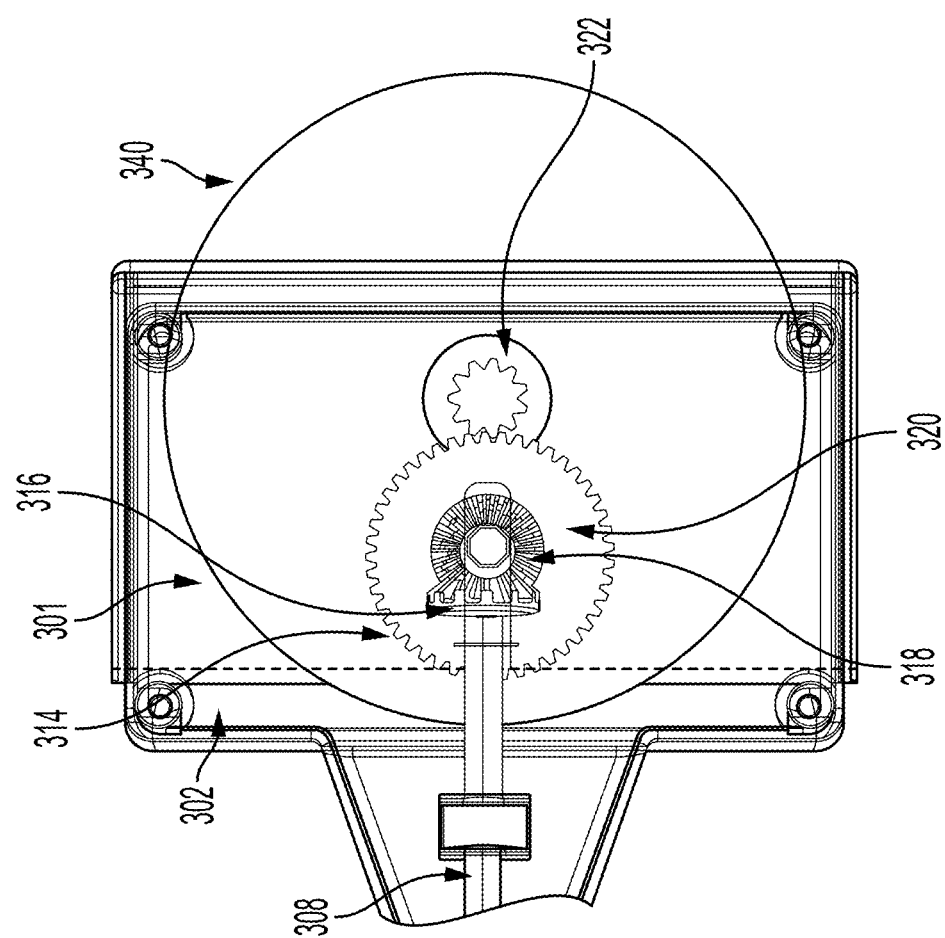
FIG. 18A is a top view, partially in phantom, of the power tool accessory of FIGS. 17A-17B.
Figure 18B:
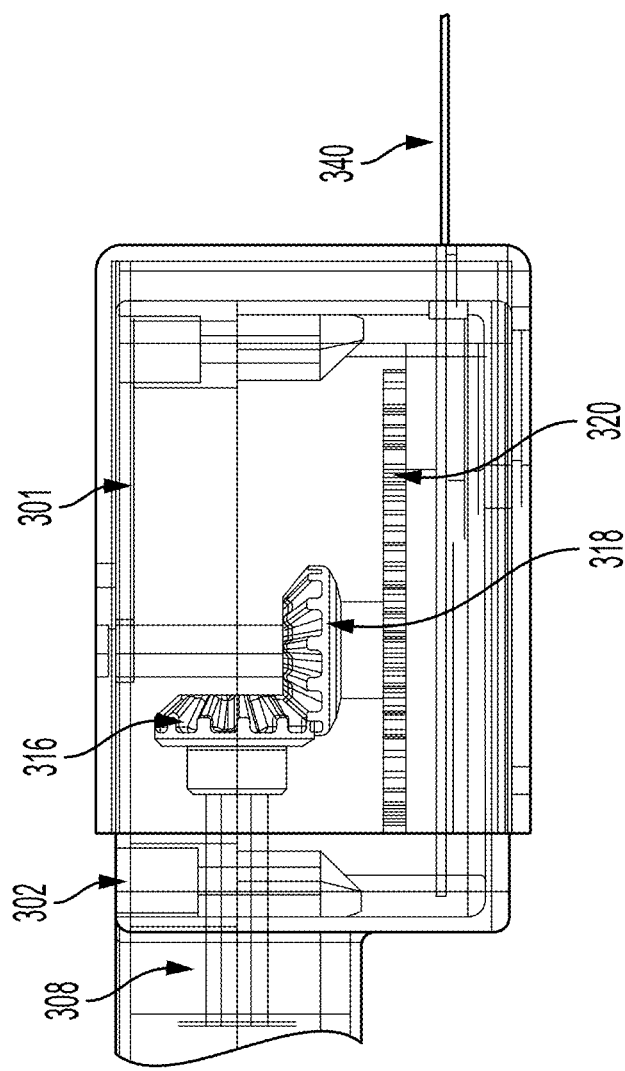
FIG. 18B is a side view, partially in phantom, of the power tool accessory of FIGS. 17A-17B.
Figure 19:
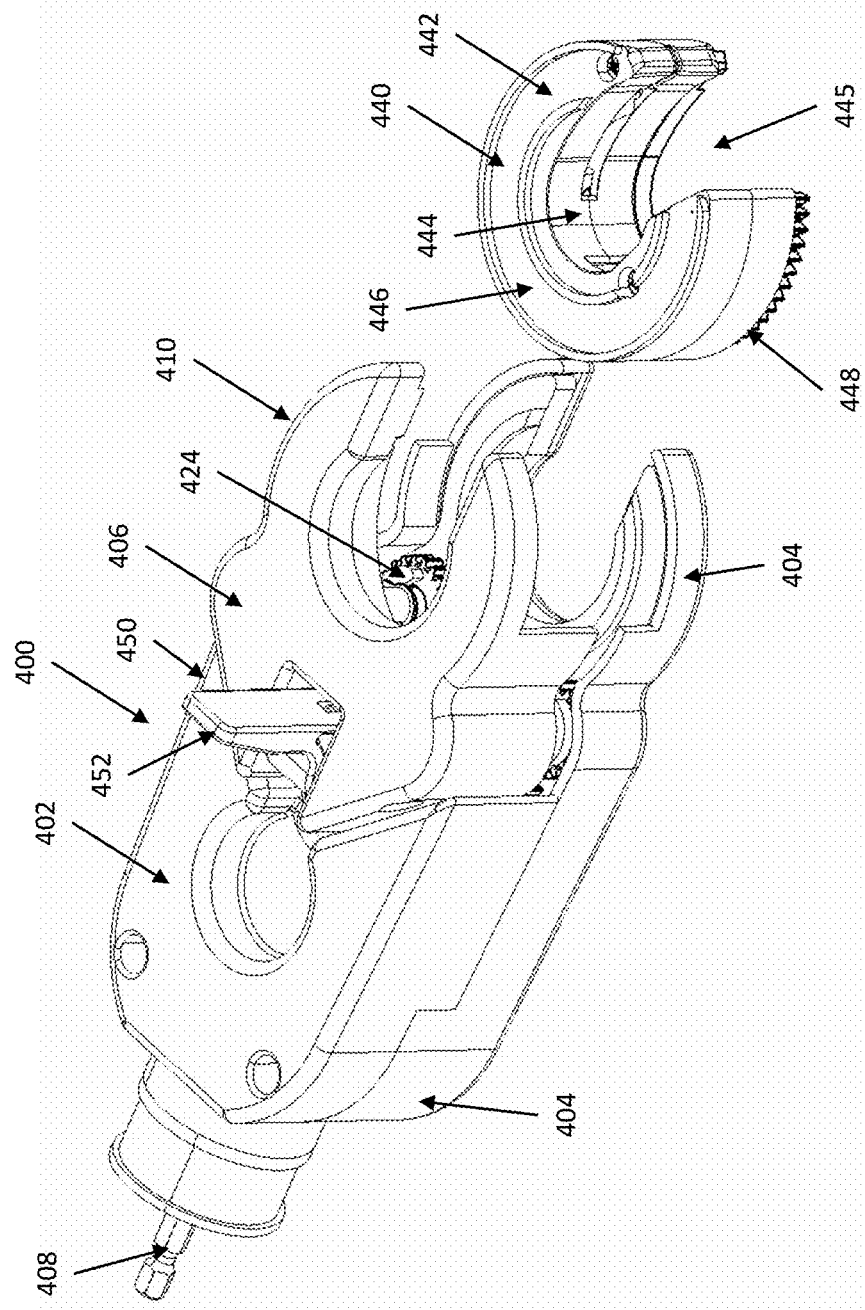
FIGS. 19-20 are perspective views of another embodiment of a power tool accessory for cutting a tubular member.
Figure 20:
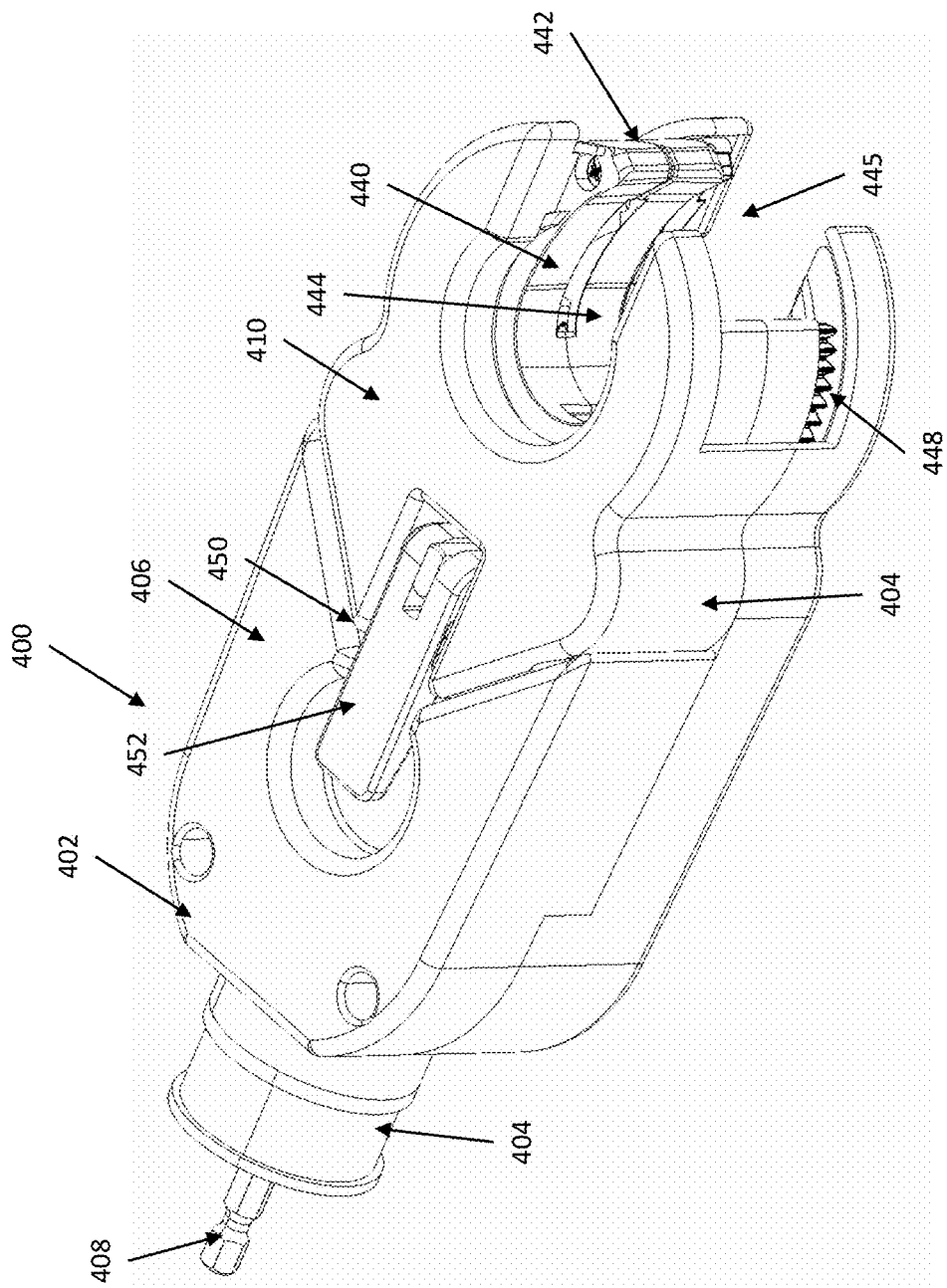
Figure 21:
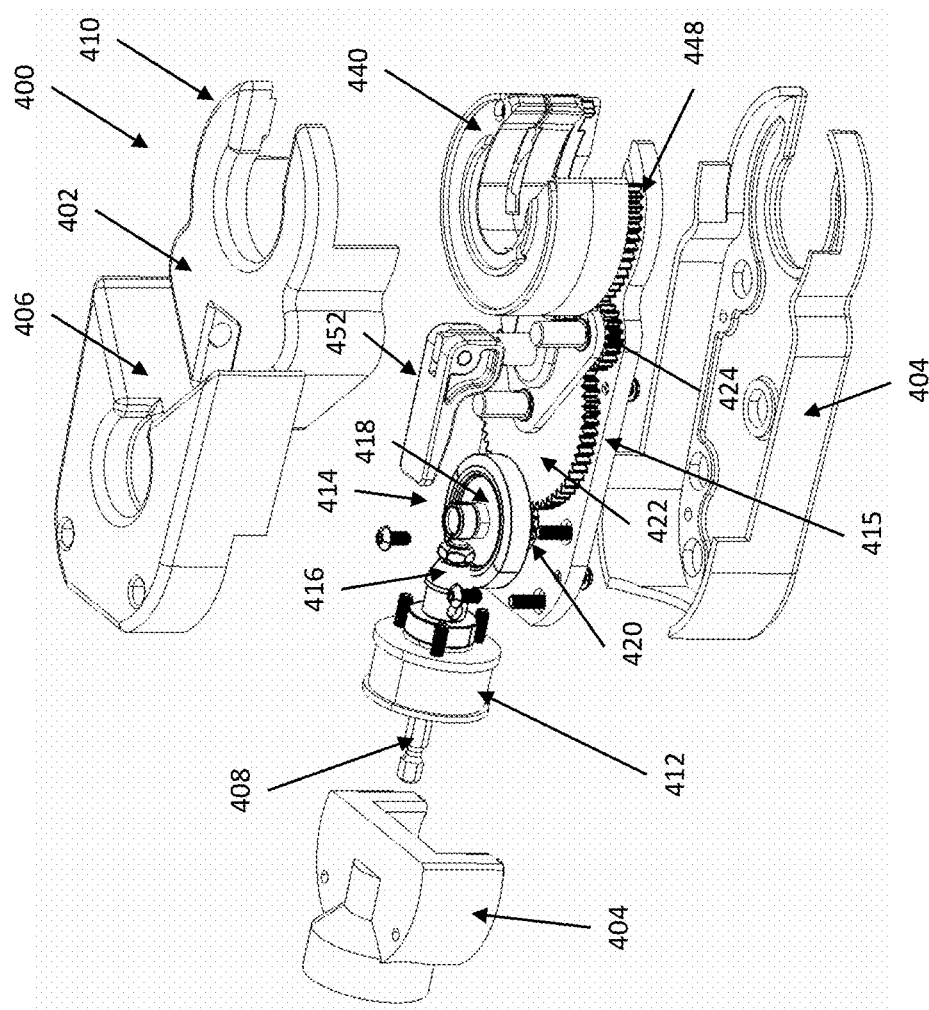
FIG. 21 is an exploded view of the power tool accessory of FIGS. 19-20.
Figure 22:
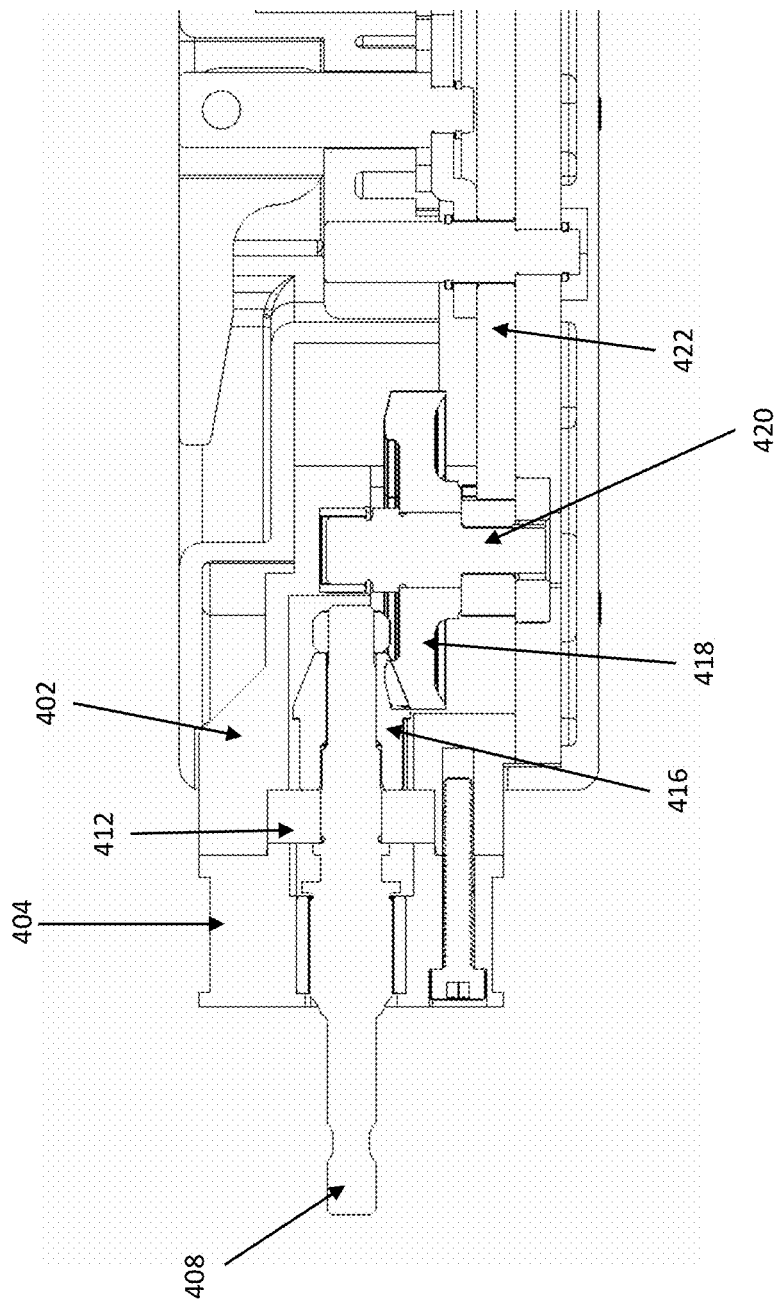
FIG. 22 is a side cross-sectional view of the power tool accessory of FIGS. 19-20.
Figure 23:
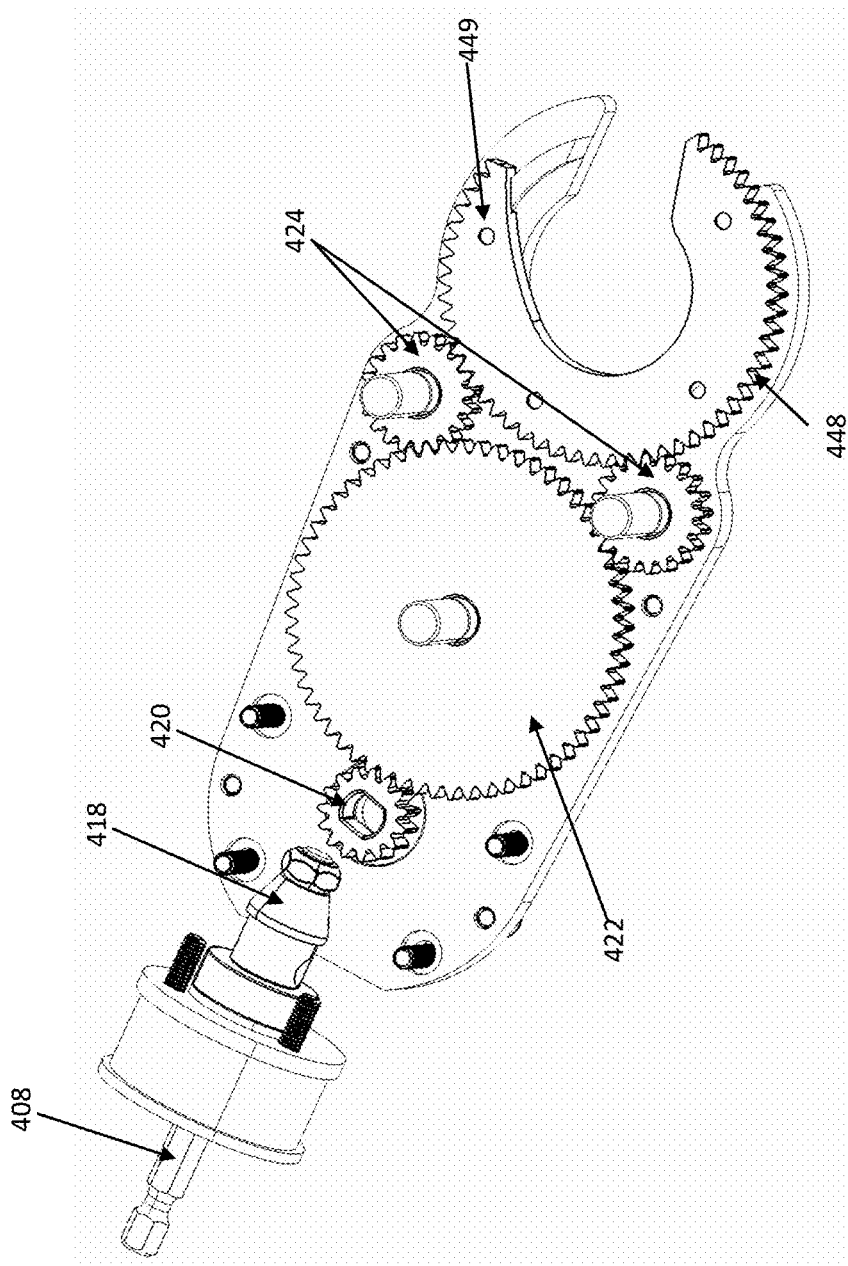
FIG. 23 is an internal perspective view of the transmission of the power tool accessory of FIGS. 19-20.
Figure 24B:
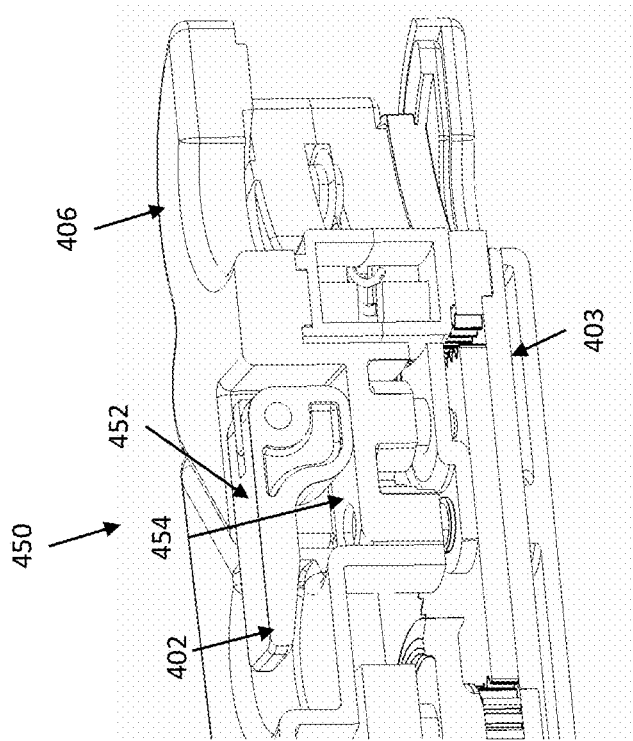
FIGS. 24A-24B are cross-sectional perspective views of the clamping mechanism of the power tool accessory of FIGS. 19-20.
Figure 24A:
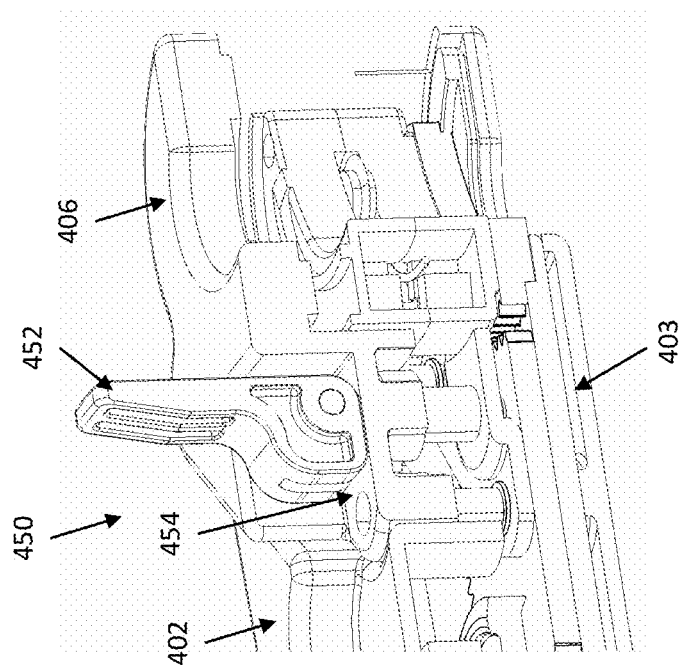
Figure 25:
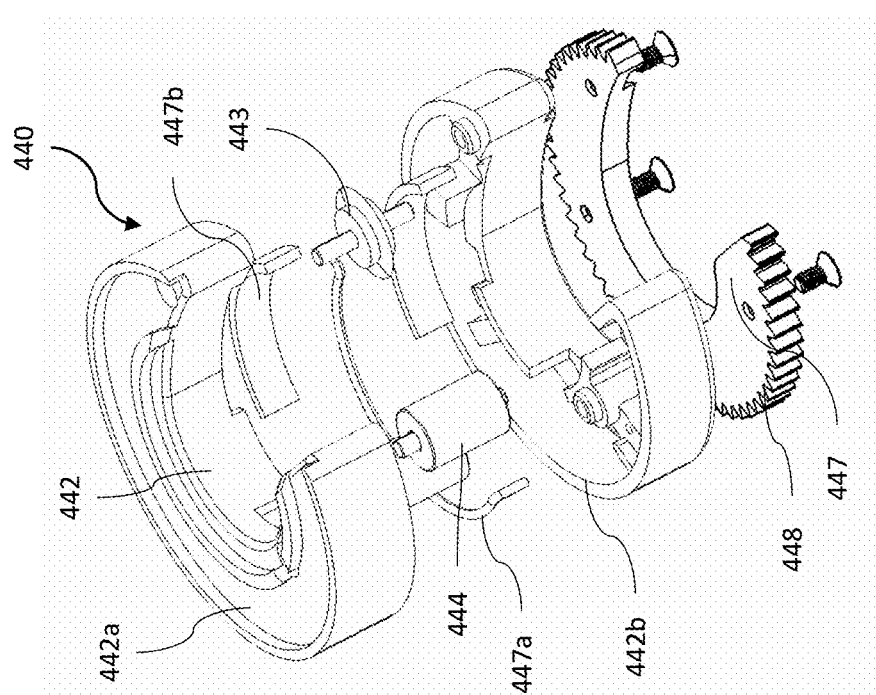
FIG. 25 is an exploded perspective view of the cutting head of the power tool accessory of FIGS. 19-20.
Figure 26:
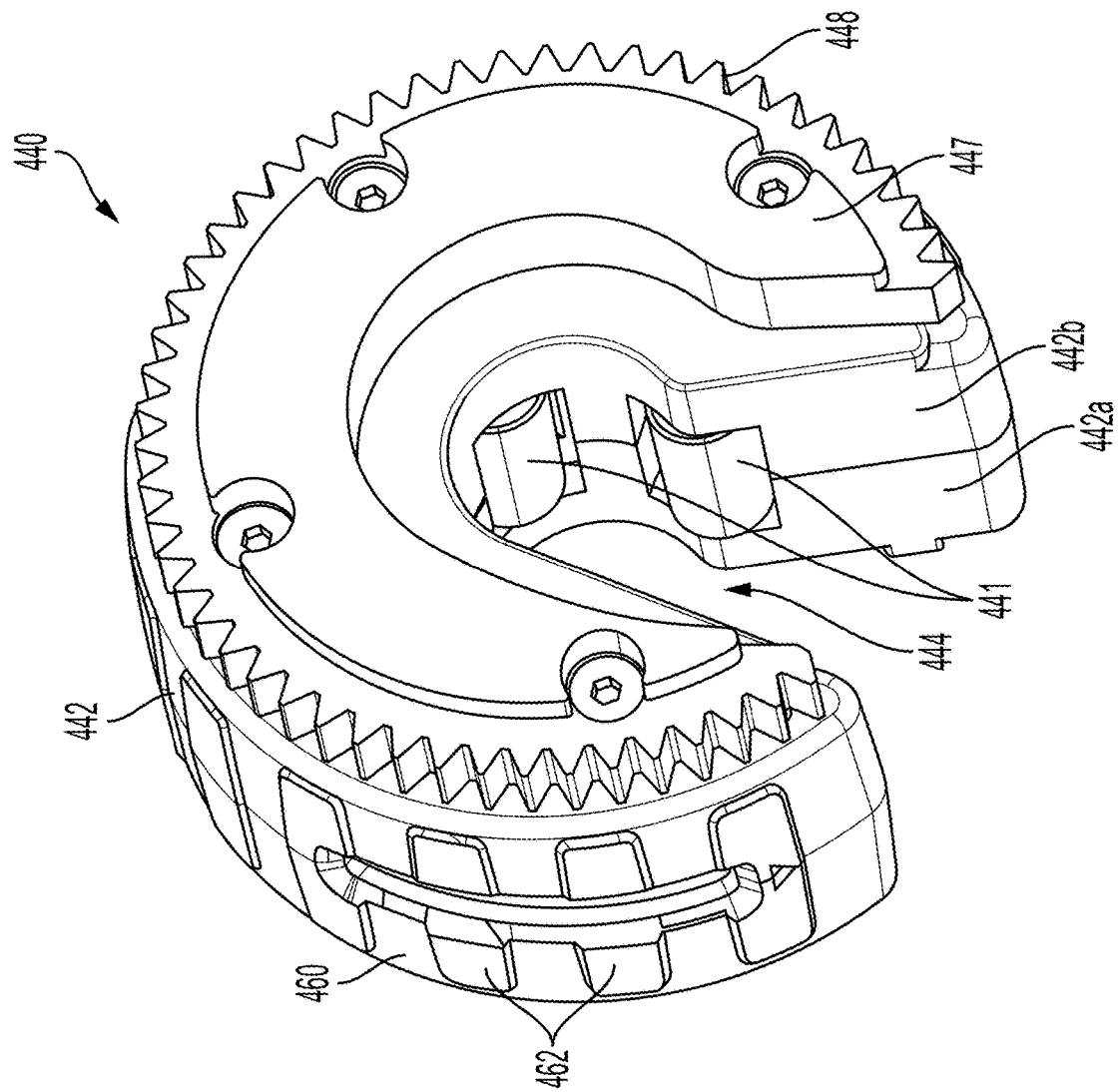
FIG. 26 is an assembled perspective view of the cutting head of the power tool accessory of FIGS. 19-20.

Referring to FIGS. 1A-1D, in an embodiment, a manually operated hand tool 10 (e.g., similar to a LENOX 14831TS34 hand tool) may be used for cutting tubular members, such as pipes. The hand tool 10 comprises a puck-shaped cutting head or puck 12 with a C-shaped casing 14 having a central opening 16 and a plurality of gripping surfaces 18 on its periphery. The casing has two casing halves 14a, 14b joined together by threaded fasteners 24. The casing 14 carries at least one roller 20 (e.g., a pair of rollers 20) and at least one cutting wheel or blade 22 that each at least partially extend radially inward into the central opening 16. The cutting wheel or blade 22 and/or the rollers 20 are biased radially inward toward a center of the casing by two leaf springs 26. A tubular member or pipe 28 can be received in the central opening between the rollers and cutting wheel or blade. As the cutting head 12 is rotated by hand about its central axis X, the cutting wheel or blade cuts the tubular member or pipe 28 that is received in the central opening.

Referring to FIGS. 1E-1F, in another embodiment, a manual operated hand tool 30 (e.g., similar to an Irwin IRHT81736 pipe cutter) may be used to cut tubular members, such as a pipes. The hand tool 30 includes a housing 32 with a handle 34 and a working head 36 that receives a C-shaped cutting head or puck 40. The housing 32 includes a bottom housing portion 32a and a top housing portion 32b with the puck 40 sandwiched between the housing portions. The C-shaped cutting head 40 is similar to the C-shaped cutting head 12 described above, with the following differences. Like the cutting head 12, the cutting head 40 has a C-shaped casing 42 with a central opening 44 and at least one roller and at least one cutting wheel or blade that each at least partially extend radially inward into the central opening 44 and are biased in a radially inward direction by leaf springs. A tubular member or pipe to be cut can be received in the central opening with the rollers and cutting blade engaging the tubular member. Unlike the cutting head 12, the C-shaped casing 42 of the cutting head 40 has a circumferential track or groove 46 with at least one (e.g., two) spring biased ratchet pawls 48. The bottom housing portion 32b has ratcheting teeth 50 that engage spring biased ratchet pawls 48 on the cutting head so that when the handle is rotated back and forth about the central opening, the cutting head moves in a ratcheting manner in one direction and the blade cuts the pipe.

Referring to FIG. 2-8B, in another embodiment, a power tool accessory 100 for cutting tubular members, such as pipes, includes a housing 102 having a handle 104 and a movable cover 106. The housing 102 has a U-shaped working head portion 110 that removably receives a C-shaped cutting head 140 having a similar configuration as the C-shaped cutting head 40 described above with respect to FIGS. 1E-1F, with the following differences. Like the cutting head 40, the cutting head 140 has a C-shaped casing 142 with a central opening 144 and at least one roller and at least one cutting wheel or blade (not shown) that each at least partially extend radially inward into the central opening 144 and are biased in a radially inward direction by leaf springs. The C-shaped casing 142 also has a circumferential track 146 on a top surface. Unlike the cutting head 40, the cutting head 140 has a plurality of one-way ratchet teeth 148 on an opposite bottom surface. Alternatively, the ratchet teeth may be formed integrally on an outer periphery of the cutting head.

The housing 102 receives an input shaft 108 that can be coupled to and driven in rotation by a drill, impact driver, or other rotary power tool. The input shaft 108 is supported by two bearings 112 in the handle 104 and is drivingly coupled to the cutting head via a ratcheting transmission 114. The ratcheting transmission 114 includes an eccentric member 116 at one end of the input shaft 108 received in a recess of a wobble plate 118. At its front end the wobble plate 118 has several driving gear teeth 120 that engage several driven gear teeth 122 on a ratchet wheel 124. The ratchet wheel 124 has two half-moon shaped ratchet driving pawls 126 that engage the one-way ratchet teeth 148 on the bottom surface of the cutting head 140. The ratchet wheel 124 has a track 128 in which the ratchet teeth 148 on the cutting head ride. The cover 106 includes a top track 130 that receives the track 146 on the top surface of the cutting head 140 to prevent the cutting head from moving laterally when it rotates about its axis.

In use, a tubular member to be cut is received in the central opening 144 and the input shaft 108 is coupled to an output of a rotary power tool. When the input shaft is rotated by the rotary power tool, the eccentric wobbles causing the wobble plate to oscillate. The driving teeth on the wobble plate engage the driven teeth on the ratchet wheel, causing the ratchet wheel to oscillate. The ratchet pawls on the ratchet wheel engage the one-way ratchet teeth on the cutting head to cause the cutting head to rotate in one direction in a ratcheting manner to cut a tubular member. In an alternative embodiment, the ratchet pawls may be disposed on the casing of the cutting head (similar to the cutting head 40 described above) and the ratchet teeth may be disposed on the ratchet wheel.

The cover 106 includes a clamping mechanism 150 that can be actuated to lift the cover 106 away from the housing 102 by unlocking the cam locking mechanism 150 with a cam lock lever 152. Referring to FIGS. 4A-4B, the cam lock lever 152 is coupled to a cam lock 154 that enables the cover to be lifted. This allows the cutting head to be removed and changed, enabling cutting heads having different interior sizes to be coupled to the working head for cutting tubular members of different diameters. The cutting head can also be ratcheted or rotated by hand to cut a pipe when it is removed from the housing. Alternatively, the cutting head may be removed from the housing and used by itself has a manual hand tool, similar to the hand tool shown in FIGS. 1A-1D and/or may be attached to a hand tool housing similar to the hand tool housing shown in FIGS. 1E-1F.

Referring to FIGS. 9-16, in another embodiment, a power tool accessory 200 for cutting tubular members, such as pipes, includes a housing 202 having a handle 204 and a working head portion 210. The housing 202 receives an input shaft 208 that can be coupled to and driven in rotation by a drill, impact driver, or other rotary power tool. The input shaft 208 is supported by a bearing 212 in the handle 204 and is drivingly coupled to a transmission 214. The transmission 214 includes an input right angle gear 216, which drives an intermediate right angle gear 218. The intermediate right angle gear 218 is mounted on a common shaft with an output gear 220.

The working head portion 210 removably receives a cutting member or cutting head 240 having a similar configuration as the C-shaped cutting heads 10, 40, 140 described above, with the following differences. The cutting head 240 has a circumferential casing 242 with a pivoting door 246 and a central opening 244. The door 246 that can pivot open to receive a pipe in the central opening 244. At least one roller 220 and at least one cutting wheel or blade 222 that each at least partially extend radially inward into the central opening 244 and are biased in a radially inward direction by leaf springs. The casing 242 also has a circumferential track 246 on one or both of the top surface and the bottom surface and a plurality of gear teeth 248 formed on an outer periphery of the casing 242. The cutting head is receivable in the working head portion 210 of the housing 202 so that the gear teeth 248 on the cutting head 240 mesh with the teeth on the output gear 220 of the transmission. Thus, rotation of the input shaft 208 causes rotation of the cutting head about its center axis.

The cutting head is removably held in place in the body by a clamping mechanism 250 similar to the clamping mechanism 150 described above. The clamping mechanism includes a camming latch 252 that presses downward against a plate 254 that carries one or more pins 256 that engages the track 246 in the cutting head 240. A pair of springs 254 push the plate away from the cutting head unless the latch 252 is in its locked position, pressing the plate toward the cutting head. When the latch is closed, the one or more pins 256 are pressed into the track 246 on the cutting head 240 and ride in the track so that the cutting head is retained in the housing as the cutting head rotates.

In use, a tubular member or pipe 280 is received in the central opening by opening and closing the door on the cutting head. The input shaft is coupled to a rotary power tool. As the rotary power tool causes the input shaft to rotate, the cutting head rotates and the cutting wheel or blade cuts into the pipe. Alternatively, the cutting head may be removed from the housing and used by itself has a manual hand tool, similar to the hand tool shown in FIGS. 1A-1D and/or may be attached to a hand tool housing similar to the hand tool housing shown in FIGS. 1E-1F.

Referring to FIGS. 17A-18B, in another embodiment, a power tool accessory 300 for cutting tubular members 380, such as pipes, includes an input shaft 308 that can be coupled to and driven in rotation by a drill, impact driver, or other rotary power tool. The input shaft 308 is received in a rear end of base or housing 302 and a retractable sheath 301 received over the base and biased by a spring (not shown) away from the input shaft. The input shaft 308 is coupled to a transmission 314 that includes pair of right angle gears (an input right angle gear 316 and an output right angle gear 318). The output right angle gear 318 is mounted on a common shaft with a large spur gear 320, which meshes with a small spur gear 322 to facilitate a speed reduction. The small spur gear 322 is coupled to an output shaft to which a removable cutting wheel or blade 340 is mounted, e.g., in a manner similar to a circular saw or an angle grinder. The transmission is configured to increase rotational speed from the input shaft to the cutting wheel or blade. The cutting wheel or blade 340 may comprise an abrasive wheel, such as an abrasive cutting wheel or blade used with angle grinders. In use, the input shaft is coupled to an impact driver and then the sheath is pressed against a pipe and retracts, while the cutting wheel or blade is used to cut the pipe. The sheath may include a recess in its front end to better retain or locate the pipe relative to the sheath and the cutting wheel or blade.

Referring to FIGS. 19-26, in another embodiment, a power tool accessory 400 for cutting tubular members, such as pipes, includes a housing 402 having a stationary bottom portion 403 and a moveable cover 406. Together, the housing defines a handle 404 and a U-shaped working head portion 410. The housing 402 receives an input shaft 408 that can be coupled to and driven in rotation by a drill, impact driver, or other rotary power tool. The input shaft 408 is supported by a bearing 412 in the handle 404 and is drivingly coupled to a transmission 414. The transmission 414 includes an input right angle gear 416, which drives an output right angle gear 418. The output right angle gear 418 is mounted on a common shaft with a first spur gear 420 having a small diameter and number of teeth. The first spur gear 420 meshes with a second spur gear 422 having a larger diameter and number of teeth to facilitate a speed reduction. The second spur gear 422 meshes with at least two smaller idler gears 424 that are separated from one another by a distance greater than width of a front opening in the C-shaped cutting head or puck, as described below. The components of the transmission 414 are supported on a support plate 415 that is received in the bottom portion or base 404 of the housing 402.

The working head portion 410 removably receives a C-shaped cutting head or puck 440 having a similar configuration as the C-shaped cutting heads 10, 40, 140 described above, with the following differences. The cutting head 440 has a C-shaped casing 442 with a central opening 444 and a front opening 445 having a width less than a distance between the idler gears 424. The casing 442 has a two casing halves 442a, 442b carrying at least one roller 441 and at least one cutting wheel or blade 443 that each at least partially extend radially inward into the central opening 444 and are biased in a radially inward direction by one or more leaf springs 447a, 447b. The C-shaped casing 442 also has a circumferential track 446 on a top surface and a gear teeth 448 on an opposite bottom surface. The gear teeth 448 may be formed on a separate gear plate 449 that is affixed to the casing 442 or may be integral with the casing 442. The cutting head is removably receivable in the working head portion 410 of the housing 402 so that the gear teeth 448 on the cutting head 440 mesh with the teeth on the idler gears 424 of the transmission. Rotation of the input shaft 408 causes rotation of the cutting head 440 about its center axis. Because the at least two idler gears 424 are separated by a distance greater than a width of the front opening, at least one of the idler gears 424 will always remain in mesh with the teeth 448 on the cutting head 440 during an entire 360 degree rotation about its axis. This will ensure that the cutting head continues to rotate smoothly regardless of its angular position.

The cutting head 440 is removably held in place in the body by a clamping mechanism 450 similar to the clamping mechanism 150 described above. The clamping mechanism includes a camming latch or lever 452 that presses downward against a top surface 454 of the cover 406. The cover also carries one or more pins (not shown) that engage the track 446 in the cutting head 440. One or more springs may bias the cover 406 away from the cutting head unless the latch 452 is in its locked position, pressing the plate toward the cutting head. When the latch is closed, the one or more pins are pressed into the track 446 on the cutting head 440 and ride in the track so that the cutting head stays in the housing. The cutting head 440 also includes a grip surface 460 (e.g., with a plurality of raised lozenges 462) on its outer periphery that allows the cutting head to be used as a manual hand tool, in a similar manner to the cutting head shown in FIGS. 1A-1D, when the cutting head is removed from the housing.

In use, a tubular member or pipe is received through the front opening into the central opening of the cutting head. The input shaft is coupled to a rotary power tool. As the rotary power tool causes the input shaft to rotate, the cutting head rotates and the cutting wheel or blade cuts into the pipe. Alternatively, the cutting head may be removed from the housing and used by itself has a manual hand tool, similar to the hand tool shown in FIGS. 1A-1D and/or may be attached to a hand tool housing similar to the hand tool housing shown in FIGS. 1E-1F.

Figure 27:
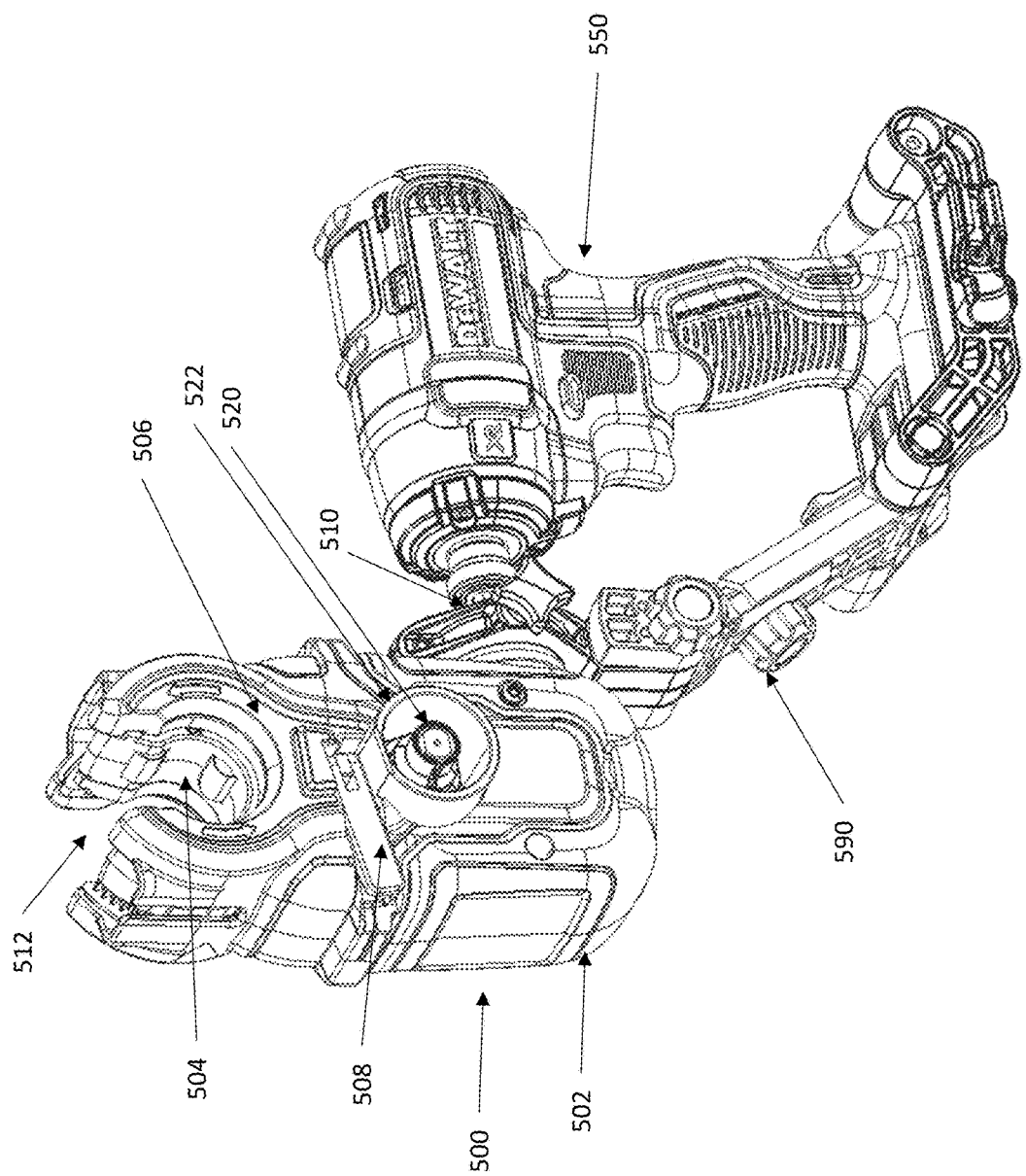
FIG. 27 is a perspective view of another embodiment of a power tool accessory for cutting a tubular member as attached to a power tool.

FIG. 27 is a perspective view of another embodiment of a power tool accessory 500 for cutting a tubular member (e.g., conduits, pipes, etc.) as attached to a power tool 550. In this example, the power tool 550 supports the power tool accessory 500 using a brace 590. The brace 590 may include the brace(s) as described in commonly owned, pending patent application U.S. Ser. No. 17/658,276, which is hereby incorporated by reference in its entirety. The power tool accessory 500 is similar to the power tool accessory 400 of FIGS. 19 and 20 with the following differences as described below.

The power tool accessory 500 includes a housing 502 (e.g., accessory housing), a cutting head 504 having a door 506, a latch 508 to lock the cutting head 504 in the housing 502, a reamer 520 (also referred to interchangeably as a deburring attachment), and a cylindrical wall 522 surrounding the reamer 520. In this example, the cutting head 504 is a removable, single size cutting head that can be removed and replaced with a different, single size cutting head depending on the size of the tubular member being cut, as discussed in detail above.

One difference between the power tool accessory 500 and the power tool accessory 400 is that the power tool accessory 500 includes both a cutting head 504 and a reamer 520. The reamer 520 is configured to remove the burrs on a tubular member after the cutting head 504 cuts the tubular member or for any tubular member that needs burrs removed. That is, the reamer 520 deburrs the tubular member. A transmission (examples of which are shown and described with respect to FIGS. 48-50, below, and in the embodiments described above) in the housing 502 includes a rotatable input member (e.g., in the form of one or more of the gears to which an input shaft is coupled in the transmission embodiments shown and described above and below) that is configured to be driven by an input shaft 510 that is received at least partially in a rear end portion of the housing 502. The transmission includes a rotatable input member configured to be driven by the input shaft 510, a first rotatable output member that rotatably drives the cutting head 504, and a second rotatable output member that rotatably drives the reamer 520. The cutting head 504 includes an opening 512 configured to receive a tubular member to be cut in the opening 512 (e.g., central opening) and to be rotatably driven by the first output member of the transmission. As discussed above with respect to power tool accessory 400, the cutting head 504 includes a cutting blade and a roller configured to protrude into the opening 512 with the cutting blade engaging the tubular member so that the cutting blade cut the tubular member as the cutting head 504 rotates about the tubular member in response to rotation of the input shaft 510. As discussed and illustrated in more detail below, the reamer 520 includes a stepped body with a deburring blade configured to be rotatably driven by the second out member of the transmission to remove burrs from an end of a tubular member, e.g., after it has been cut by the cutting head 504.

Figure 28:
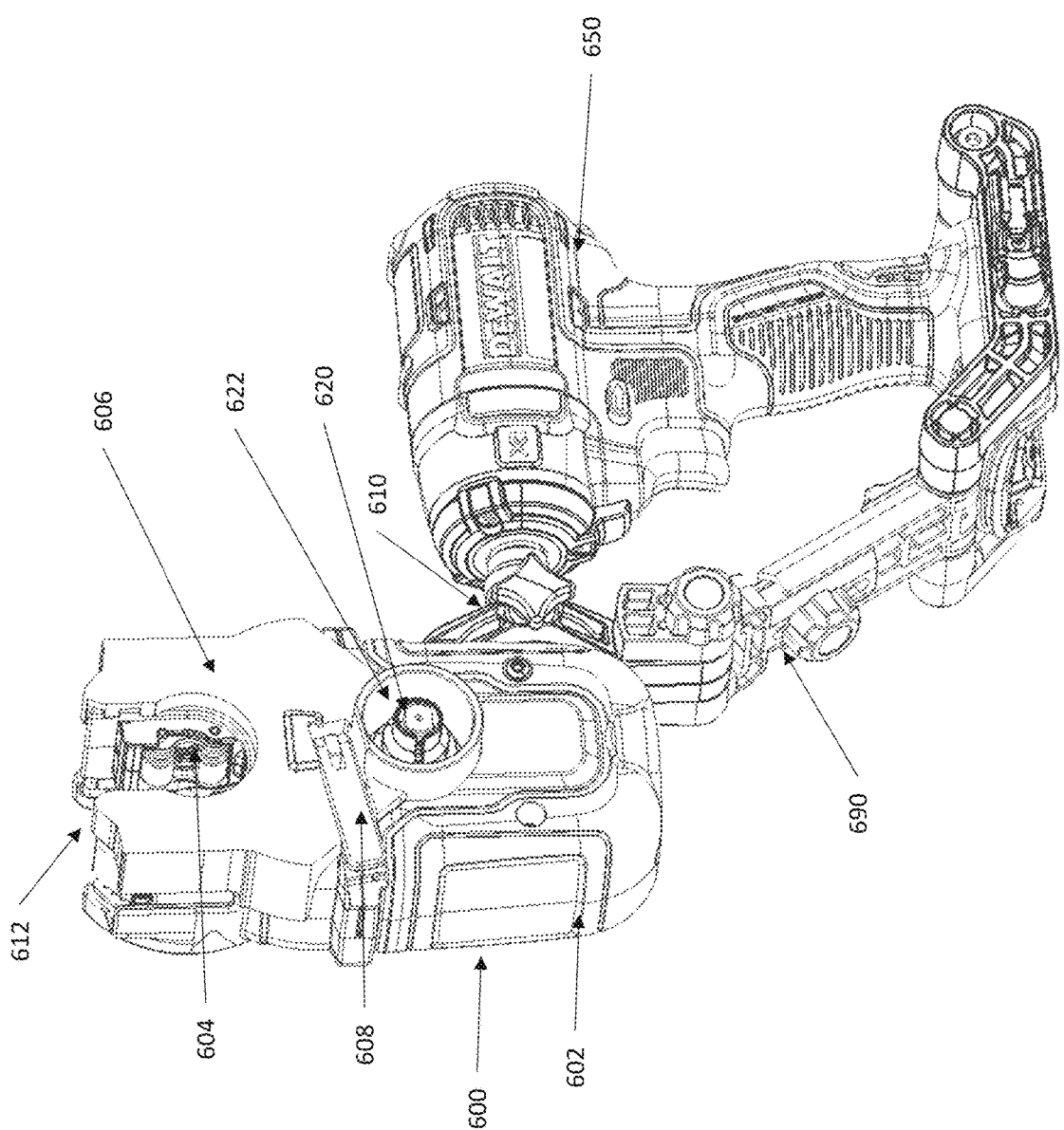
FIG. 28 is a perspective view of another embodiment of a power tool accessory for cutting a tubular member as attached to a power tool.

FIG. 28 is a perspective view of another embodiment of a power tool accessory 600 for cutting a tubular member as attached to a power tool 650. In this example, the power tool 650 supports the power tool accessory 600 using a brace 690. The brace 690 may include the brace(s) as described in commonly owned, pending patent application U.S. Ser. No. 17/658,276, which is hereby incorporated by reference in its entirety. The power tool accessory 600 is similar to the power tool accessory 400 of FIGS. 19 and 20 and power tool accessory 500 of FIG. 27 with the following differences as described below.

The power tool accessory 600 includes a housing 602 (e.g., accessory housing), a cutting head 604 having a door 606, a latch 608 to lock the cutting head 604 in the housing 602, a reamer 620, and a cylindrical wall 622 surrounding the reamer 620. In this example, one difference between the cutting head 504 of FIG. 27 and the cutting head 604 is that the cutting head 604 is a multiple size cutting head that can accommodate multiple, different sizes of tubular members being cut, as discussed in more detail below. The door 606 may be openable to replace or swap out the cutting head 504 of FIG. 27 with any of the above-described cutting heads or for other cutting heads.

Similar to the power tool accessory 500, the power tool accessory 600 includes both a cutting head 604 and a reamer 620. The reamer 620 is configured to remove the burrs on a tubular member after the cutting head 604 cuts the tubular member or for any tubular member that needs burrs removed. That is, the reamer 620 deburrs the tubular member. A transmission (examples of which are shown and described with respect to FIGS. 48-50, below, and in the embodiments described above)) in the housing 602 includes a rotatable input member that is configured to be driven by an input shaft 610 that is received at least partially in a rear end portion of the housing 602. The transmission includes a rotatable input member (e.g., in the form of one or more of the gears to which an input shaft is coupled in the transmission embodiments shown and described above and below) configured to be driven by the input shaft 610, a first rotatable output member that rotatably drives the cutting head 604, and a second rotatable output member that rotatably drives the reamer 620. The cutting head 604 includes an opening 612 configured to receive a tubular member in the opening 612 (e.g., central opening) and to be rotatably driven by the first output member of the transmission. As discussed above with respect to power tool accessory 400 and the power tool accessory 500, the cutting head 604 includes a cutting blade and a roller configured to protrude into the opening 612 with the cutting blade engaging the tubular member so that the cutting blade cut the tubular member as the cutting head 604 rotates about the tubular member in response to rotation of the input shaft 610. As discussed and illustrated in more detail below, the reamer 620 includes a stepped body with a deburring blade configured to be rotatably driven by the second out member of the transmission to remove burrs from an end of the tubular member.

Figure 29:
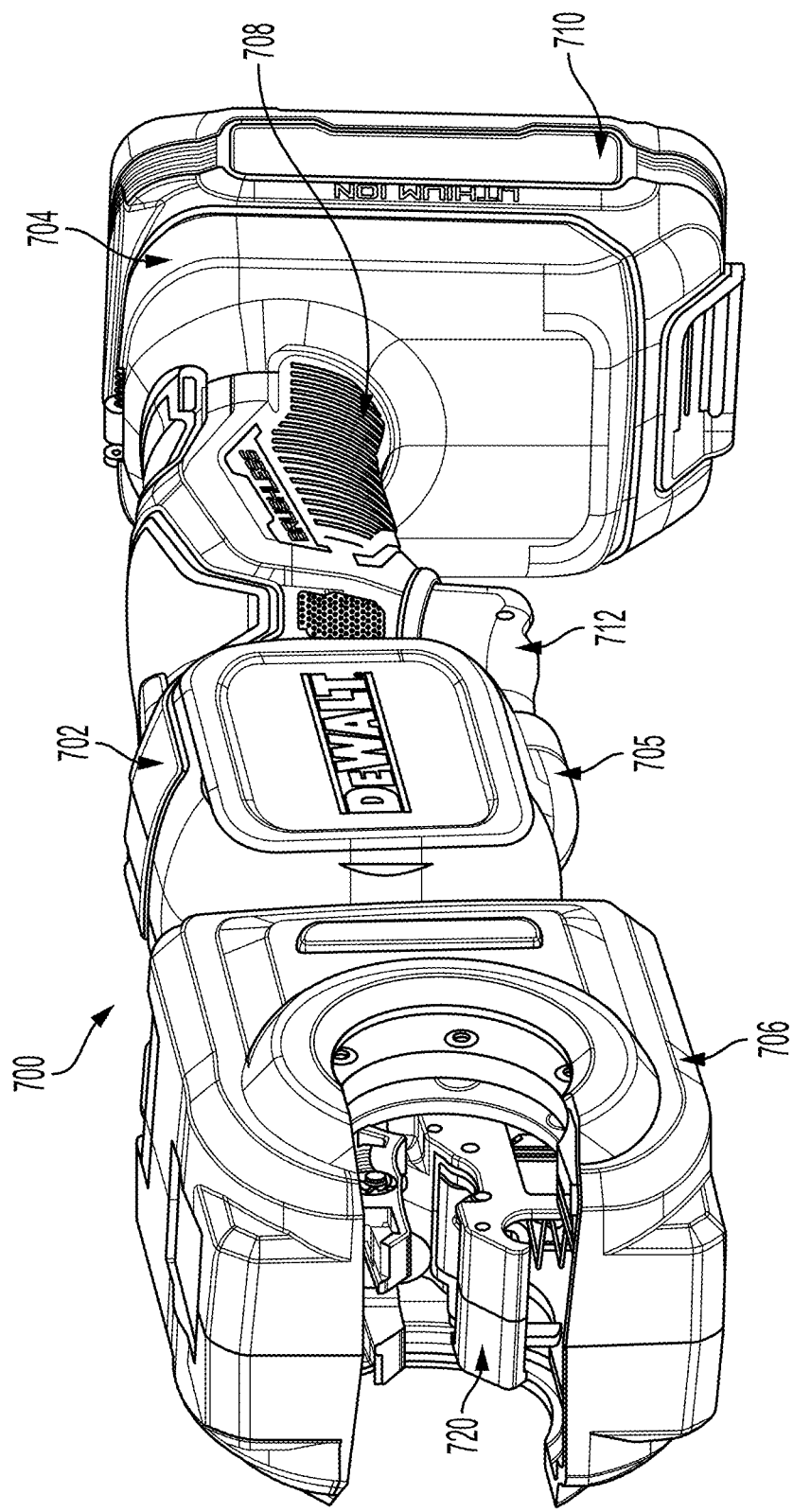
FIG. 29 is a perspective view of a power tool for cutting a tubular member.

FIG. 29 is a perspective view of a power tool 700 for cutting a tubular member. The power tool 700 includes a tool housing 702 having a rear end portion 704, a motor housing portion 705, and a front end portion 706. The rear end portion 704 of the tool housing 702 forms a handle 708 for gripping by a user. A battery pack 710 may be removably attached to the rear end portion 704 of the tool housing 702 to provide power to the power tool 700. Alternatively, the power tool may be powered by an external AC or DC power (e.g., via a power cord) or by a pneumatic, hydraulic, or combustion power source. The motor housing portion 705 of the tool housing 702 houses a motor that disposed within the motor housing portion 705. The handle 708 includes a trigger switch 712 that when actuated causes the battery pack 710 to power the motor and operate the power tool 700.

The power tool 700 includes a cutting head 720 that is disposed within the front end portion 706 of the tool housing 702. In this example, the cutting head 720 is similar to the cutting head 604 of FIG. 28 because the cutting head 720 is configured to receive multiple, different size tubulars members for cutting, as discussed in more detail below. That is, the cutting head 720 is configured to accommodate multiple sizes of tubular members for cutting, where the cutting head 720 includes a releasable lock assembly that is automatically actuated by insertion of the tubular member into the cutting head 720. The releasable lock assembly locks a tubular member of an accommodated size in the cutting head 720 in a position for cutting the tubular member when the power tool 700 is actuated using the trigger switch 712. The power tool 700 is a dedicated battery powered power tool for cutting tubular members. The power tool 700 may include an electric motor (e.g., a brushless motor) or a pneumatic motor to drive the cutting head 720 and the battery pack 710 may have a voltage such as 18V, 20V, 24V, 36V, 48V, 60V, etc.

FIGS. 30A-30F are views of an embodiment of a cutting head 820 for use with or as part of the power tool accessories or power tools described above, for cutting a tubular member. For example, the cutting head 820 may be an example of, and similar to, the cutting head 604 of FIG. 28 and the cutting head 720 of FIG. 29. The cutting head 820 is configured to automatically adjust and accept multiple different diameter tubular members, including conduits, pipes, and other tubular members made of different materials, including copper. For example, the cutting head 820 may receive and cut tubular members having an approximate range of outside diameters from ⅜" OD to 1⅜" OD. In other embodiments, the range may be greater and/or there may be multiple cutting heads, each having a different adjustable range.

The cutting head 820 includes a housing 822 (e.g., a cutting head housing) that houses a blade carriage 824 and a roller carriage 826. The housing 822 forms a C-shaped housing. In the initial position, the blade carriage 824 and the roller carriage 826 form an opening 828 in the housing 822 of the cutting head 820 to receive a tubular member, which may vary in size for different tubular members. The cutting head includes a lock assembly 810 configured to releasably lock the blade carriage 824 and the roller carriage 826 in a spaced apart relationship at a distance that corresponds to the size of a tubular member that is inserted into the cutting head 820. The blade carriage 824 includes a cutting blade 830 attached to the blade carriage 824 with a blade axle 832, which enables the cutting blade 830 to rotate about the blade axle 832. The blade carriage 824 is coupled to a blade carriage spring 834, a cutting blade spring 836, and a leaf spring 838. The blade carriage spring 834 is biased toward the opening 828 to bias the blade carriage 824 toward the opening 828 in the initial position. The cutting blade spring 836 biases the cutting blade 830 forward (to the right in the figure) towards the opening 828. The leaf spring 838 applies a cutting load to the cutting blade 830 when the cutting head 820 is in operation to cut a tubular member. In some examples, as best illustrated in FIG. 30C, the blade carriage spring 834 includes two blade carriage springs. The blade carriage 824 includes a ramp surface 840 proximate to the opening 828 and a flat surface 842, where the ramp surface 840 is angled downward and inward and connects to the flat surface 842.

The blade carriage 824 includes a blade carriage arm 844 having size adjustment slots 846 with each slot corresponding to a different diameter size (e.g., outside diameter size) for different size tubular members.

The roller carriage 826 is coupled to a roller carriage spring 848 that is biased toward the opening 828 to bias the roller carriage 826 toward the opening 828. The roller carriage 826 includes a ramp surface 850 proximate to the opening 828 and a flat surface 852, where the ramp surface 850 is angled upward and inward and connects to the flat surface 852.

The roller carriage 826 includes a roller mount 854, where the roller mount 854 includes a roller mount arm 856, a first roller 858, a first roller pin 860, a second roller 862, a second roller pin 864, and a slot 866 in the roller mount arm 856. The roller carriage 826 includes slot 865, as seen in FIG. 30D, and a roller carriage arm 867. The roller carriage arm 867 includes a lock pin 868 and a lock spring 870. Together, the blade carriage arm 844, the size adjustment slots 846, the roller carriage arm 867, the lock pin and the lock spring 870 comprise an example of the lock assembly 810, In the initial position, both the blade carriage 824 and the roller carriage 826 are biased inwards by the blade carriage spring 834 and the roller carriage spring 848, respectively. That is, the blade carriage 824 and the roller carriage 826 are biased to reduce the size of the opening 828. The lock pin 868 is disengaged from the size adjustment slots 846 on the blade carriage arm 844. The roller mount 854 is pivoted upward at angle in a counter-clockwise direction.

Figure 30A:
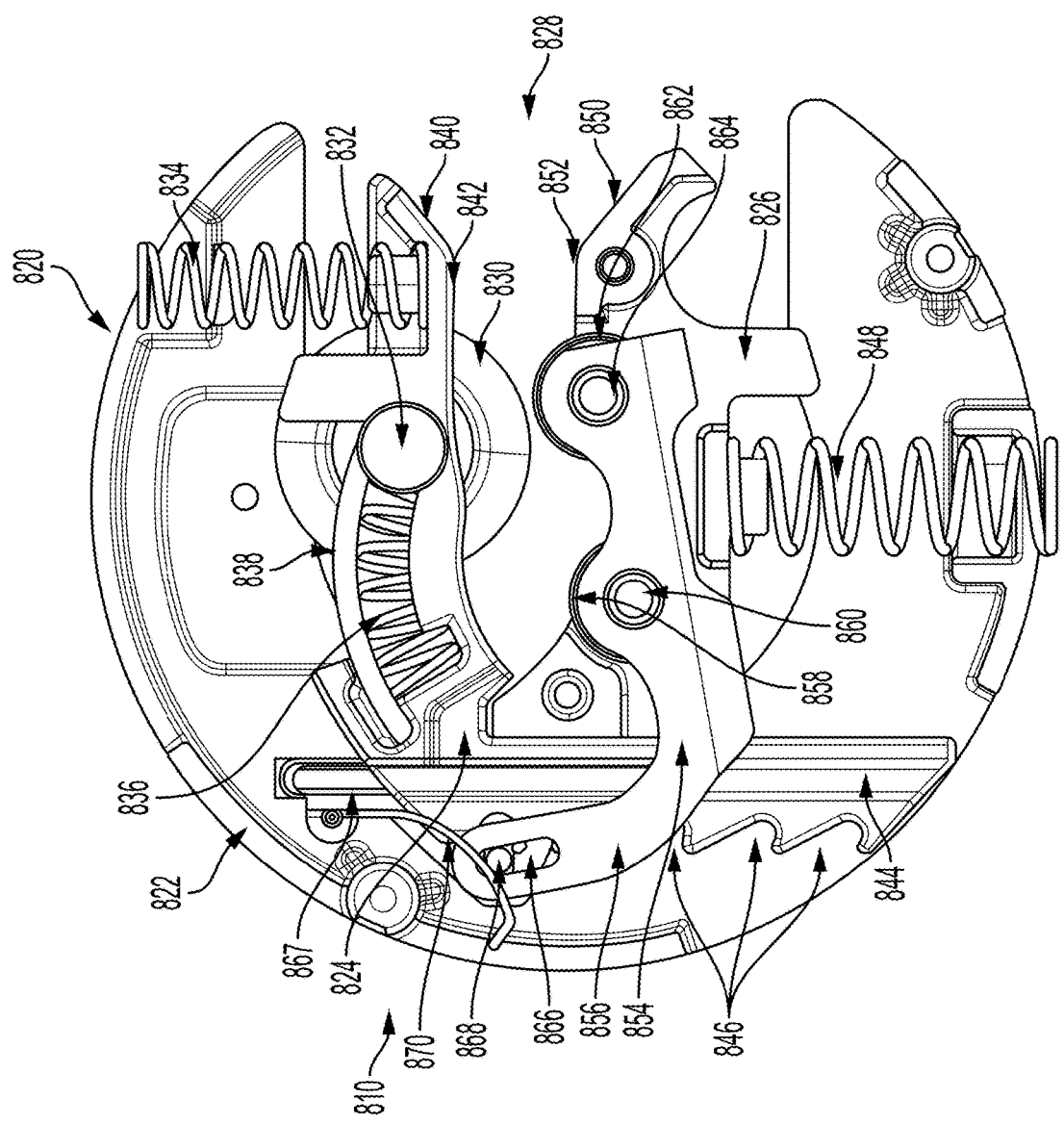
FIGS. 30A-30F are views of an embodiment of a cutting head for a power tool accessory for cutting a tubular member in an initial position.
Figure 30B:
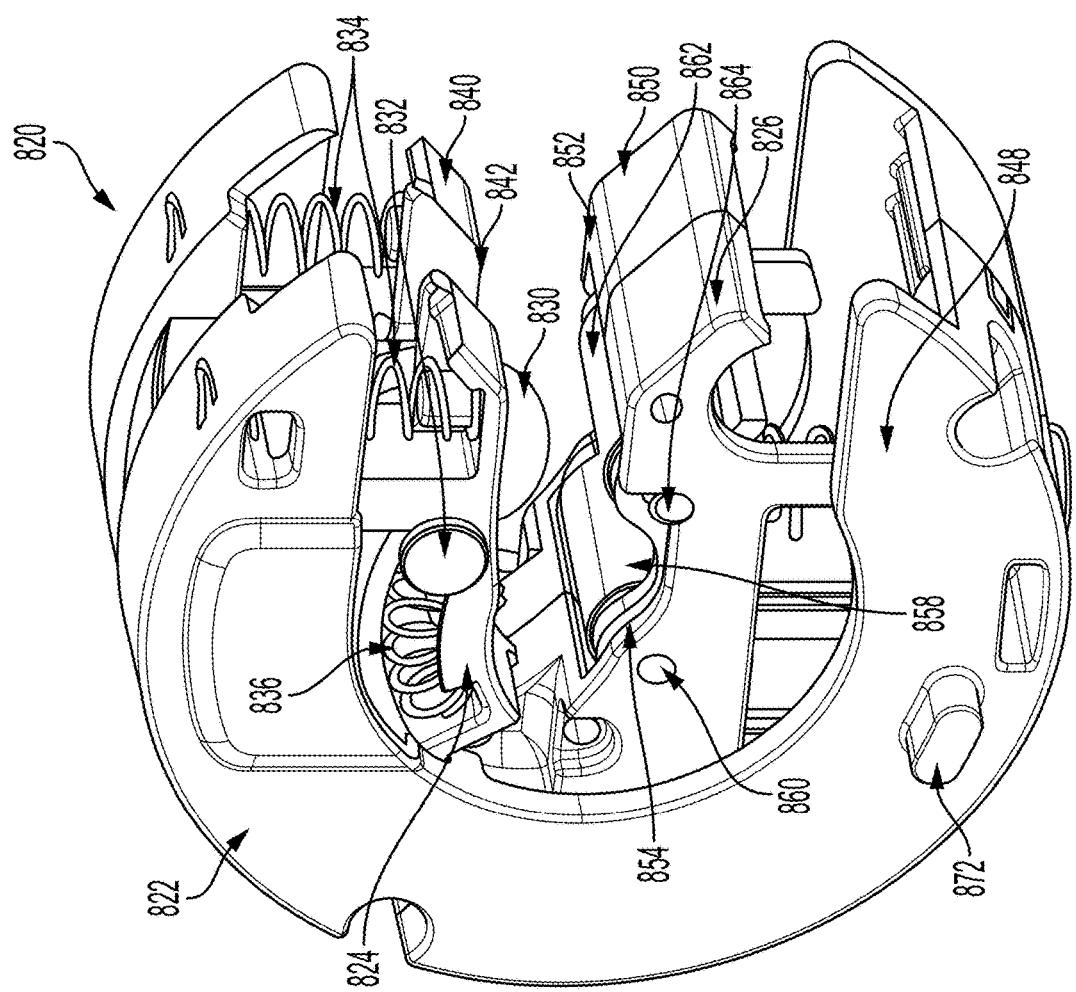
Figure 30C:
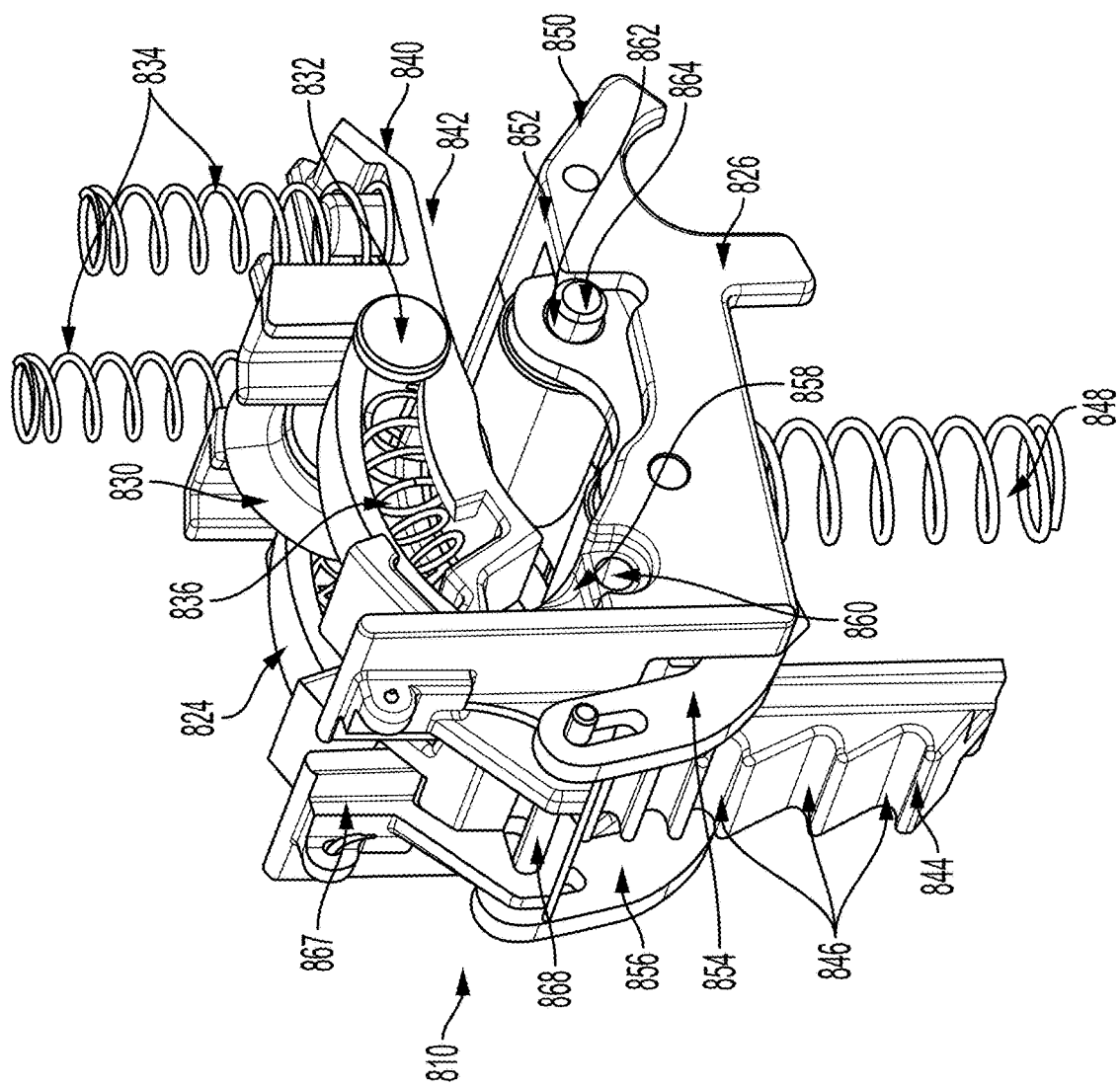

As illustrated in FIG. 30B, an outer wall of the housing 822 includes a stop protrusion 872.

Figure 30E:
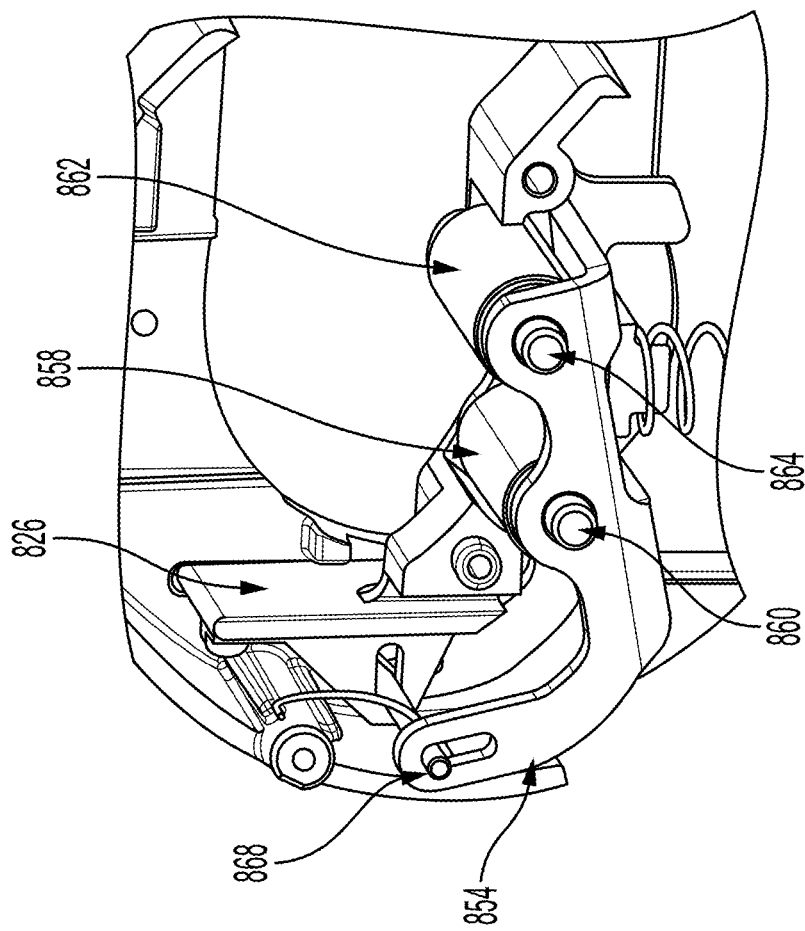
Figure 30D:
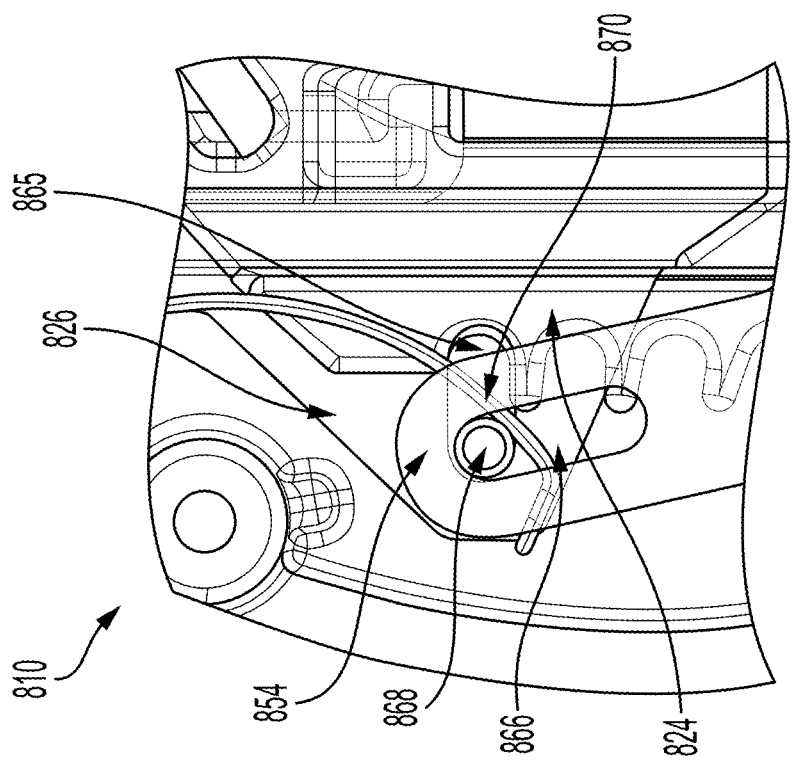
Figure 30F:
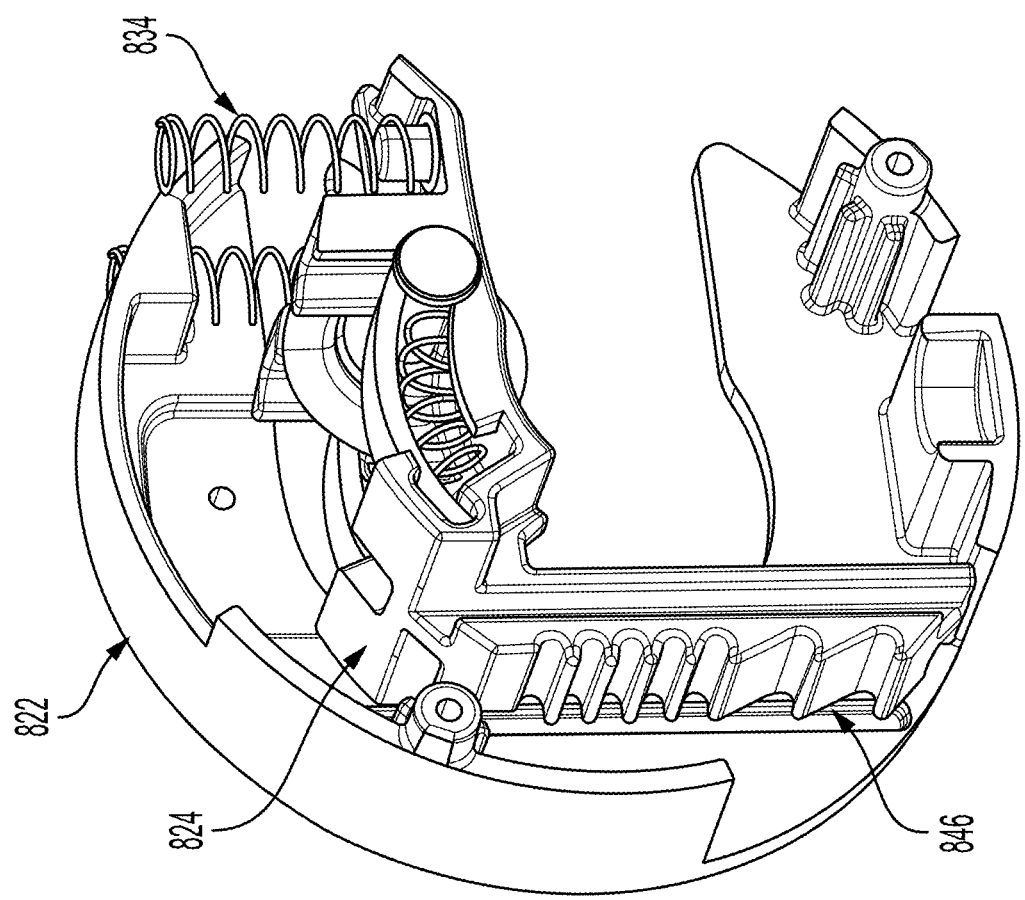

As illustrated in FIG. 30D, in an initial unlocked position, the lock pin 868 is disengaged in the initial position and is free to slide in slot 865 and slot 866. As illustrated in FIG. 30E, the roller mount 854 pivots around the first roller pin 860 and is constrained by the roller carriage 826. FIG. 30F illustrates the blade carriage 824 in the housing 822 without the roller carriage 826. In this example, the size adjustment slots 846 includes seven slots so that at least seven different-sized tubular members may be received, locked into position, and cut.

FIG. 31A is a side view of the cutting head 820 of FIGS. 30A-30F with a tubular member 880 moved into the opening 828 and pressed against the blade carriage 824 and the roller carriage 826. The blade carriage 824 is biased inwards by the blade carriage spring 834, as indicated by the arrow A. The roller carriage 826 is also biased inwards by the roller carriage spring 848, as indicated by the arrow B. The opening 828 may be defined by a C-shaped opening. In operation, as the tubular member 880 is pressed along arrow C against the ramped surfaces of the blade carriage 824 and the roller carriage 826, the blade carriage 824 and the roller carriage 826 move outward against the forces of the blade carriage spring 834 and the roller carriage spring 848 opposite the arrow directions A and B. The roller mount 854, including the first roller 858 and the second roller 862 pivot about the first roller pin 860 in a counter-clockwise direction so that the second roller 862 approaches the cutting blade 830, as indicated by the arrow D. The lock pin 868 is disengaged from the size adjustment slots 846 on the blade carriage 824.

Figure 31B:
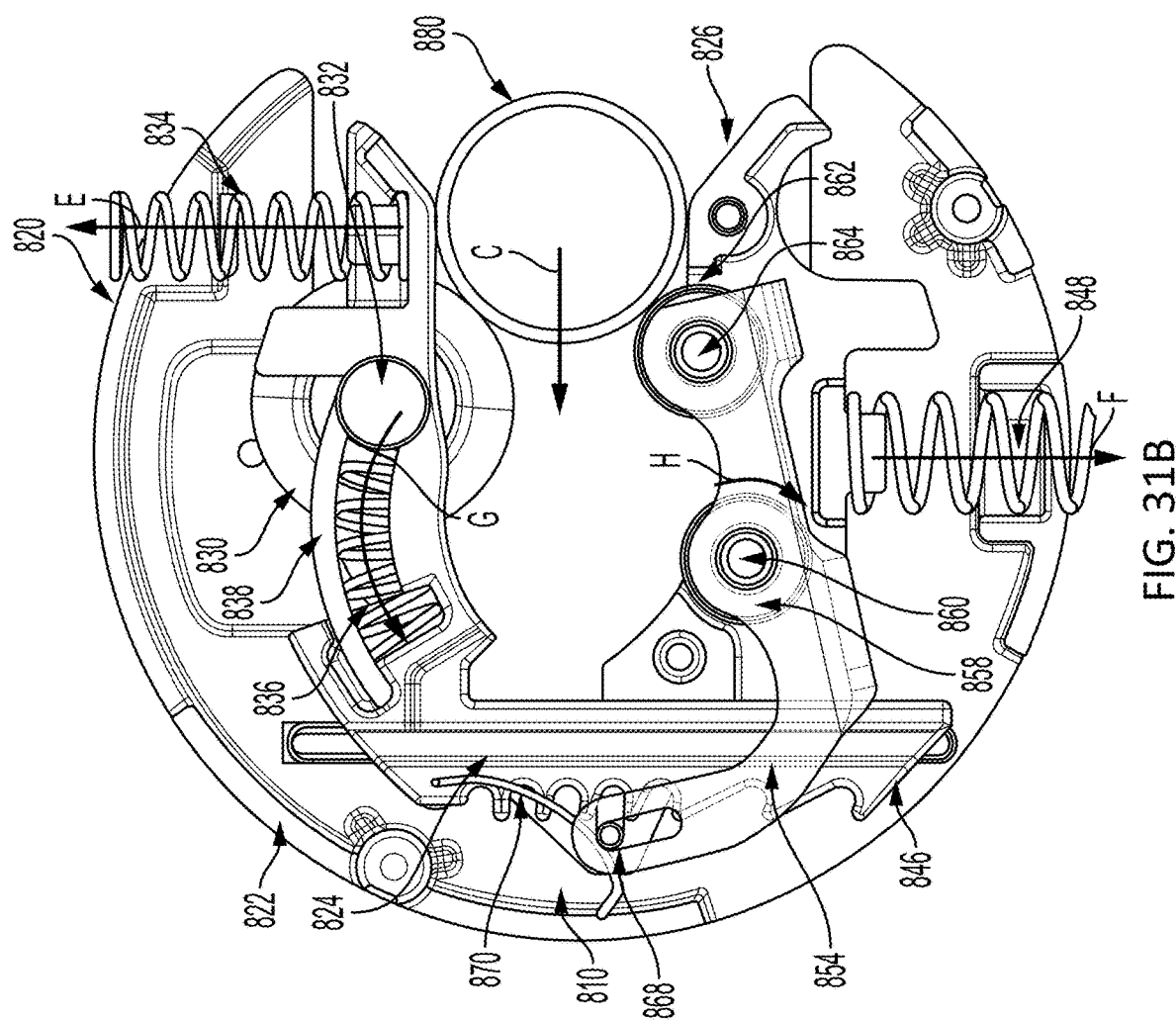
FIG. 31B is a side view of the cutting head of FIGS. 30A-30F with the tubular member of FIG. 31A moved further into the opening between the carriages.

FIG. 31B is a side view of the cutting head 820 of FIGS. 30A-30F with the tubular member 880 of FIG. 31A moved further into the opening 828 between the blade carriage 824 and the roller carriage 826. The tubular member 880 is inserted further into the opening 828 along the arrow C between the flat surfaces on the blade carriage 824 and the roller carriage 826. As the tubular member 880 is inserted along the arrow C, the blade carriage 824 and the roller carriage 826 move outward in the directions of the arrows E and F against the force of the blade carriage spring 834 and the roller carriage spring 848, respectively, to a position in accordance with the tubular member diameter.

Further insertion of the tubular member 880 along the arrow C causes the cutting blade 830 to move rearward against the cutting blade spring 836 in the direction of the arrow G. This also causes the roller mount 854 and the first roller 858 and the second roller 862 to pivot clockwise about the first roller pin 860 in the direction as indicated by the arrow H. The lock pin 868 moves with the roller carriage 826 to become aligned with one of the size adjustment slots 846 that corresponds to the size of the tubular member 880.

Figure 32:
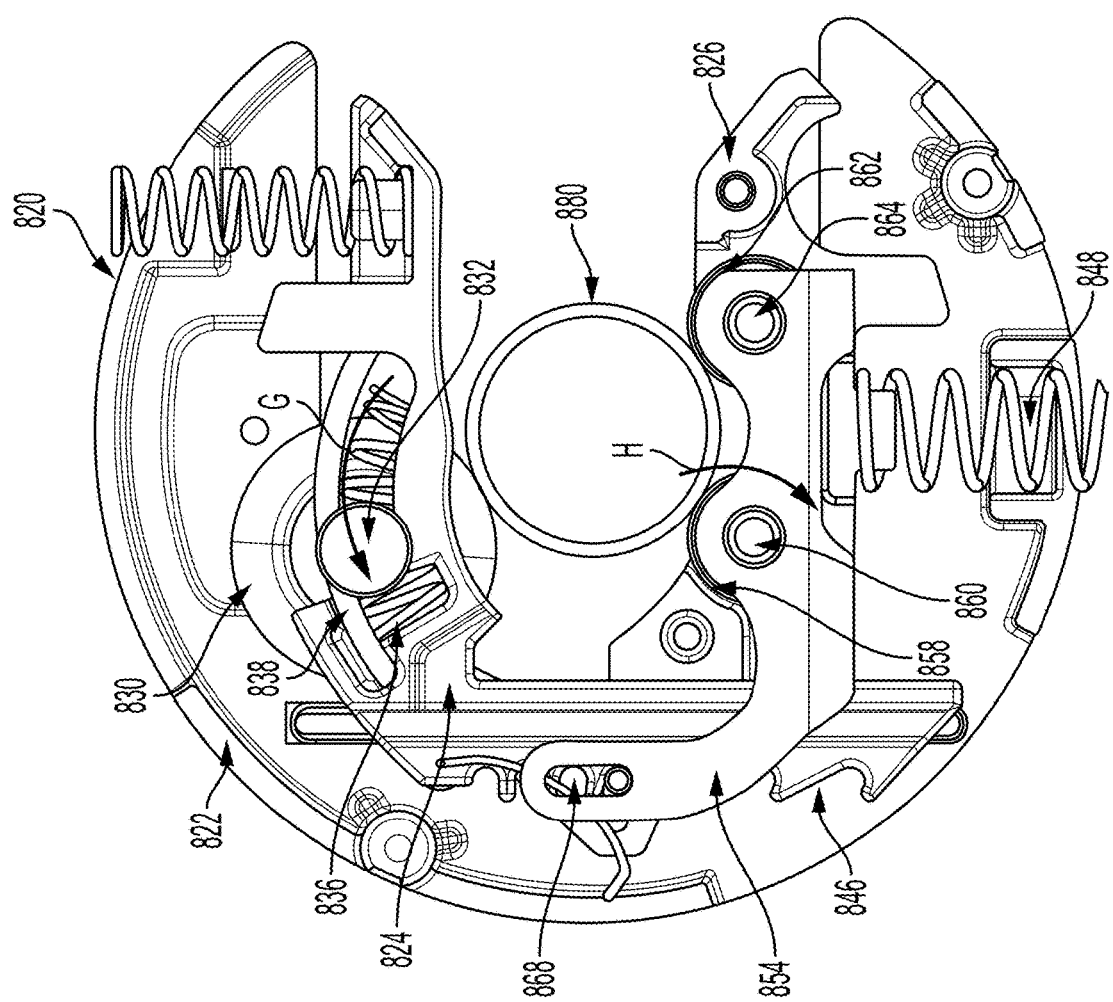
FIG. 32 is a side view of the cutting head of FIGS. 30A-30F with the tubular member of FIG. 31A in a locked position.

FIG. 32 is a side view of the cutting head 820 of FIGS. 30A-30F with the tubular member 880 of FIG. 31A in a locked position. When the tubular member 880 is inserted such that the roller mount 854 rotates from an angled position to a horizontal position, the lock pin 868 is received and locked in one of the size adjustment slots 846 on the blade carriage 824. That is, the roller mount 854 is pivoted clockwise along the arrow H about the first roller pin 860 to a horizontal position. The cutting blade 830 is pushed back rearward along the arrow G against the biasing force of the cutting blade spring 836. The blade carriage 824 and the roller carriage 826 are now locked in place by the lock assembly 810 and ready to cut. The tubular member 880 is automatically locked into position to cut by inserting the tubular member 880 into the cutting head 820. When the blade carriage 824 and roller carriage 826 have been locked together, the cutting blade spring 836 and the leaf spring 838 interact to apply pressure to the cutting blade 830 against the tubular member 880.

Figure 33B:
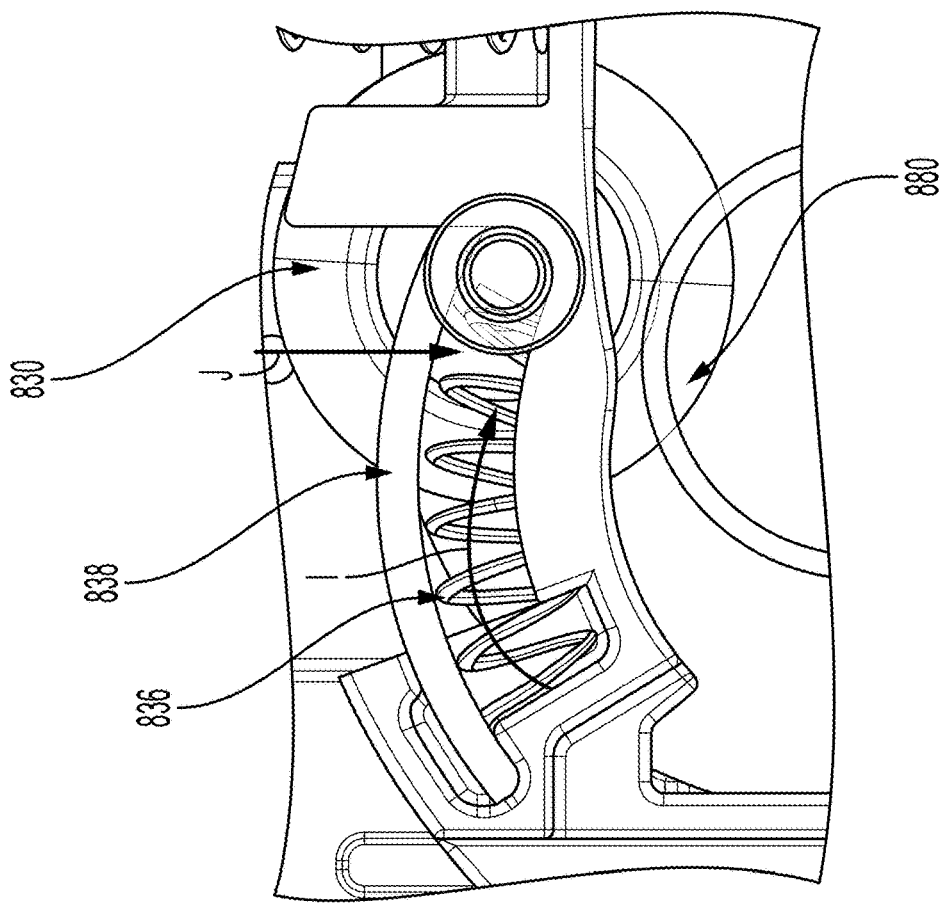
FIGS. 33A and 33B are closeup views of the cutting head of FIGS. 30A-30F cutting the tubular member of FIG. 31A.
Figure 33A:
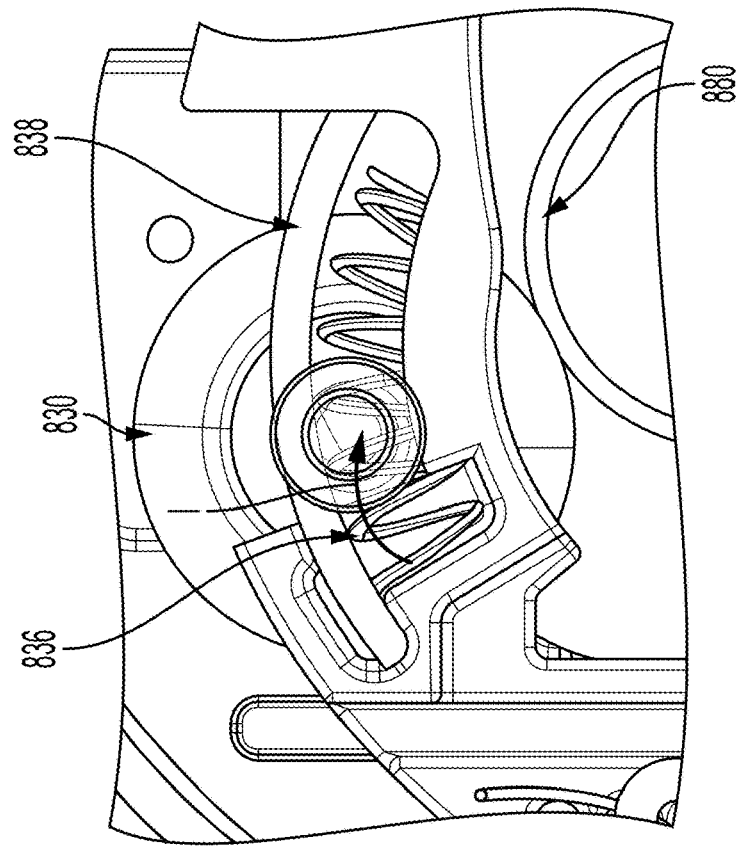

FIGS. 33A and 33B are closed up views of the cutting head 820 of FIGS. 30A-30F cutting the tubular member 880 of FIG. 31A. In FIG. 33A, when the tubular member 880 is fully inserted, the cutting blade spring 836 is compressed and pushes the cutting blade 830 against the leaf spring 838 and the tubular member 880, as indicated by the arrow I. In FIG. 33B, when the power tool or power tool accessory is actuated, the cutting blade 830 will rotate counter-clockwise around the tubular member 880. Friction between the leaf spring 838, the cutting blade 830, and the tubular member 880 causes the cutting blade 830 to roll along the leaf spring 838 along arrow I. The leaf spring 838 is deflected and creates a load along arrow J, which pushes the cutting blade 830 into the tubular member 880 until it cuts through the wall of the tubular member 880. The cutting blade 830 cuts the tubular member 880 as the cutting head 820 rotates about the tubular member 880.

Figure 34:
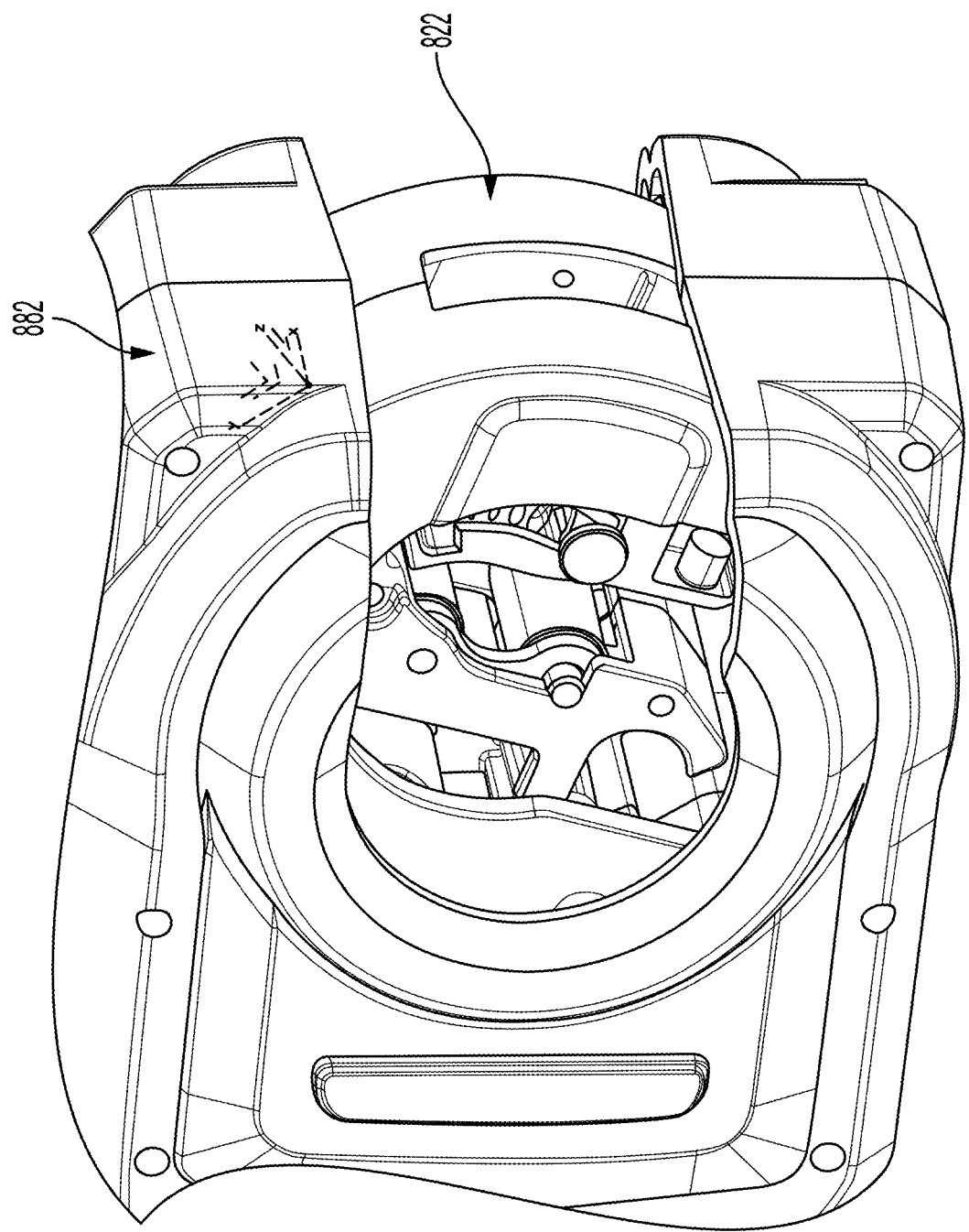
FIG. 34 is a view of the cutting head of FIGS. 30A-30F after cutting a tubular member with the cutting head in a position that closes the opening of the housing.

FIG. 34 is a view of the cutting head 820 of FIGS. 30A-30F after cutting a tubular member with the cutting head 820 in a position where the housing 822 closes the opening for a housing 882 of the power tool. For example, when a cut to a tubular member is finished, the opening 828 on the cutting head 820 may not align with the opening on the housing 882 for the power tool. The opening 828 can be aligned by feathering the trigger on the power tool to move the cutting head 820 into alignment. Alternatively, the cutting opening 828 can be aligned by an alignment assembly 881 as described below.

Figure 35:
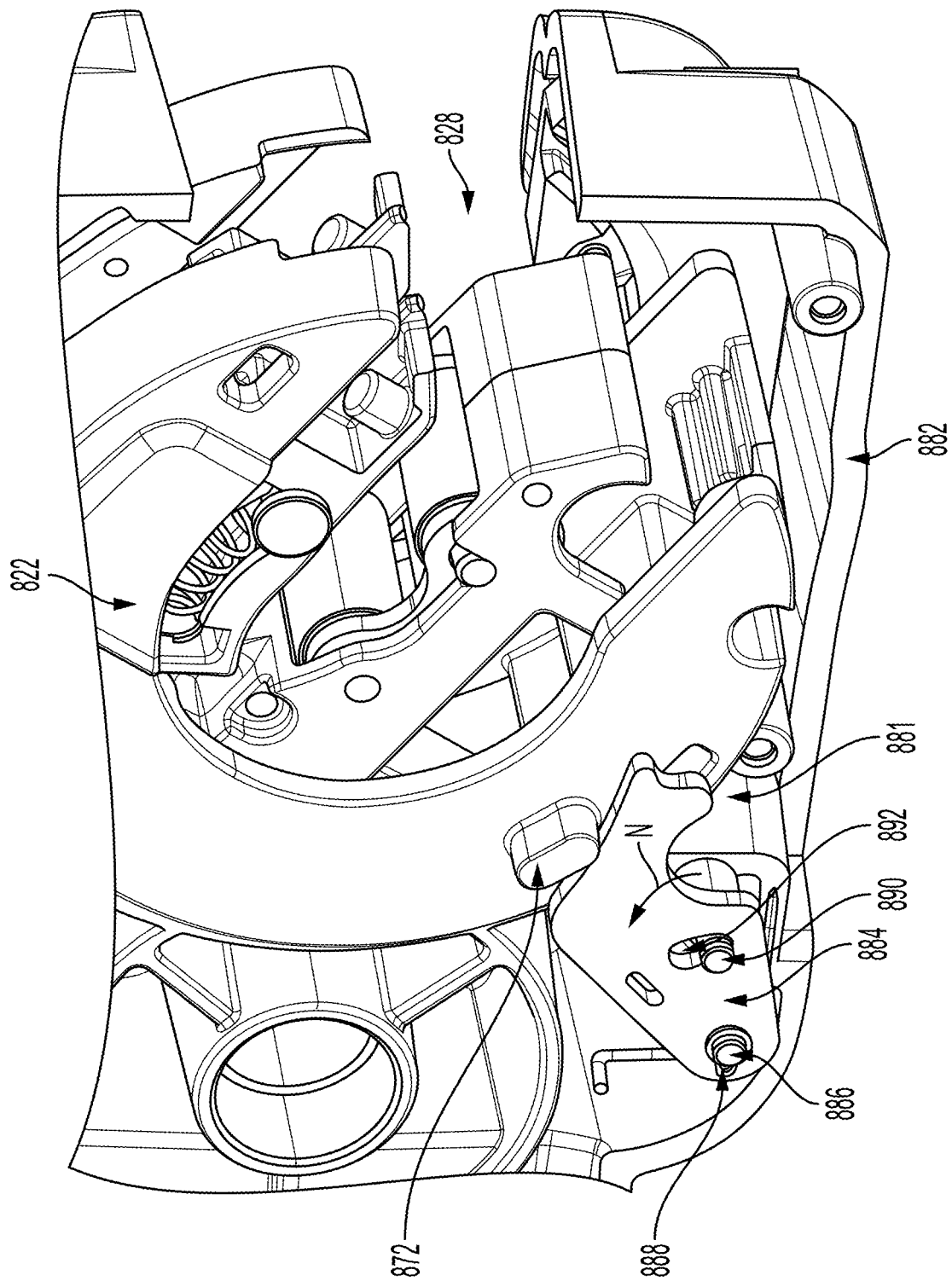
FIG. 35 is a view of the cutting head of FIGS. 30A-30F illustrating returning the cutting head to an initial position.
Figure 36:
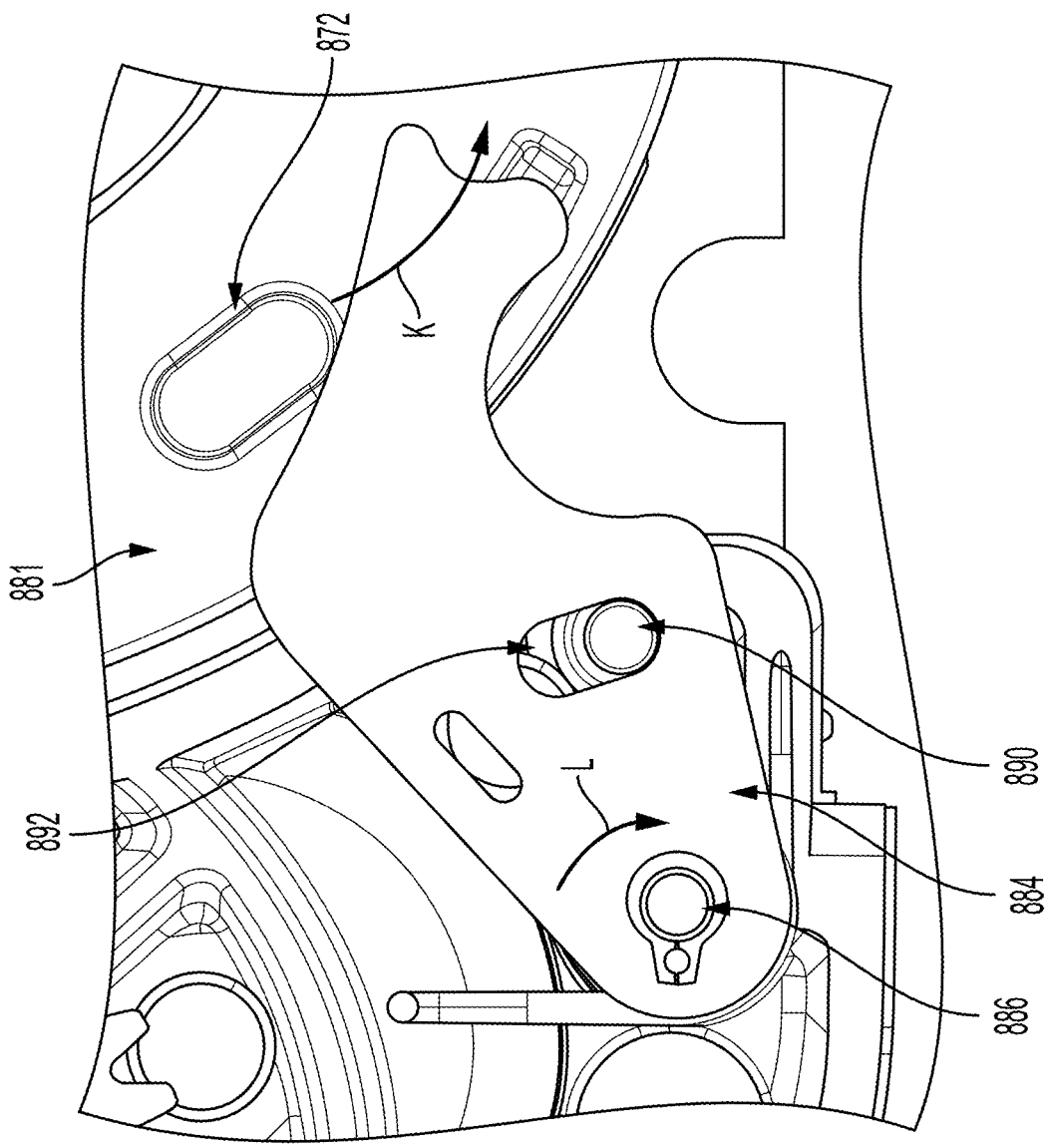
FIG. 36 is a closeup view of the ratchet plate of FIG. 35 with the stop protrusion disengaged.

As shown in FIGS. 35-38, the cutting head 820 may include an alignment assembly 881 configured to automatically return the cutting head 820 to an initial position upon completion of a cut in order to release any tubular member and to be in a ready state to cut another tubular member. FIG. 35 is a view of the alignment assembly 881 of the cutting head 820 of FIGS. 30A-30F illustrating returning the cutting head 820 to an initial position. The alignment assembly 881 may include the stop protrusion 872 on the cutting head housing 822 and a ratchet plate 884 coupled to the tool or accessory housing 882. The ratchet plate 884 is pivotably coupled to the tool or accessory housing 882 by a pivot pin 886 and a torsion spring that biases the ratchet plate about the pivot pin 886 in a counterclockwise direction indicated by arrow N. The ratchet plate also includes slot 892 that receives a stop pin 890 coupled to the tool or accessory housing 882, which limits angular movement of the ratchet plate 884. As shown in FIG. 36, during cutting operation, the housing 822 and the stop protrusion 872 disposed on the housing 822 spin counter-clockwise as indicated by arrow K. When the stop protrusion 872 strikes the ratchet plate 884, the ratchet plate 884 pivots clockwise about the pivot pin 886 along arrow K, against the force of the torsion spring 888, while the stop pin 890 translates in the slot 892. This allows the ratchet plate 884 to pivot out of the way of the stop protrusion 872, enabling the cutting head 820 to continue to spin in the counterclockwise direction K.

FIG. 36 is a closeup view of the ratchet plate 884 of FIG. 35 with the stop protrusion 872 disengaged. When the cutting head spins counter-clockwise in the direction of arrow K, the stop protrusion 872 on the housing 822 contacts the ratchet plate 884 and the ratchet plate 884 pivots clockwise in the direction of arrow L about the pivot pin 886 and out of the way so the housing 822 may continue spinning.

Figure 37:
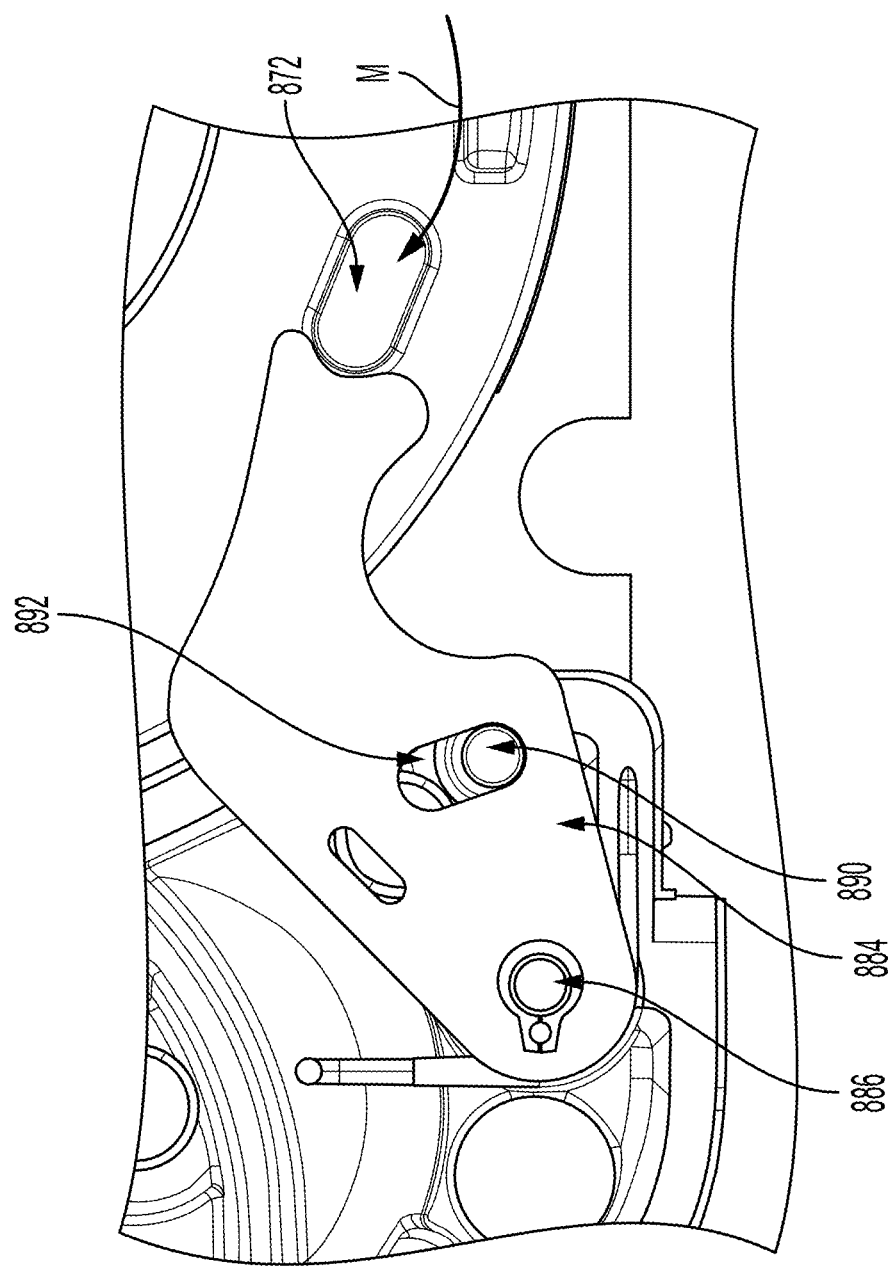
FIG. 37 is a closeup view of the ratchet plate of FIG. 35 with the stop protrusion engaged.
Figure 38:
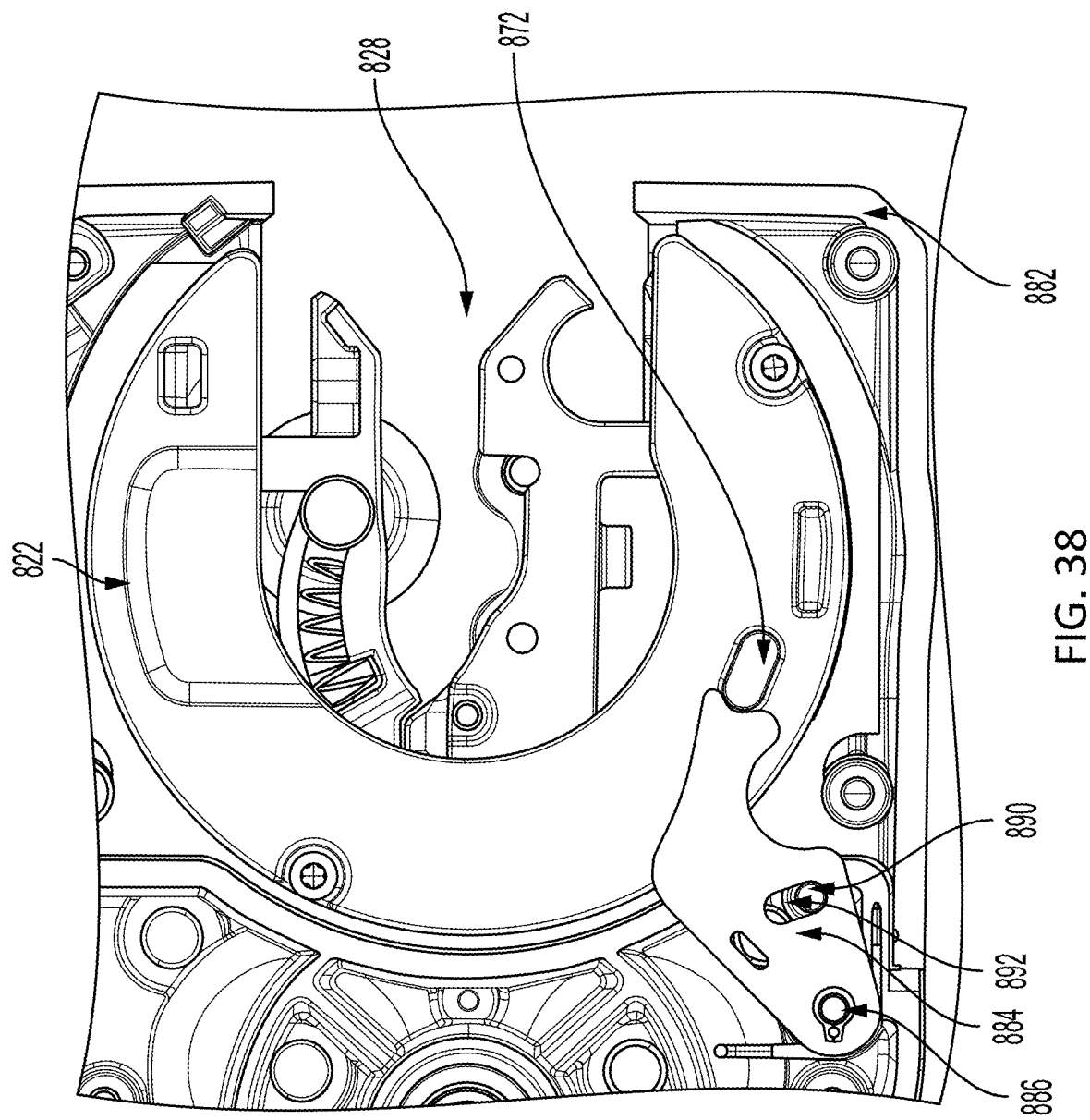
FIG. 38 is a view of the cutting head of FIGS. 30A-30F with the opening realigned in an initial position.

As shown in FIG. 37, after cutting, reverses the direction or operation of the power tool or power tool accessory so that the cutting head 820 spins in a clockwise in the direction of arrow M. In this direction, when the stop protrusion 872 strikes the ratchet plate 884, the ratchet plate 884 cannot pivot out of the way and the cutting head and the housing 822 are stopped by the stop protrusion 872 engaging the ratchet plate 884. As illustrated in FIG. 38, when stopped, the opening in the cutting head 820 is aligned with the opening in the housing to enable removal of the tubular member and to enable insertion of another tubular member to be cut.

In operation, the cutting head 820 is received in a front end portion 706 of the tool housing 702. The cutting head 820 includes a housing 822 with an opening 828 configured to receive a tubular member (e.g., tubular member 880) in the opening 828 and to be rotatably driven by an output member of the transmission of the power tool 700. The cutting head 820 includes a cutting blade 830 configured to protrude at least partially into the opening 828 and a roller (e.g., first roller 858 or second roller 862) configured to protrude at least partially into the opening 828, and a releasable lock assembly (e.g., size adjustment slots 846 and lock pin 868). The cutting blade 830 and the roller (e.g., first roller 858 or second roller 862) are biased toward the center of the opening 828, movable outward from the opening 828 to accommodate multiple sizes of tubular members in the opening 828, and lockable by the lock assembly in a desired position to accommodate a tubular member of a desired size, where the lock assembly is actuated automatically by insertion of the tubular member and without necessitating any additional actuation of the power tool or power tool accessory such as by a separate lock or by rotating the cutting head 820. In this manner, the tubular member is locked in position without rotation of the cutting head 820, either manually or by the power tool 700 itself. In the locked position, the roller (e.g., first roller 858 or second roller 862) and the cutting blade 830 engage the tubular member as the cutting blade 830 rotates about the tubular member in response to rotation of the input shaft.

As discussed above, the roller (e.g., first roller 858 or second roller 862) is coupled to the roller carriage 826 carried by the housing 822 and biased toward the opening 828 by the roller carriage spring 848. The cutting blade 830 is coupled to the blade carriage 824 carried by the housing 822 opposite the roller carriage 826 and biased inward toward the opening 828 by the blade carriage spring 834.

The lock assembly may include the blade carriage 824, the blade carriage arm 844, the roller carriage 826, the roller carriage arm 867, the roller mount 854, the roller mount arm 856, the slot 865, the slot 866, the size adjustment slots 846, the lock pin 868, and the lock spring 870. As the tubular member 880 is inserted into the opening 828, the roller mount 854 rotates about the first roller pin 860 and automatically forces the lock pin 868 into a slot on the size adjustment slots 846 locking the tubular member 880 in position. The lock pin 868 is receivable in different slots of the size adjustment slots 846 depending on the size of the tubular member 880.

Figure 39:
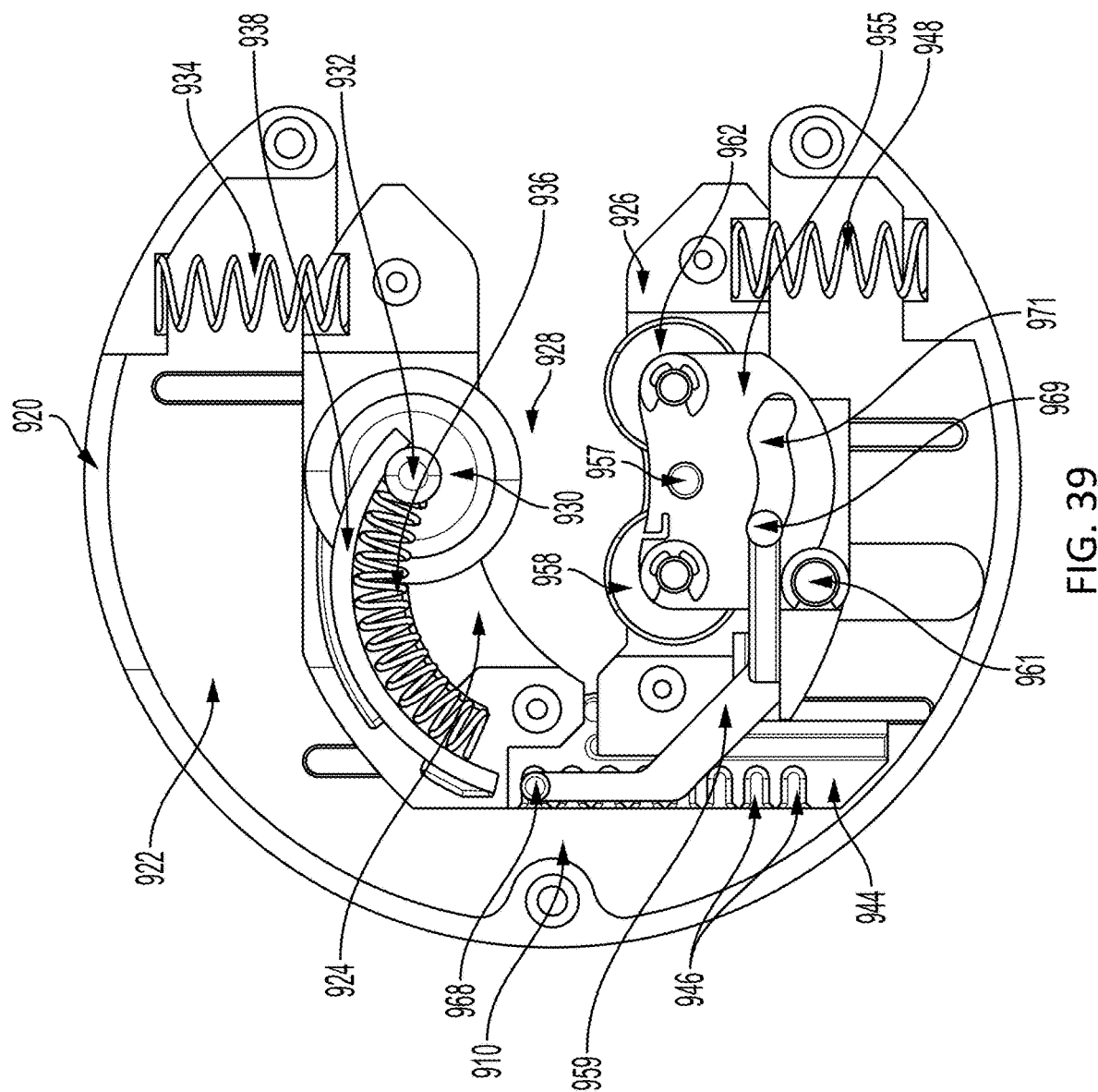
FIG. 39 is a side view of another embodiment of a cutting head for a power tool accessory for cutting a tubular member.
Figure 40:
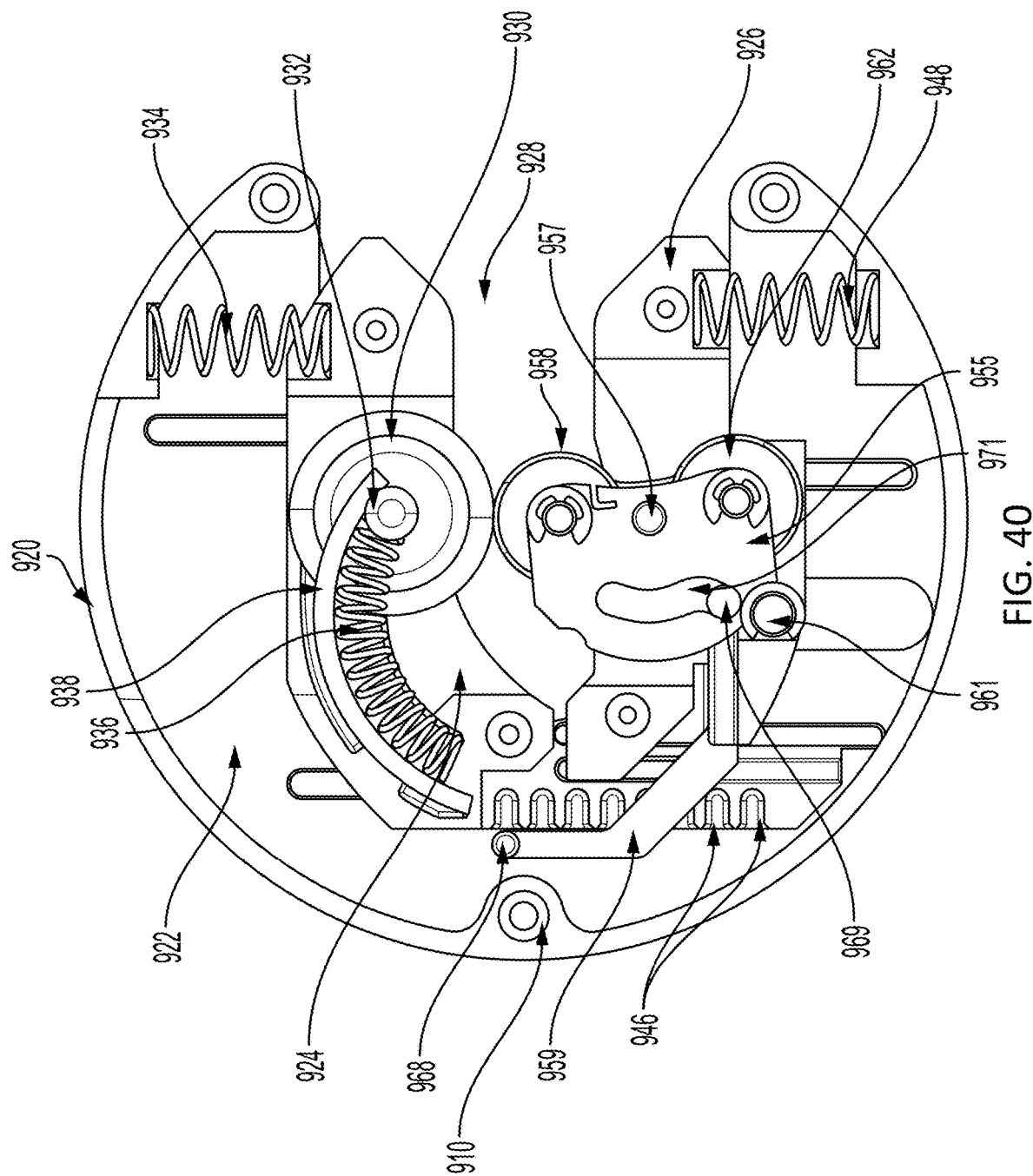
FIG. 40 is a side view of the cutting head of FIG. 39 in an initial position before a tubular member is inserted into the cutting head.

FIGS. 39-44B illustrate another embodiment of a cutting head 920. FIG. 39 is a side view of the cutting head 920 and FIG. 40 is a side view of the cutting head 920 in an initial position before a tubular member is inserted into the cutting head 920. The cutting head 920 is similar in operation to the cutting head 820 with the differences noted below. The cutting head 920 includes a housing 922 (e.g., a cutting head housing) that houses a blade carriage 924, a roller carriage 926, and a lock assembly 910. The housing 922 forms a C-shaped housing. In the initial position, the blade carriage 924 and the roller carriage 926 form an opening 928 in the housing 922 of the cutting head 920 to receive a tubular member, which may vary in size for different tubular members.

The blade carriage 924 includes a cutting blade 930 attached to the blade carriage 924 with a blade axle 932, which enables the cutting blade 930 to rotate about the blade axle 932. The blade carriage 924 is coupled to a blade carriage spring 934, a cutting blade spring 936, and a leaf spring 938. The blade carriage spring 934 is biased toward the opening 928 to bias the blade carriage 924 toward the opening 928 in the initial position. The cutting blade spring 936 biases the cutting blade 930 forward (to the right in the figure) towards the opening 928. The leaf spring 938 applies a cutting load to the cutting blade 930 when the cutting head 920 is in operation to cut a tubular member.

The roller carriage 926 is coupled to a roller carriage spring 948 that is biased toward the opening 928 to bias the roller carriage 926 toward the opening 928. A difference between the cutting head 820 and the cutting head 920 is that the roller carriage 926 includes a roller mount plate 955 that differs from the roller mount 854. The roller mount plate 955 includes a first roller 958, a second roller 962, and pivot pin 957 about which the roller mount plate 955 pivots. The lock assembly 910 includes a blade carriage arm 944 coupled to the blade carriage 924 with size adjustment slots 946; a linkage 959 coupled to the roller mount plate 955 with a lock pin 968 at one end removably receivable in the size adjustment slots 946 and a cam pin 969 at the other end received in a cam slot 971 in the roller mount plate 955; and a roller mount lock 961 coupled to the roller carriage 926 to engage the roller mount plate 955.

As shown in FIG. 40, in an unlocked position, the roller mount plate 955 is pivoted about the pivot pin 957 by, e.g., approximately 90 degrees, from the position shown in FIG. 39, and the lock pin 968 on the linkage 959 is disengaged from the size adjustment slots 946 in the blade carriage 924. In this position, the cutting head 920 is ready to receive a tubular member, such as a tubular member. As shown in, FIG. 41, as a tubular member 980 is inserted into the opening 928 between the blade carriage 924 and the roller carriage 926, the blade carriage 924 and the roller carriage 926 are pushed apart by the tubular member 980 to a position corresponding with the tubular member diameter. As shown in FIG. 42, as the tubular member 980 is moved further into the opening 928 between the carriages, the roller mount plate 955 rotates counterclockwise in a direction O. The causes the cam pin 969 of the linkage 959 to travel in the cam slot 971, which causes the lock pin 968 of the linkage 959 to engage with one of the size adjustment slots 946 corresponding with the diameter of the tubular member 980. The blade carriage 924 and the roller carriage 926 are now locked relative to each other in the correct position for the particular size of the tubular member 980.

Figure 41:
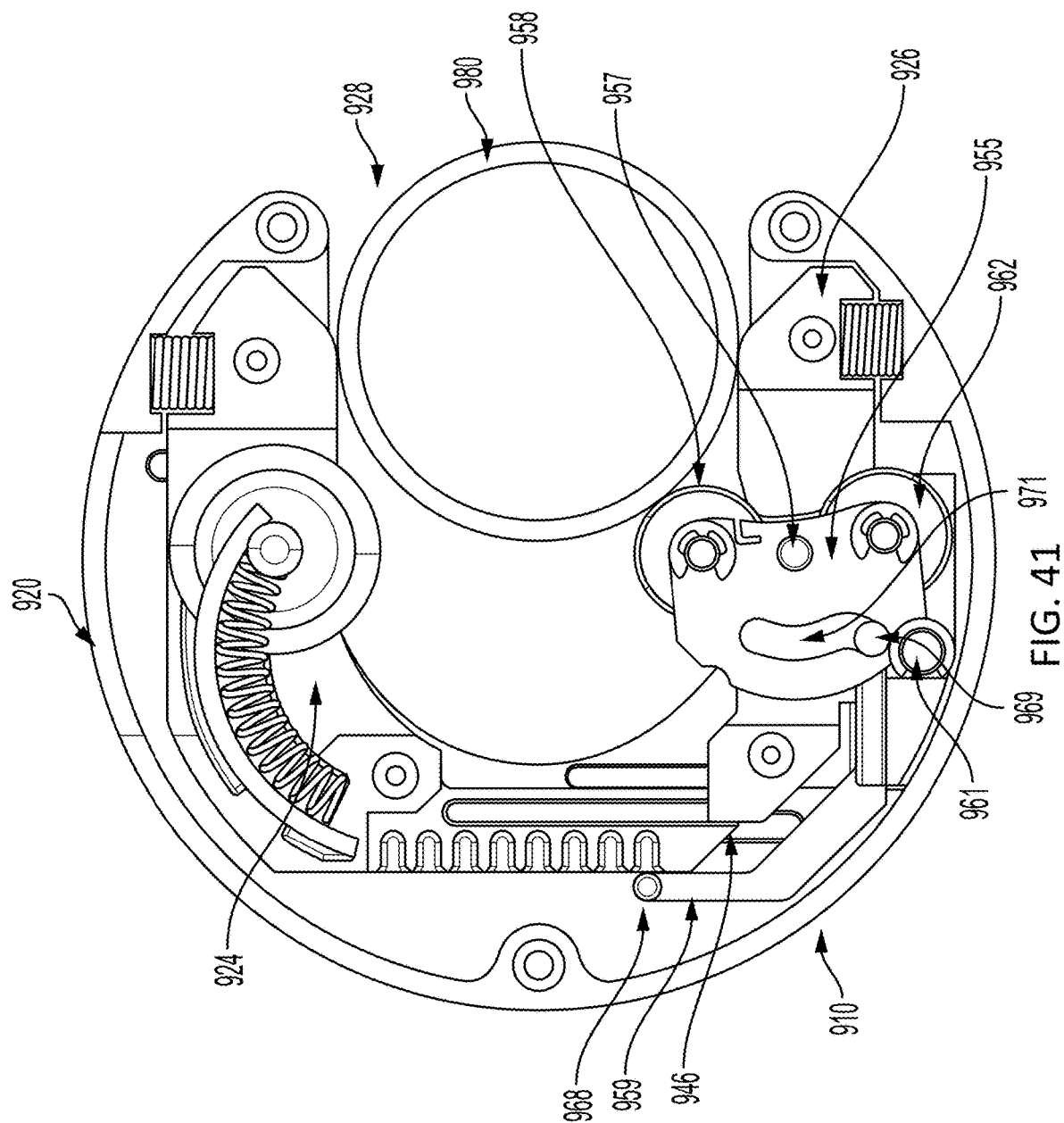
FIG. 41 is a side view of the cutting head of FIG. 39 with a tubular member moved into the opening and pressed against the carriages.
Figure 42:
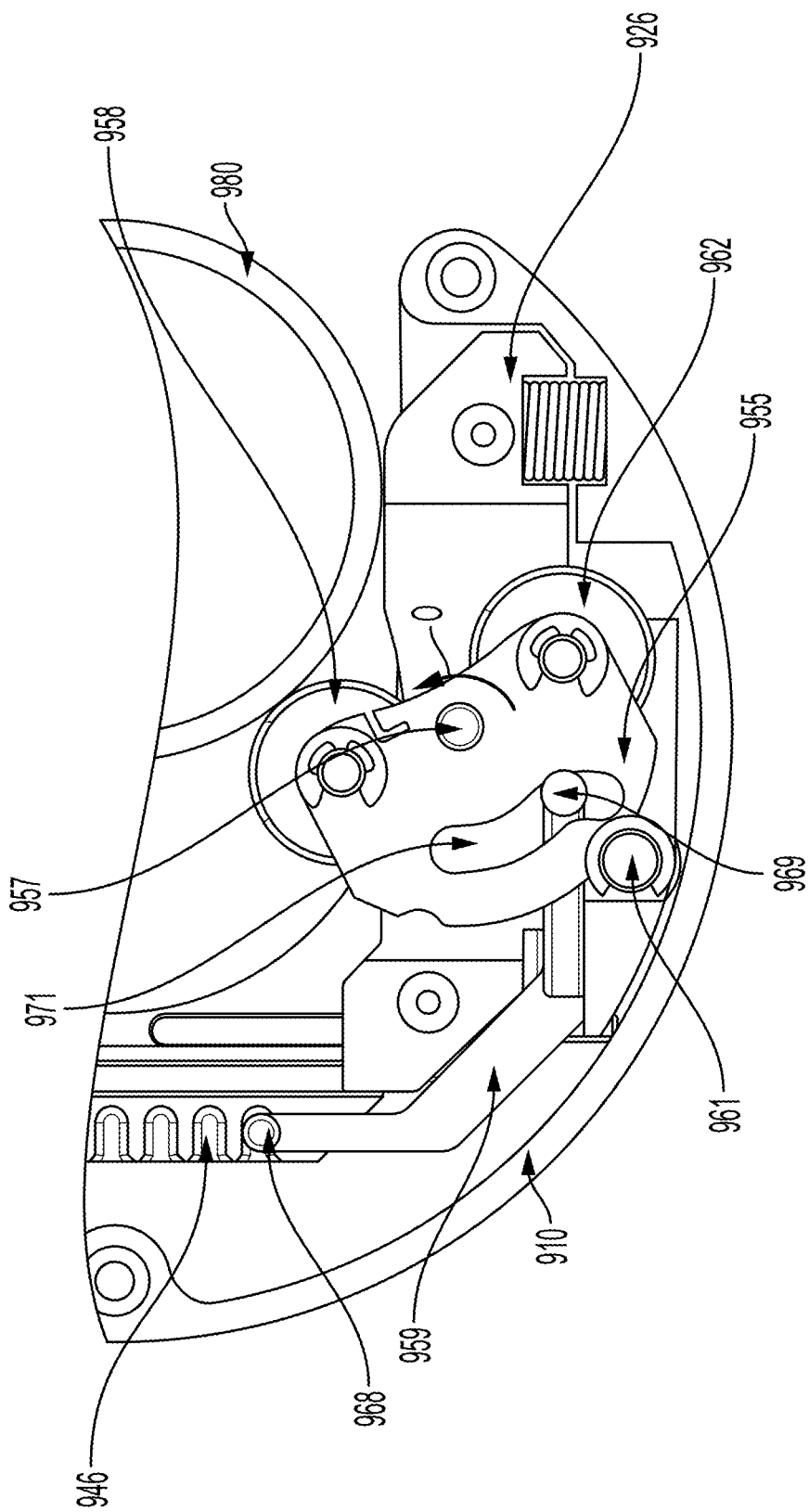
FIG. 42 is a side view of the cutting head of FIG. 39 with the tubular member of FIG. 41 moved further into the opening between the carriages.

FIG. 43 is a side view of the cutting head 920 of FIG. 39 with the tubular member 980 of FIG. 41 in a locked position in the cutting head 920. When the blade carriage 924 and the roller carriage 926 have been locked together, the tubular member 980 deflects the cutting blade 930 along the leaf spring 938. When the roller mount plate 955 completes rotation about the pivot pin 957 from a vertical position to a horizontal position, the roller mount lock 961 engages with the roller mount plate 955 preventing roller mount plate 955 from rotating and locking the tubular member 980 in place.

Figure 44B:
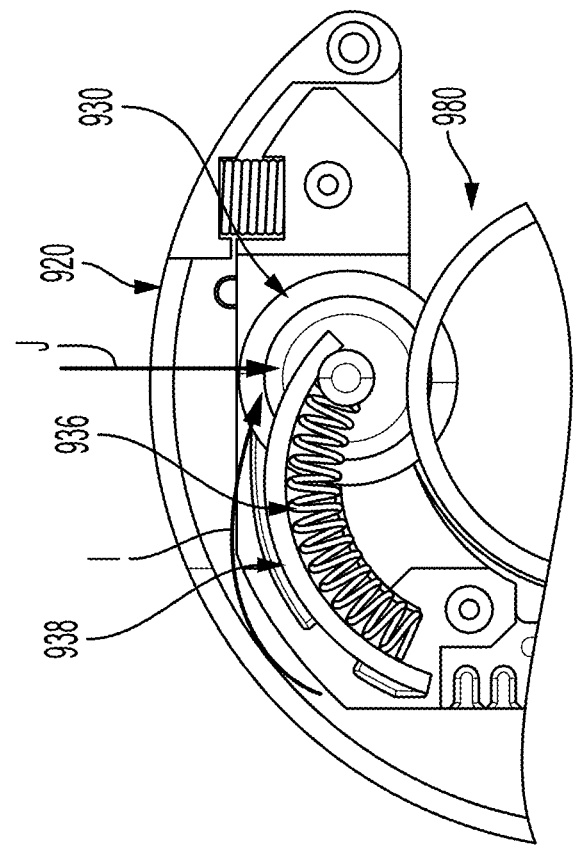
FIGS. 44A and 44B are closeup views of the cutting head of FIG. 39 cutting the tubular member of FIG. 41.
Figure 44A:
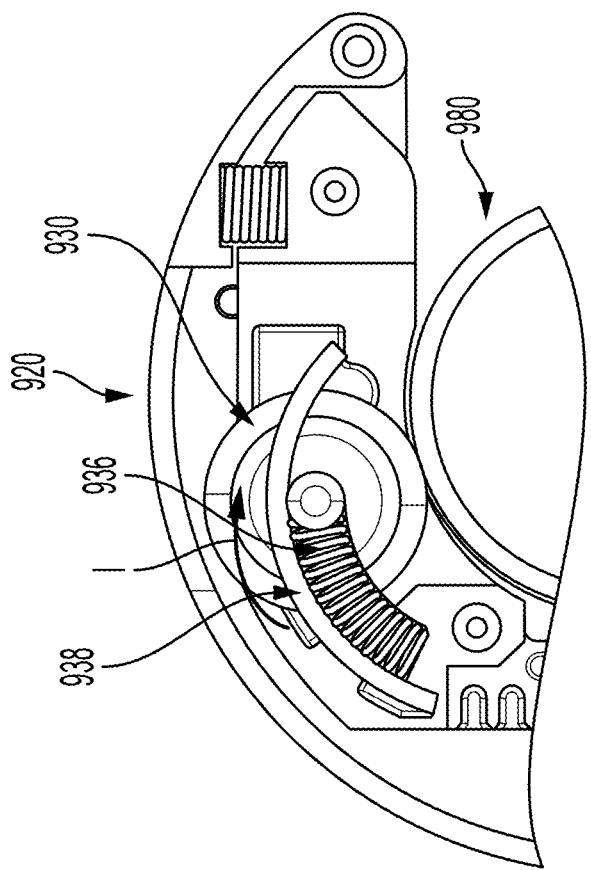

FIGS. 44A and 44B are closeup views of the cutting head of FIG. 39 cutting the tubular member of FIG. 41. When the tubular member 980 is fully inserted, the cutting blade spring 936 is compressed and pushes the cutting blade 930 against the leaf spring 938 and the tubular member 980 in the direction of arrow I. When the power tool or accessory is actuated, the cutting head 920 will rotate counter-clockwise around the tubular member 980. Friction between the leaf spring 938, the cutting blade 930, and the tubular member 980 causes the cutting blade 930 to roll along the leaf spring 938 along the arrow I. The leaf spring 938 is deflected and creates a load along arrow J, which pushes the cutting blade 930 into the tubular member 980 until it cuts through the wall of the tubular member 980.

Figure 44D:
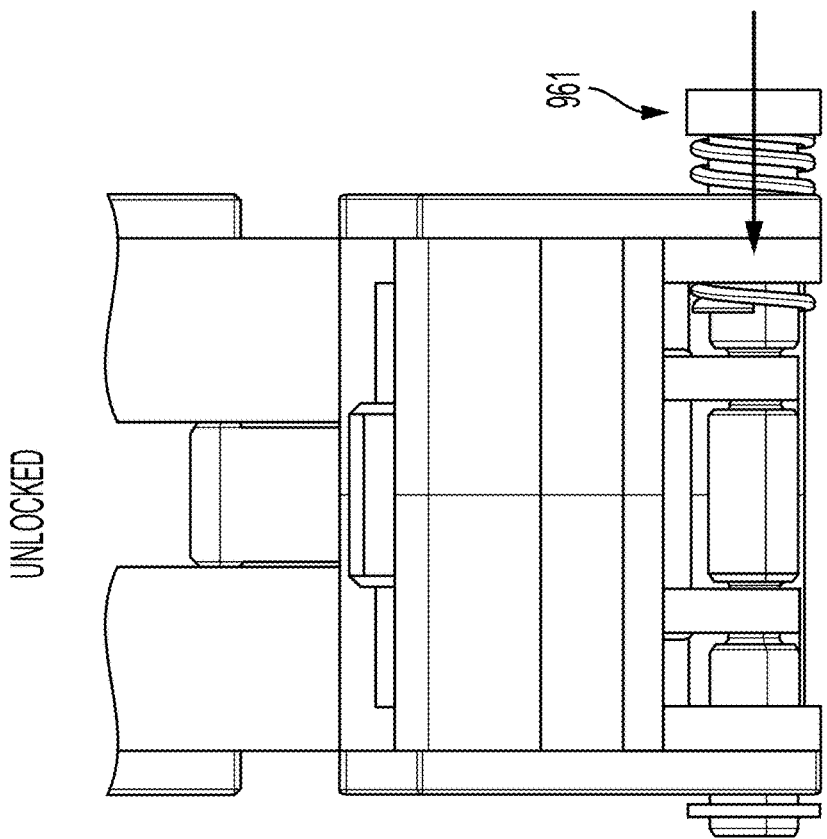
FIGS. 44C and 44D are close up view of the cutting head moving from a locked position to an unlocked position.
Figure 44C:
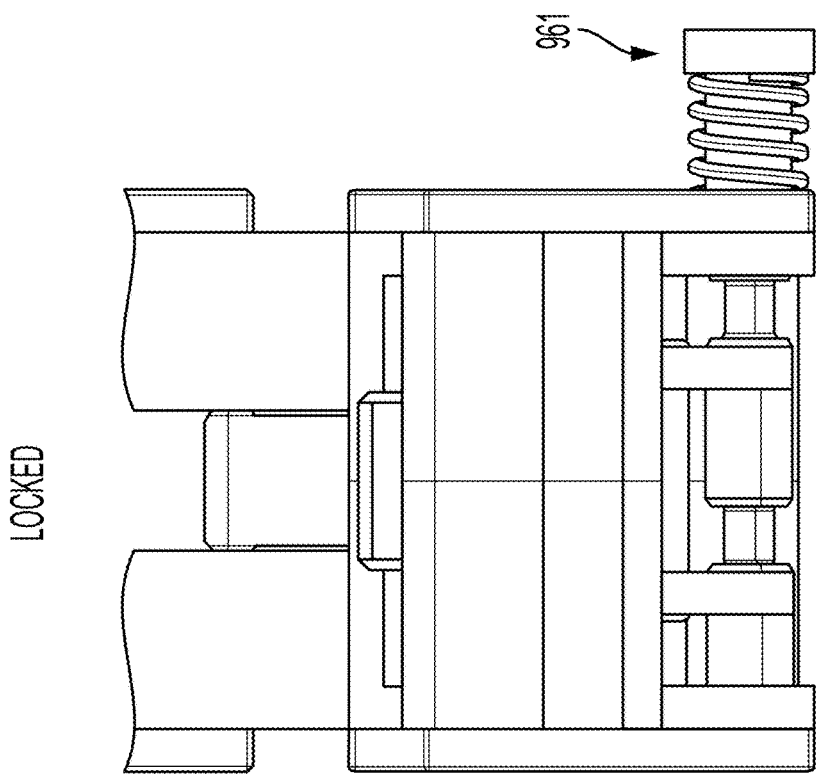

FIGS. 44C and 44D are close up view of the cutting head moving from a locked position to an unlocked position. After the tubular member 980 is fully inserted, the roller mount lock 961 automatically engages with the roller mount plate 955 to prevent them from rotating. When the cut is complete, the cutting head 920 rotation is reversed and a fixed member in the housing actuates the roller mount lock 961, allowing the roller mount plate 955 to rotate outwards until the tubular member 980 can be removed.

Figure 45:
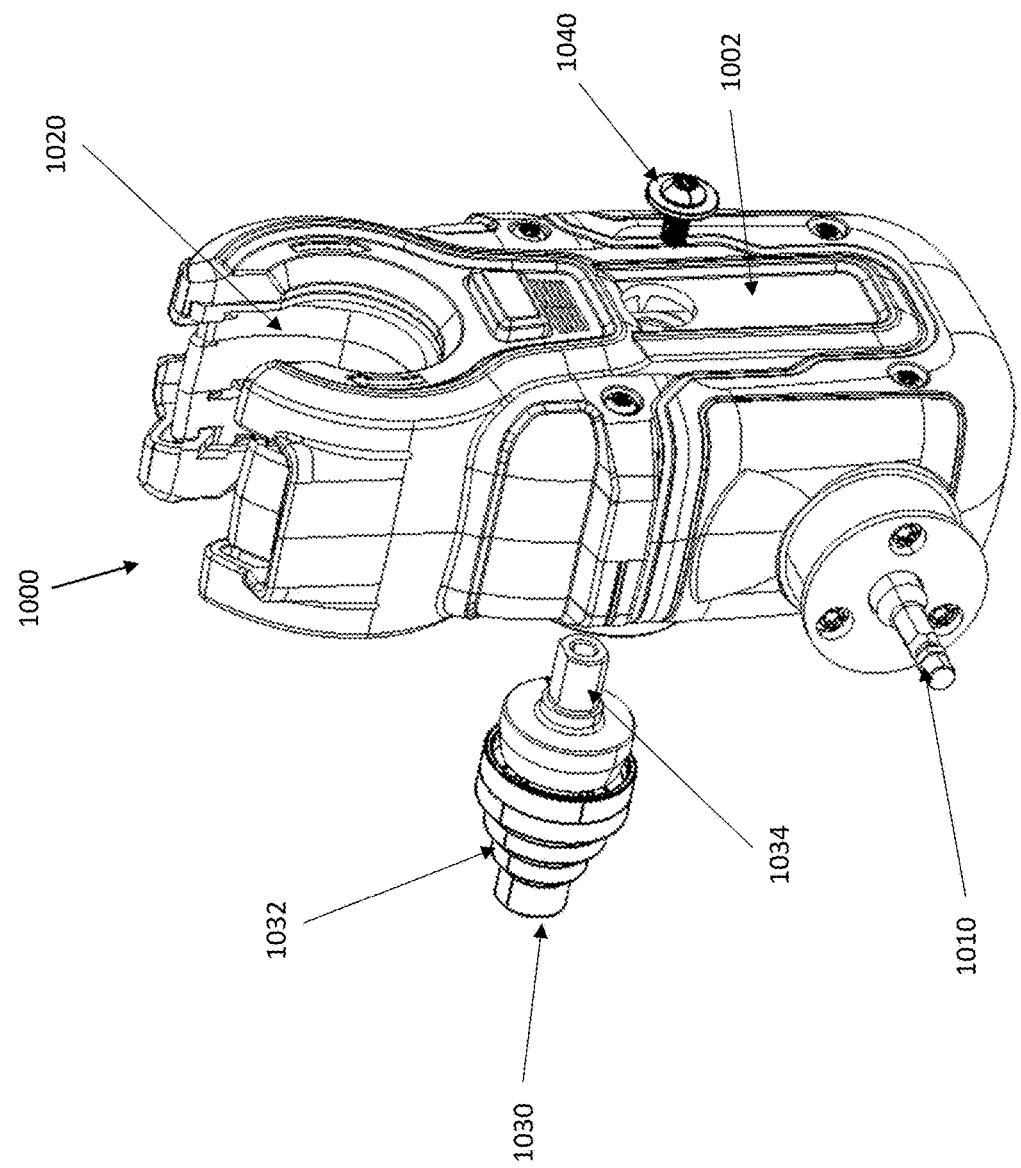
FIG. 45 is a perspective view of another embodiment of a power tool accessory for cutting and deburring a tubular member.
Figure 46:
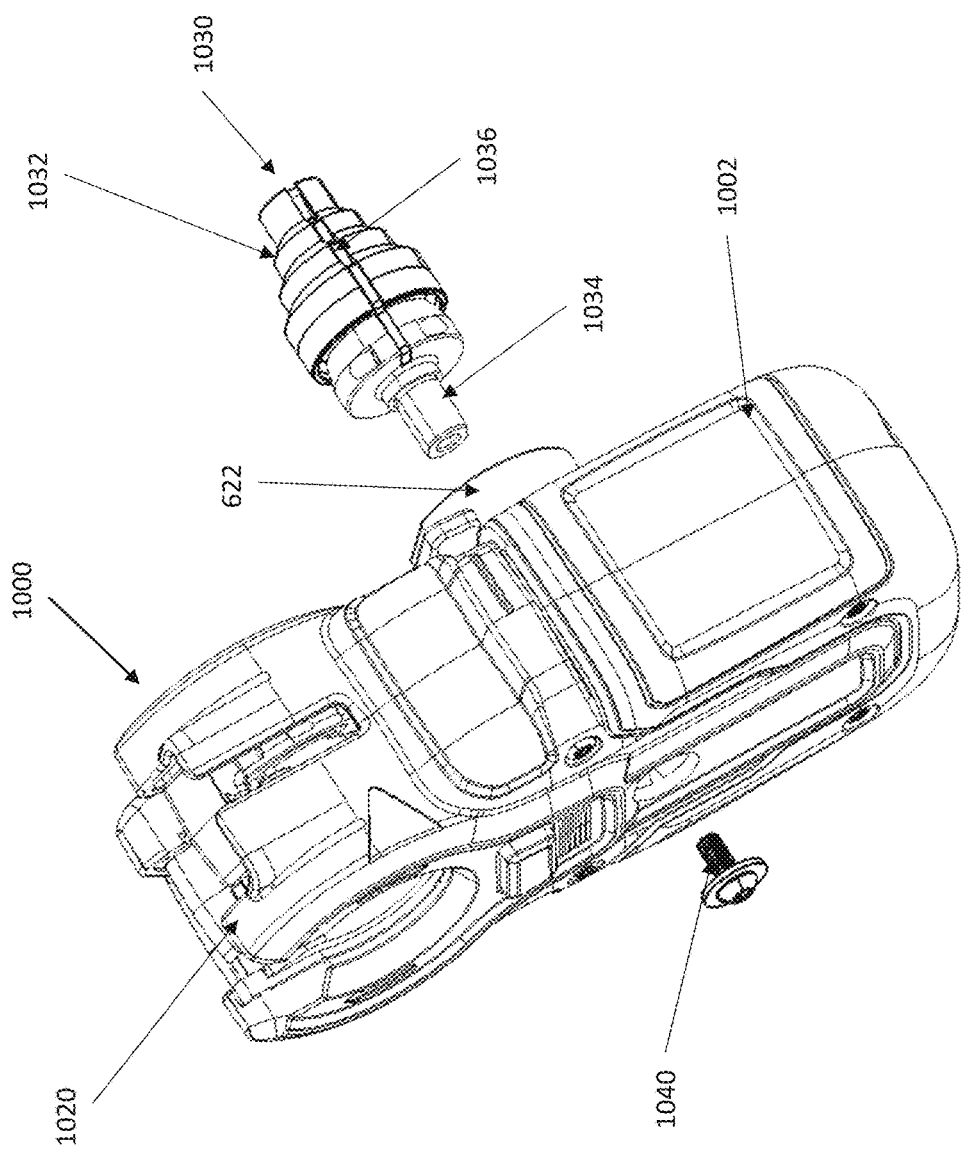
FIG. 46 is a perspective view of the power tool accessory of FIG. 45.
Figure 47:
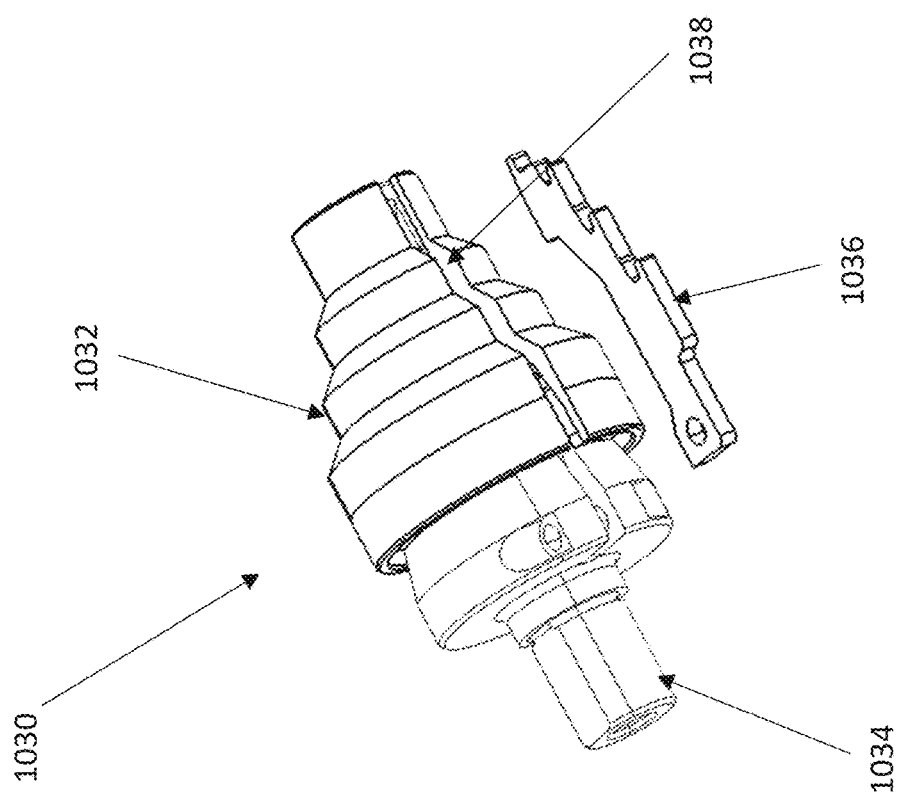
FIG. 47 is a side view of the deburring attachment of FIG. 45.

FIGS. 45-50 illustrate another embodiment of a power tool accessory 1000 for cutting and deburring a tubular member. FIG. 45 is a perspective view the power tool accessory 1000 for cutting and deburring a tubular member. The power tool accessory 1000 includes a housing 1002 and both a cutting head 1020 and a deburring attachment 1030 (also referred to interchangeably as a reamer) similar to the power tool accessory 500 of FIG. 27 and the power tool accessory 600 of FIG. 28. In this example, the cutting head 1020 is a removable, single size cutting head that can be removed and replaced with a different, single size cutting head depending on the size of the tubular member being cut, as discussed in detail above. Alternatively, one of the automatically adjustable cutting heads 820, 920 described above could be used. The deburring attachment 1030 includes a stepped deburring head 1032, a deburring head drive shaft 1034, and a deburring blade 1036 that is removably disposed in a blade slot 1038, as seen best in FIGS. 46 and 47. A removeable screw 1040 secures the deburring attachment 1030 to one of the gears of the transmission of the power tool accessory 1000. More specifically, the removeable screw 1040 screws into one of the gears and into an end of the deburring blade 1036 to secure the deburring attachment 1030 to the power tool accessory 1000, while still allowing the deburring attachment 1030 to rotate.

Figure 48:
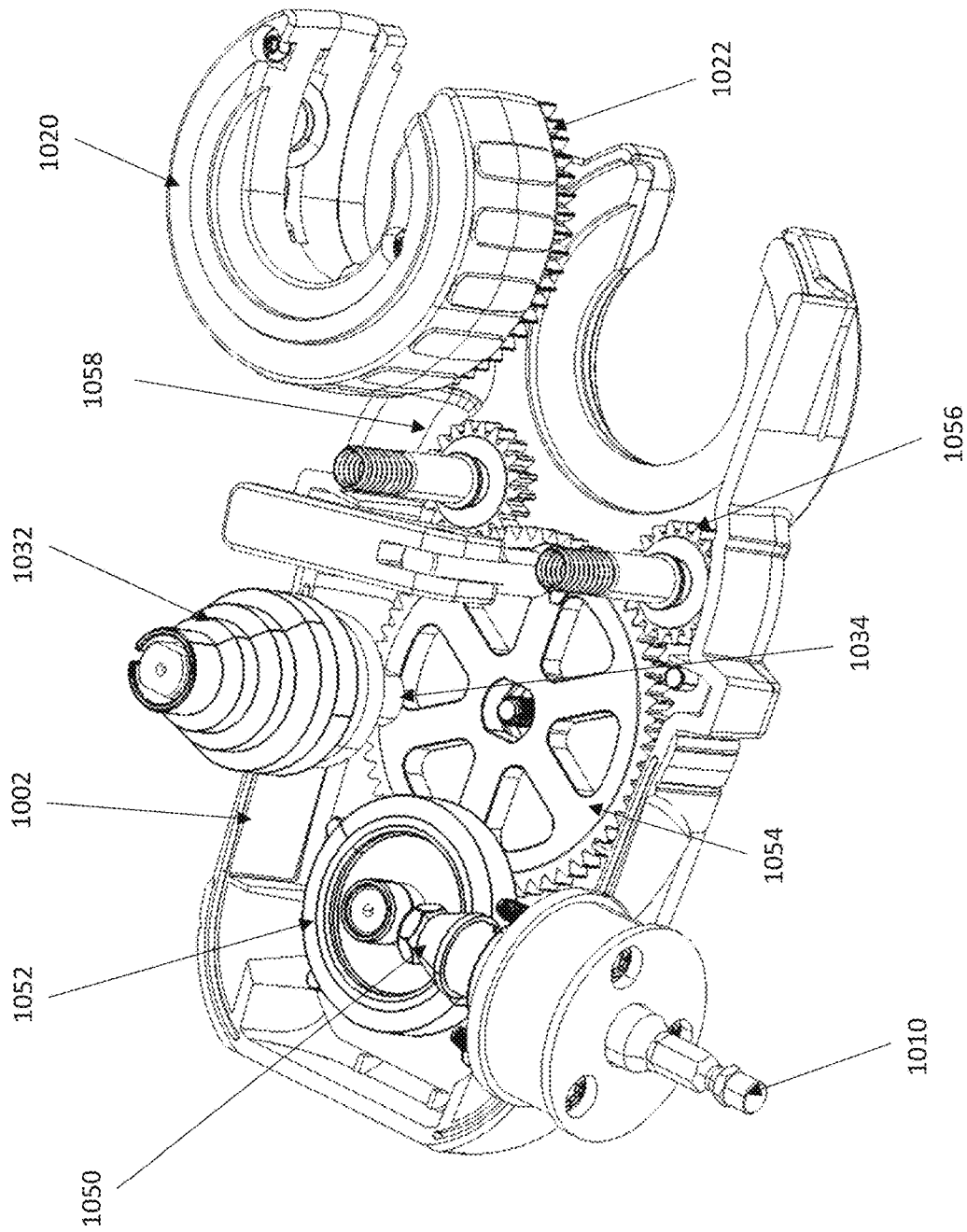
FIG. 48 is a cut away view of the power tool accessory of FIG. 45 with the deburring head uncoupled.
Figure 49:
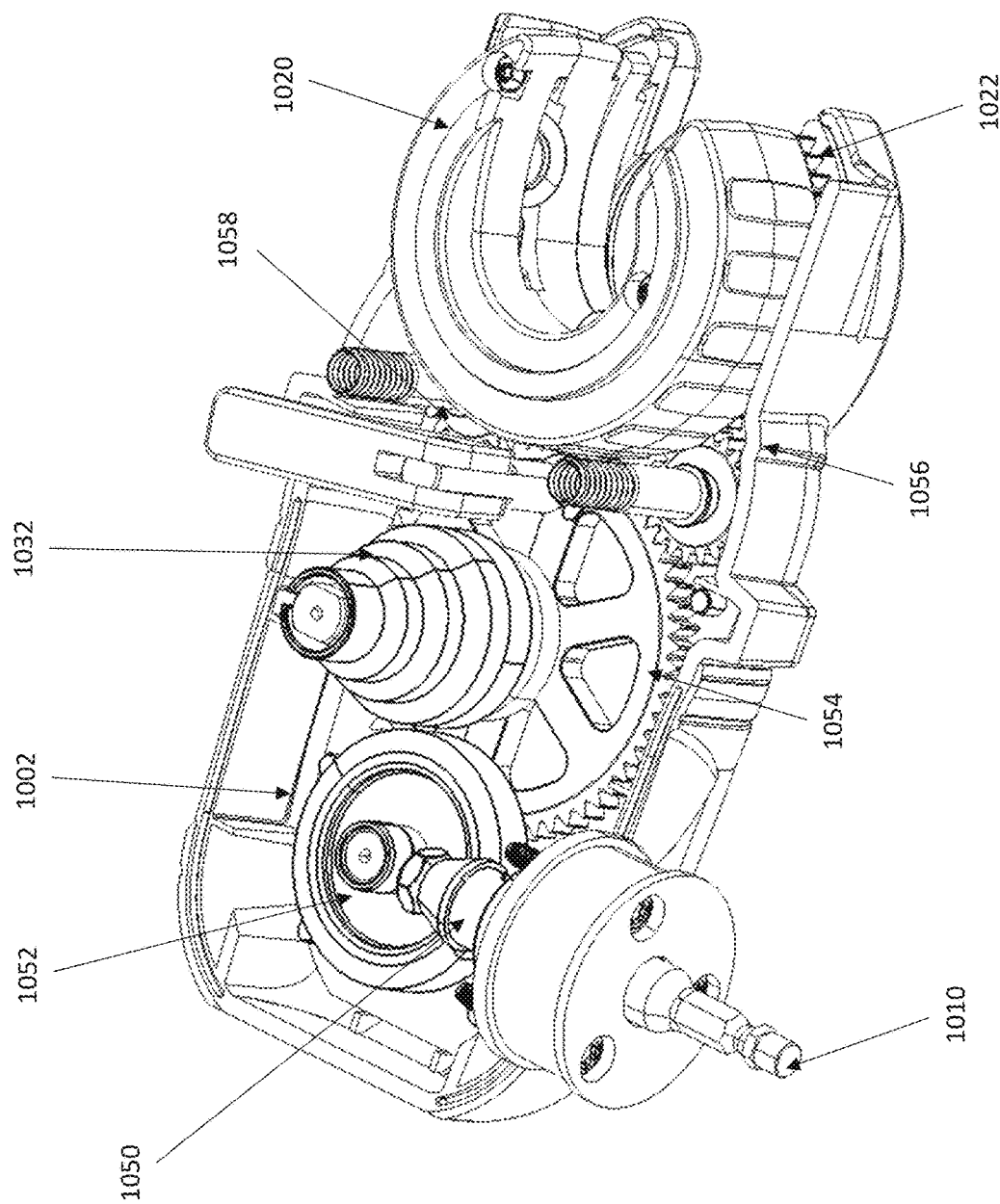
FIG. 49 is a cut away view of the power tool accessory of FIG. 45 with the deburring head coupled.
Figure 50:
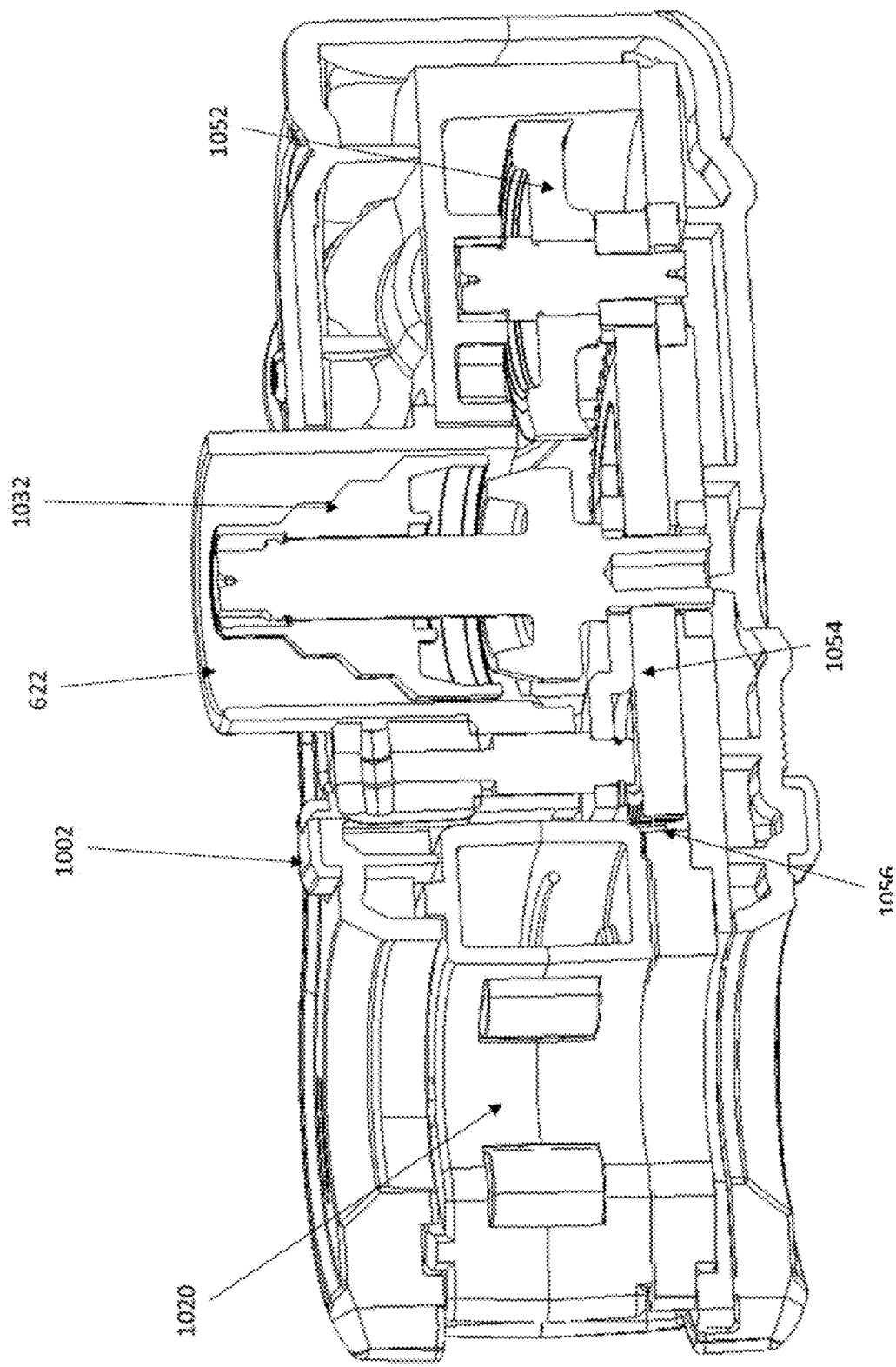
FIG. 50 is a section view of the power tool accessory of FIG. 45.

FIG. 48 is a cut away, exploded view of the power tool accessory 1000 of FIG. 45 with the stepped deburring head 1032 uncoupled from the transmission of the power tool accessory 1000. FIG. 49 is a cut away view of the power tool accessory 1000 with the stepped deburring head 1032 coupled to the transmission of the power tool accessory 1000. FIG. 50 is a section view of the power tool accessory 1000.

The deburring attachment 1030 is configured to remove the burrs on a tubular member after the cutting head 1020 cuts the tubular member or for any tubular member that needs burrs removed. That is, the deburring attachment 1030 deburrs the tubular member.

A transmission in the housing 1002 includes a bevel gear 1050, a drive gear 1052, an intermediate gear 1054, a first idler gear 1056, and a second idler gear 1058. The cutting head 1020 includes gear teeth 1022. The stepped deburring head 1032 is coupled to the intermediate gear 1054. An input shaft 1010 of the power tool accessory 1000 drives the bevel gear 1050, which drives the drive gear 1052, which drives the intermediate gear 1054, which drives the first idler gear 1056 and the second idler gear 1058, which engage the gear teeth 1022 to drive the cutting head 1020. The intermediate gear 1054 drives the stepped deburring head 1032. The stepped deburring head 1032 includes a stepped body with a deburring blade 1036 configured to be rotatably driven by the intermediate gear 1054 to remove burrs from an end of a tubular member. In other The first idler gear 1056 and the second idler gear 1058 are both driven by the intermediate gear 1054 and rotate at the same speed. At least one of the first idler gear 1056 and the second idler gear 1058 remain in contact with the gear teeth 1022 on the cutting head 1020, even when the cutting head 1020 rotates three hundred sixty degrees. That is, the teeth on at least one of the first idler gear 1056 or the second idler gear 1058 is always meshed with the gear teeth 1022 on the cutting head 1020 as the cutting head 1020 rotates a full rotation about its axis. The transmission may use other gear arrangements, such as planetary gears, spur gears, or parallel axis gears, and the deburring head 1032 may be coupled to any of the gears, including the input or output gear and including the same gear as the cutting head.

Figure 51B:
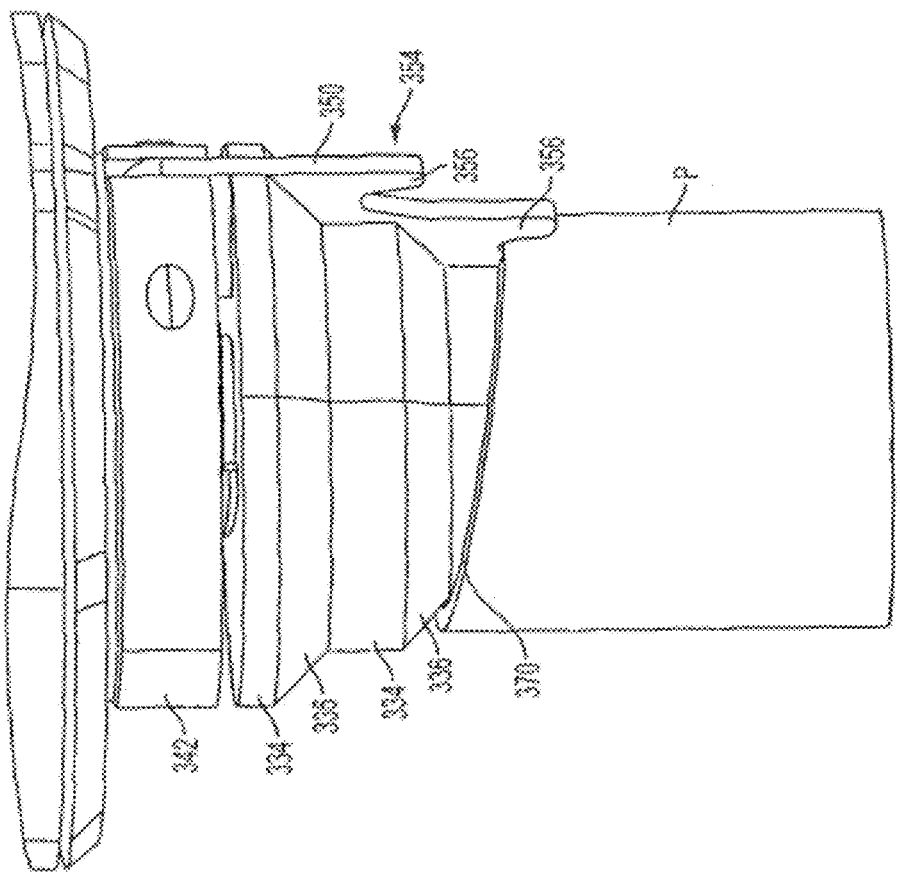
FIGS. 51A and 51B are views of another embodiment of a deburring attachment.
Figure 51A:
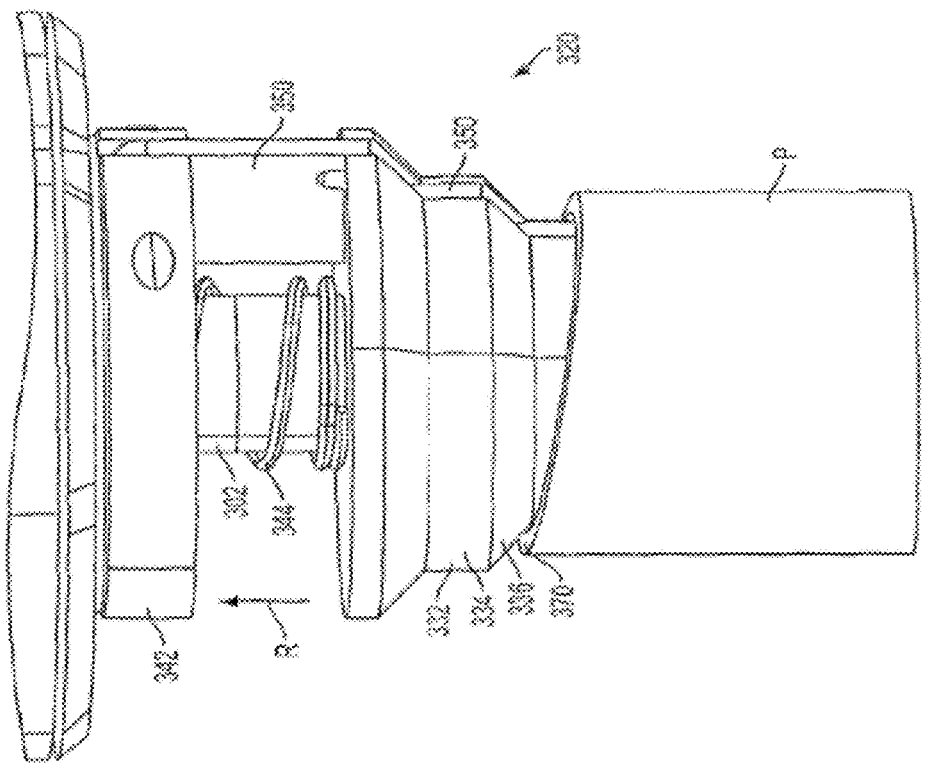

FIGS. 51A and 51B are views of another embodiment of a deburring attachment. A reaming portion 330 includes a front body portion 332 and a rear body portion 340 that are non-rotationally carried by the driving shaft 302. The front body portion 332 has a stepped configuration with a plurality of cylindrical steps 334 that increase in diameter from front to rear. Adjacent cylindrical steps 334 are connected by frustroconical surfaces 336. The rear body portion 340 comprises a generally cylindrical disc 342. The rear body portion 340 is axially fixed to the driving shaft 302 and abuts the housing front end of the power tool. The front body portion 332 is axially moveable relative to the driving shaft 302 and is biased away from the rear body portion 340 by a compression spring 344 disposed between the front body portion 332 and the rear body portion 340. The deburring attachment is received in a cylindrical wall 622 coupled to the power tool or accessory housing. The cylindrical wall helps prevent inadvertent contact with the deburring head when not deburring a tubular member.

The front and rear body portions 332, 340 have radial slots 346, 348, respectively, that extend in an axial direction. Removably received in the axial slots 346, 348 is a reaming blade 350. The blade 350 has a rear end 352 axially fixed to the rear body portion 340, and a working end 354 that remains stationary relative to the driving shaft 302 when the front body portion 340 moves axially. The working end 354 has a stepped configuration with a plurality of hook shaped cutting surfaces 356, each having a diameter corresponding to one of the cylindrical steps 334 on the front body portion 332.

In operation, when a power tool causes the intermediate gear to rotate about its axis, the intermediate gear causes the driving shaft 302, and the front and rear bodies 332, 340 of the reaming portion 340 to rotate simultaneously about the longitudinal axis X. The reaming attachment 230 may be used to ream the edge 370 of a pipe P to remove burrs or shavings. As shown in FIG. 26A, the pipe P is inserted into the cylindrical wall so that the pipe engages the one of the stepped cylindrical surfaces 334 or conical surfaces 336 of the front body portion, which abut against the edge 370 of the pipe P. As further axial bias is applied by the pipe against the body portion, the front body 332 retracts rearward in a direction R against the force of spring 344. This retraction of the front body 332 causes the cutting surfaces 356 of the deburring blade 350 to be exposed. One of the hook shaped cutting surfaces 356 hooks around the edge 370 of the blade. As the driving shaft 302 rotates, the cutting surface 356 rotates to remove material from the edge 370 of the pipe P.

When the reaming is complete, the pipe is removed from front portion 332 and the front portion 332 moves axially forward opposite the direction R, to cause apparent retraction of the cutting surfaces 356.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. These and other implementations are within the scope of this application.

What is claimed is:

1. A tool for cutting tubular members comprising:
   a tool housing;
   an input shaft received in a rear end portion of the tool housing, the input shaft configured to be driven in rotation by a motor,
   a transmission received in the tool housing and including a rotatable input member configured to be driven by the input shaft and a rotatable output member configured to be driven by the rotatable input member; and
   a cutting head received in a front end portion of the tool housing, the cutting head including a head housing with a central opening configured to receive a tubular member in the central opening and to be rotatably driven by the rotatable output member of the transmission, the cutting head including a cutting blade configured to protrude at least partially into the central opening, a roller configured to protrude at least partially into the central opening, and a releasable lock assembly,
   wherein the cutting blade and the roller are biased inward toward a center of the central opening, movable outward from the central opening to accommodate multiple sizes of tubular members in the central opening, and lockable by the releasable lock assembly in a desired position to accommodate a tubular member of a desired size, the releasable lock assembly configured to automatically actuate by insertion of the tubular member independent of operation of the motor, and
   wherein, in a locked position, the roller and the cutting blade engage the tubular member so that the cutting blade cuts the tubular member as the cutting head rotates about the tubular member.

2. The tool of claim 1, wherein the roller is coupled to a roller carriage carried by the head housing and biased inward toward the central opening by a first spring.

3. The tool of claim 2, further comprising a roller mount wherein the roller is coupled to the roller mount and the roller mount is coupled to the roller carriage, the roller mount configured to pivot relative to the roller carriage upon insertion of the tubular member into the cutting head.

4. The tool of claim 2, wherein the cutting blade is coupled to a blade carriage carried by the head housing opposite the roller carriage and biased inward toward the central opening by a second spring.

5. The tool of claim 4, wherein the releasable lock assembly comprises size adjustment slots coupled to one of the roller carriage and the blade carriage and a protrusion coupled to an other of the roller carriage and the blade carriage, wherein the protrusion is receivable in the size adjustment slots at different positions of the roller carriage and the blade carriage.

6. The tool of claim 1, wherein the rotatable output member comprises two or more output gears rotating at a same speed, each output gear having a first plurality of teeth configured to mesh with a second plurality of teeth on the cutting head.

7. The tool of claim 6, wherein the cutting head comprises a C-shaped body that carries the second plurality of teeth and the output gears are separated by a distance so that the first plurality of teeth on at least one of the output gears is always meshed with the second plurality of teeth on the C-shaped body as the cutting head rotates a full rotation about its axis.

8. The tool of claim 7, wherein the two or more output gears are idler gears and the transmission further comprises at least one speed reduction gear between the rotatable input member and the idler gears.

9. The tool of claim 1, wherein the cutting head comprises a C-shaped body with an interior wall defining the central opening.

10. The tool of claim 9, wherein the C-shaped body carries at least one roller and the cutting blade with a spring biasing the cutting blade into the central opening.

11. The tool of claim 1, wherein the cutting head includes a grip surface on its outer periphery so that the cutting head is configured to be used as a manual operated cutter of tubular members when the cutting head is removed from the tool housing.

12. The tool of claim 1, wherein the tool housing includes a clamp assembly comprising a base and a cover moveable relative to the base of the tool housing to access the cutting head.

13. The tool of claim 1, wherein the tool housing comprises a first C-shaped opening, the cutting head comprises a second C-shaped opening and further comprising an alignment assembly configured to automatically align the first and second C-shaped openings when the cutting head is rotated in a first direction and configured to allow free rotation of the cutting head relative to the tool housing when the cutting head is rotated in a second opposite direction.

14. A tool for cutting tubular members comprising:
   a tool housing;
   a motor received in the tool housing;
   a transmission comprising a rotatable input member configured to be driven by the motor and a rotatable output member configured to be driven by the rotatable input member;
   a cutting head received in a front end portion of the tool housing, the cutting head having a head housing with a central opening configured to receive a tubular member in the central opening and to be rotatably driven by the rotatable output member of the transmission, the cutting head including a cutting blade configured to protrude at least partially into the central opening, a roller configured to protrude at least partially into the central opening, and a releasable lock assembly,
   wherein the cutting blade and the roller are biased inward toward a center of the central opening, movable outward from the central opening to accommodate multiple sizes of tubular members in the central opening, and lockable by the releasable lock assembly in a desired position to accommodate a tubular member of a desired size, the releasable lock assembly configured to automatically actuate by insertion of the tubular member independent of operation of the motor, and
   wherein, in a locked position, the roller and the cutting blade engage the tubular member so that the cutting blade cuts the tubular member as the cutting head rotates about the tubular member.

15. The tool of claim 14, wherein the roller is coupled to a roller carriage carried by the head housing and biased inward toward the central opening by a first spring.

16. The tool of claim 15, further comprising a roller mount wherein the roller is coupled to the roller mount and the roller mount is coupled to the roller carriage, the roller mount configured to pivot relative to the roller carriage upon insertion of the tubular member into the cutting head.

17. The tool of claim 15, wherein the cutting blade is coupled to a blade carriage carried by the head housing opposite the roller carriage and biased inward toward the central opening by a second spring.

18. The tool of claim 14, wherein the tool housing comprises a first C-shaped opening, the cutting head comprises a second C-shaped opening and further comprising an alignment assembly configured to automatically align the first and second C-shaped openings when the cutting head is rotated in a first direction and configured to allow free rotation of the cutting head relative to the head housing when the cutting head is rotated in a second opposite direction.

19. The tool of claim 5, wherein the roller carriage and the blade carriage are configured such that when a tubular member is inserted into the central opening, the protrusion is received and locked in one of the size adjustment slots, thereby locking the roller carriage and the blade carriage in place.

20. The tool of claim 17, wherein;
   the releasable lock assembly comprises size adjustment slots coupled to one of the roller carriage and the blade carriage and a protrusion coupled to an other of the roller carriage and the blade carriage, wherein the protrusion is receivable in the size adjustment slots at different positions of the roller carriage and the blade carriage; and
   the roller carriage and the blade carriage are configured such that when a tubular member is inserted into the central opening, the protrusion is received and locked in one of the size adjustment slots, thereby locking the roller carriage and the blade carriage in place.

* * * * *